INVENTORS
GEORGE W. VON HOFE
JOHN F. SPANO
BY
*Corey, Hart & Stemple*
ATTORNEYS

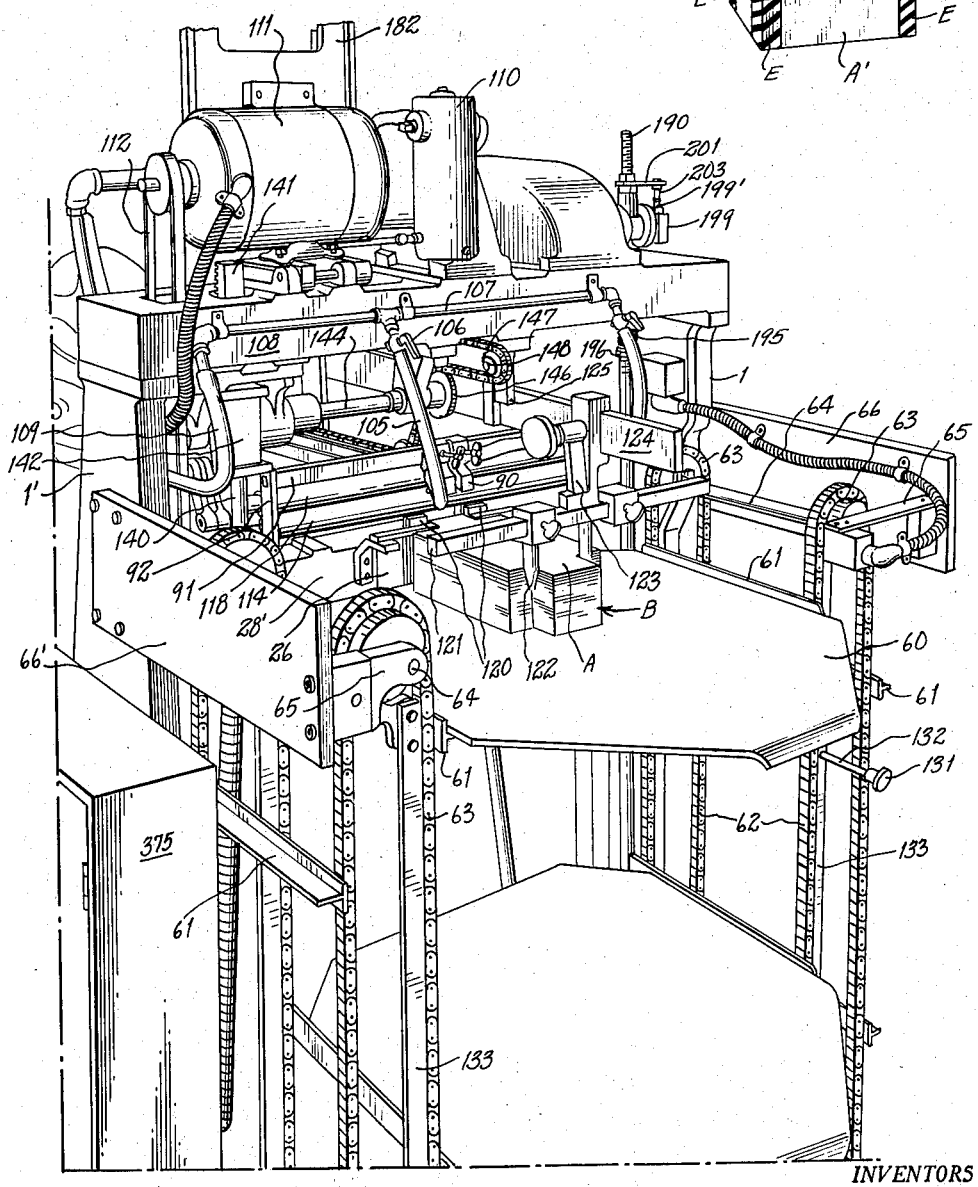

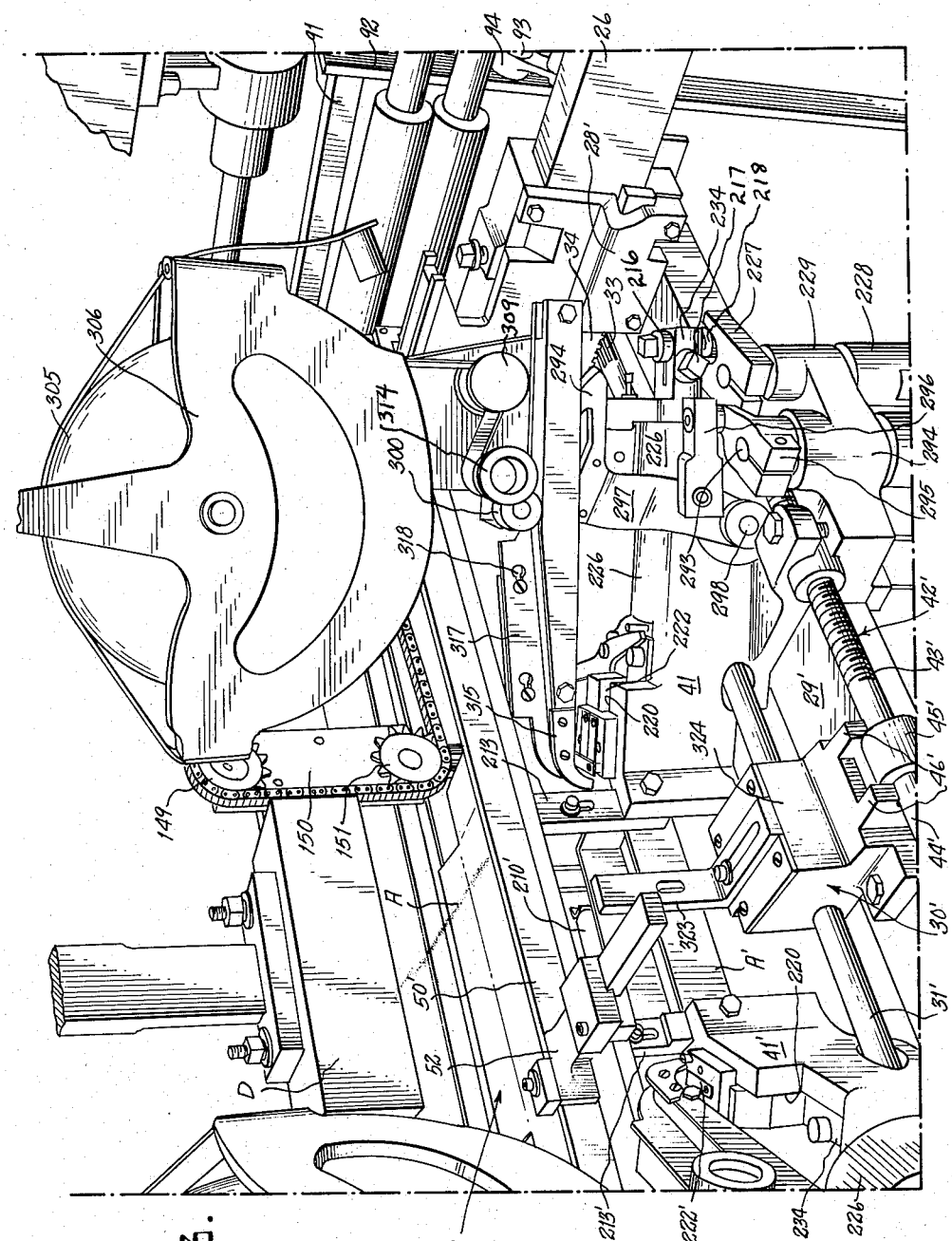

May 2, 1961 G. W. VON HOFE ET AL 2,982,188
BOX MAKING MACHINES
Filed April 26, 1957 24 Sheets-Sheet 4

Fig. 5.

INVENTORS
GEORGE W. VON HOFE
JOHN F. SPANO
BY
*Corey, Hart & Stemple*
ATTORNEYS

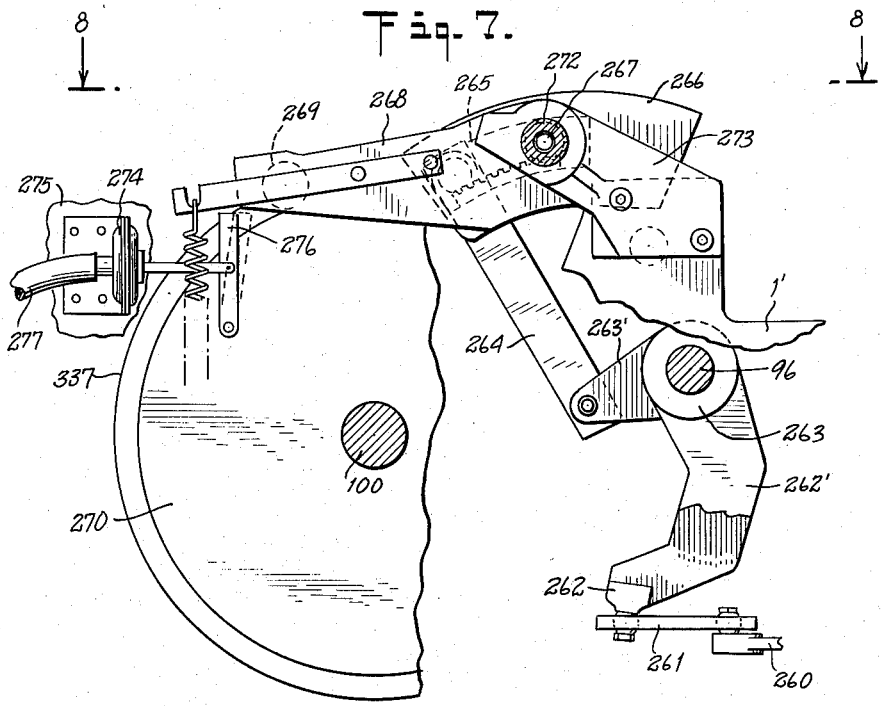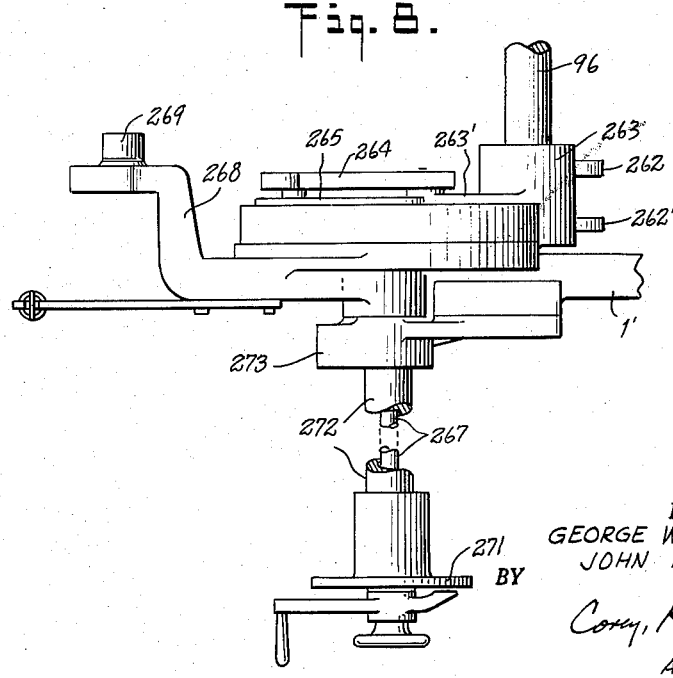

INVENTORS
GEORGE W. VON HOFE
JOHN F. SPANO

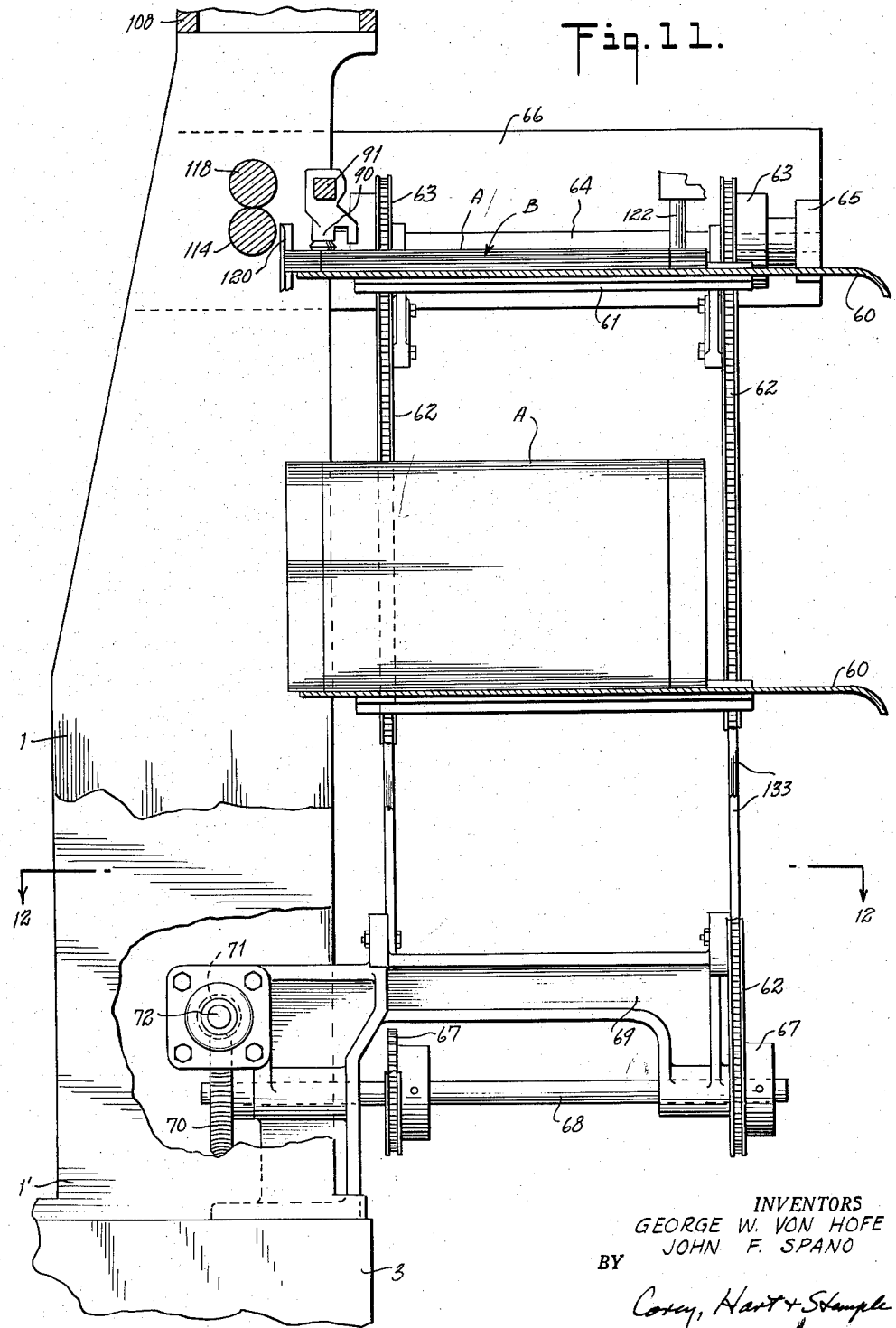

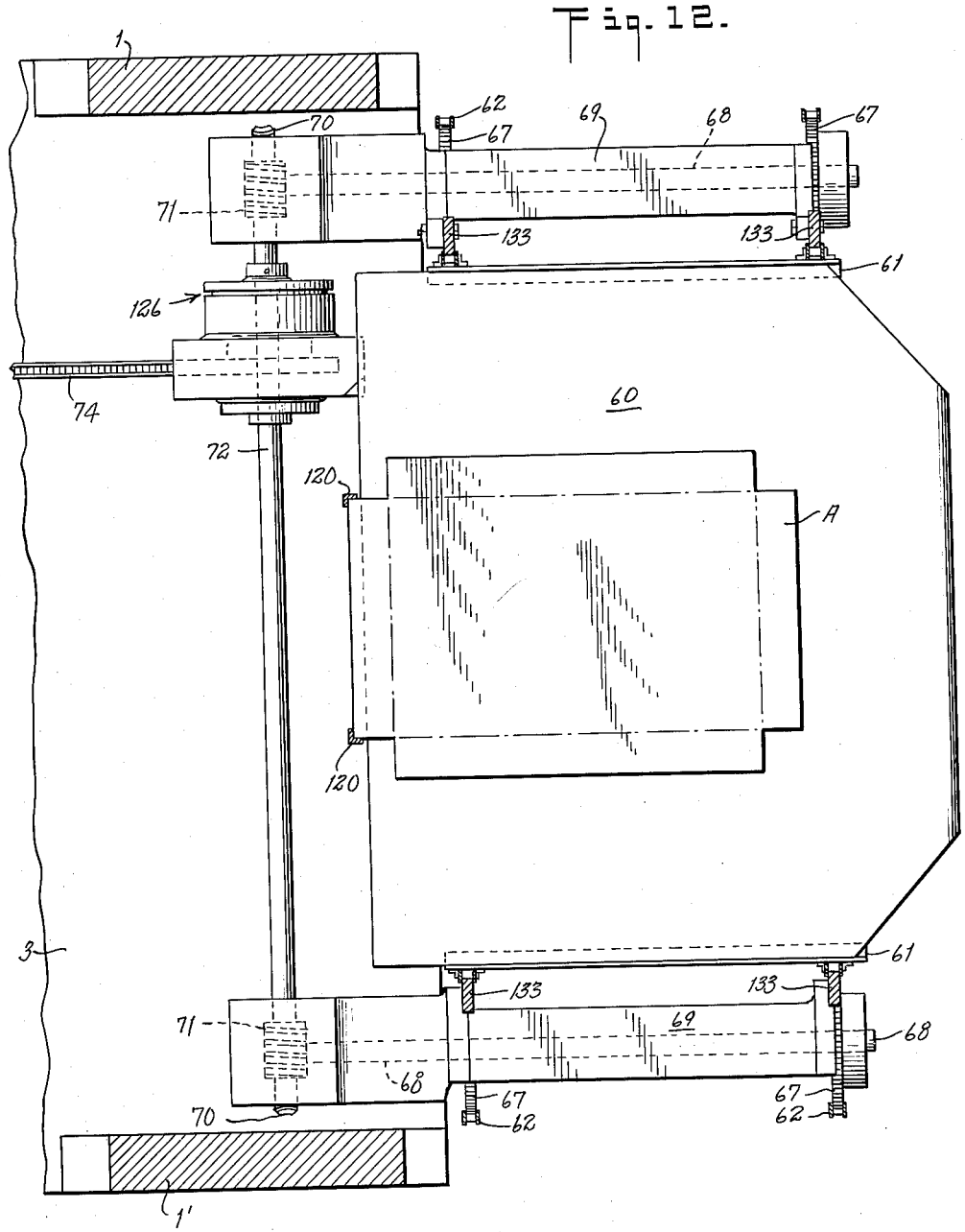

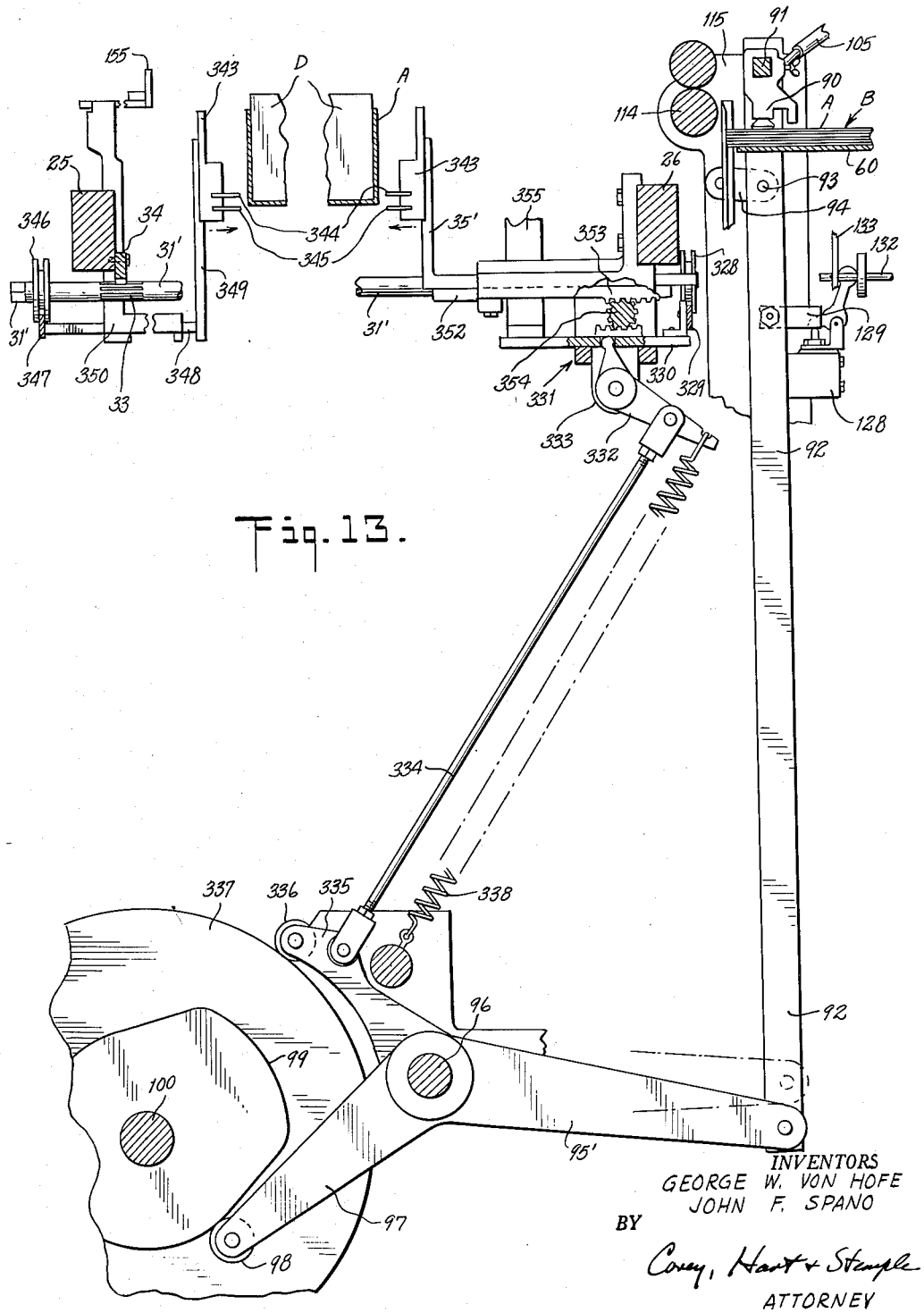

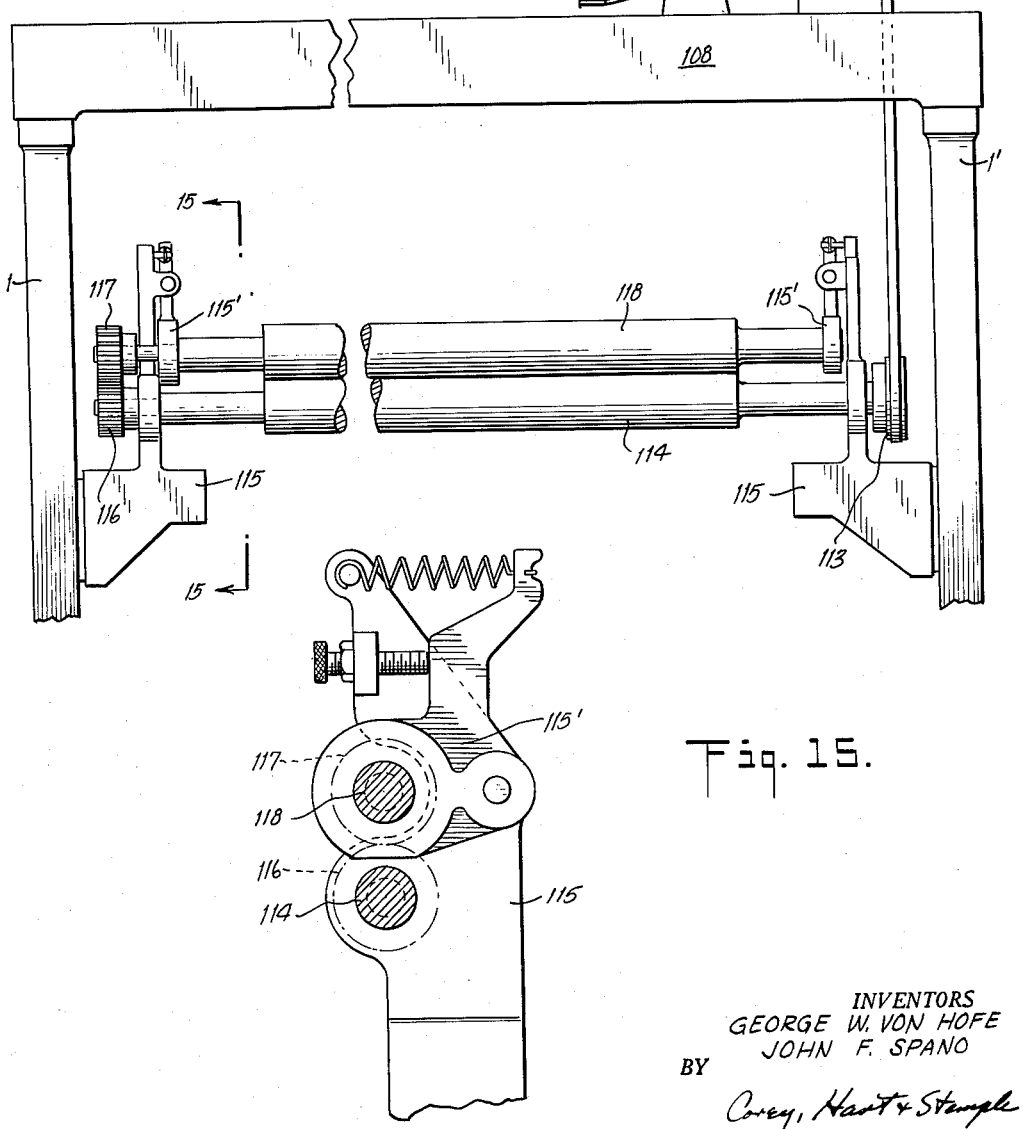

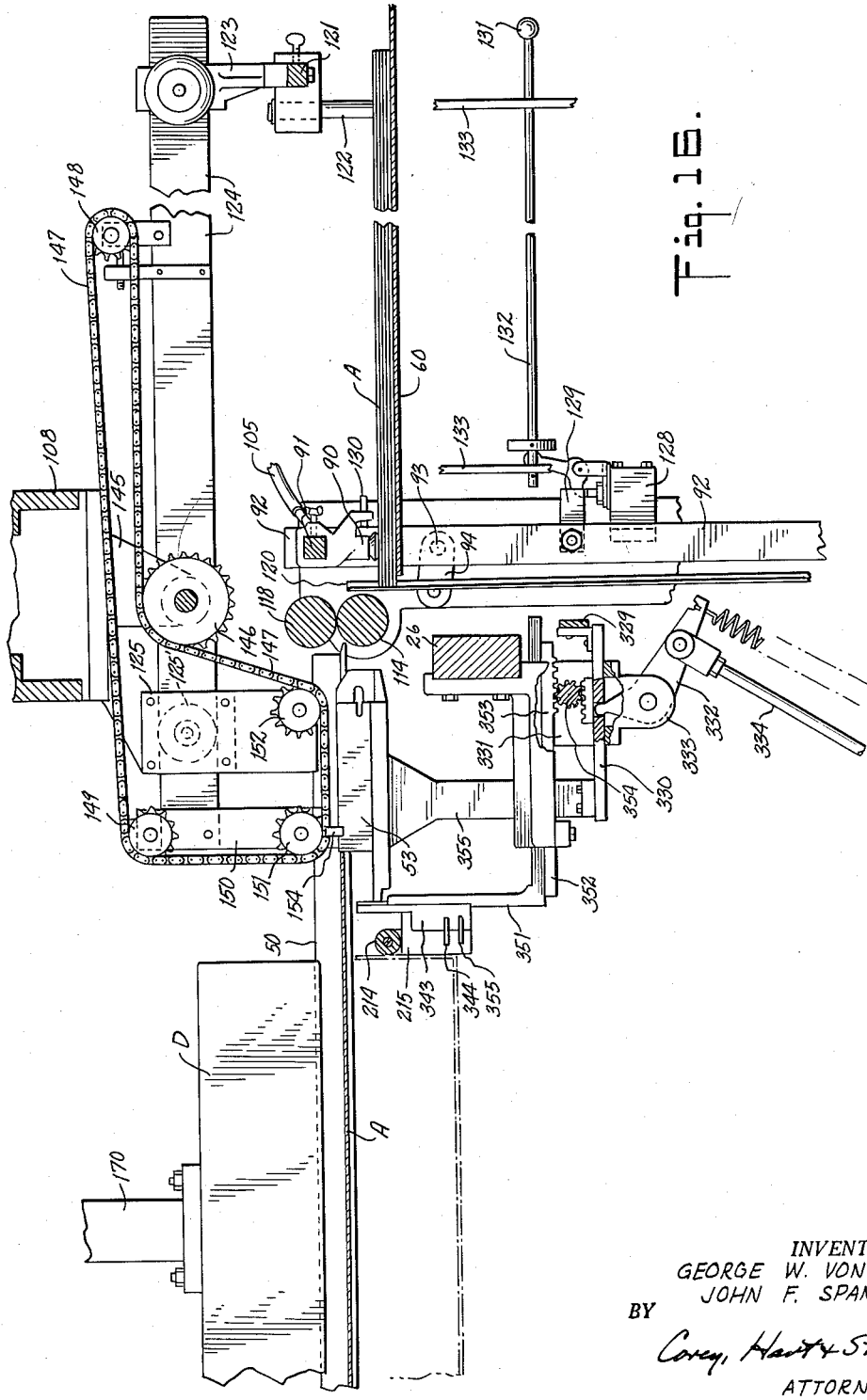

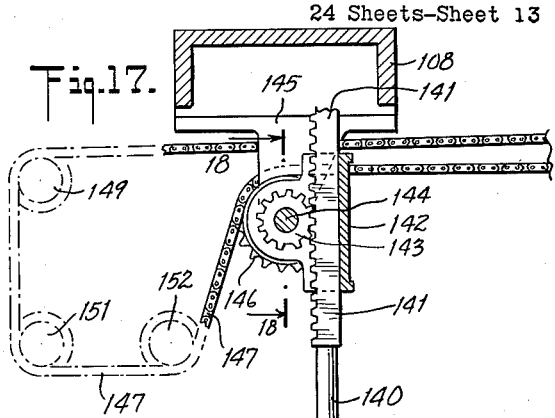
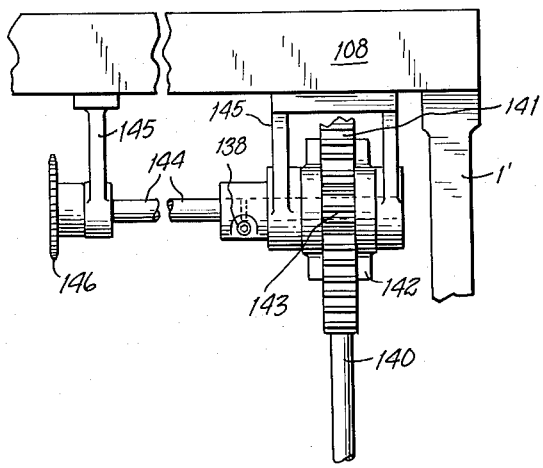
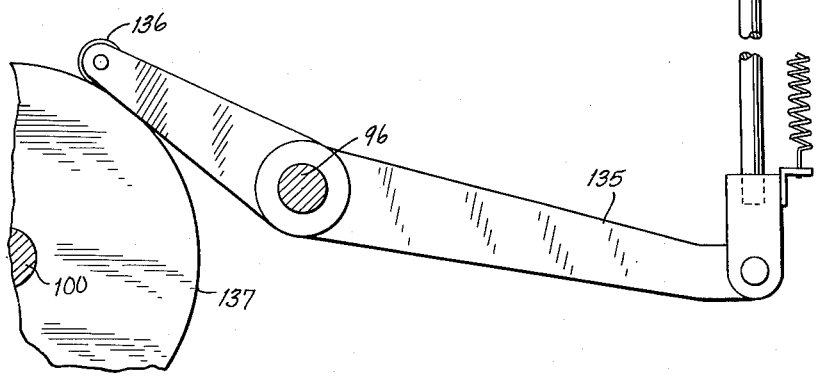

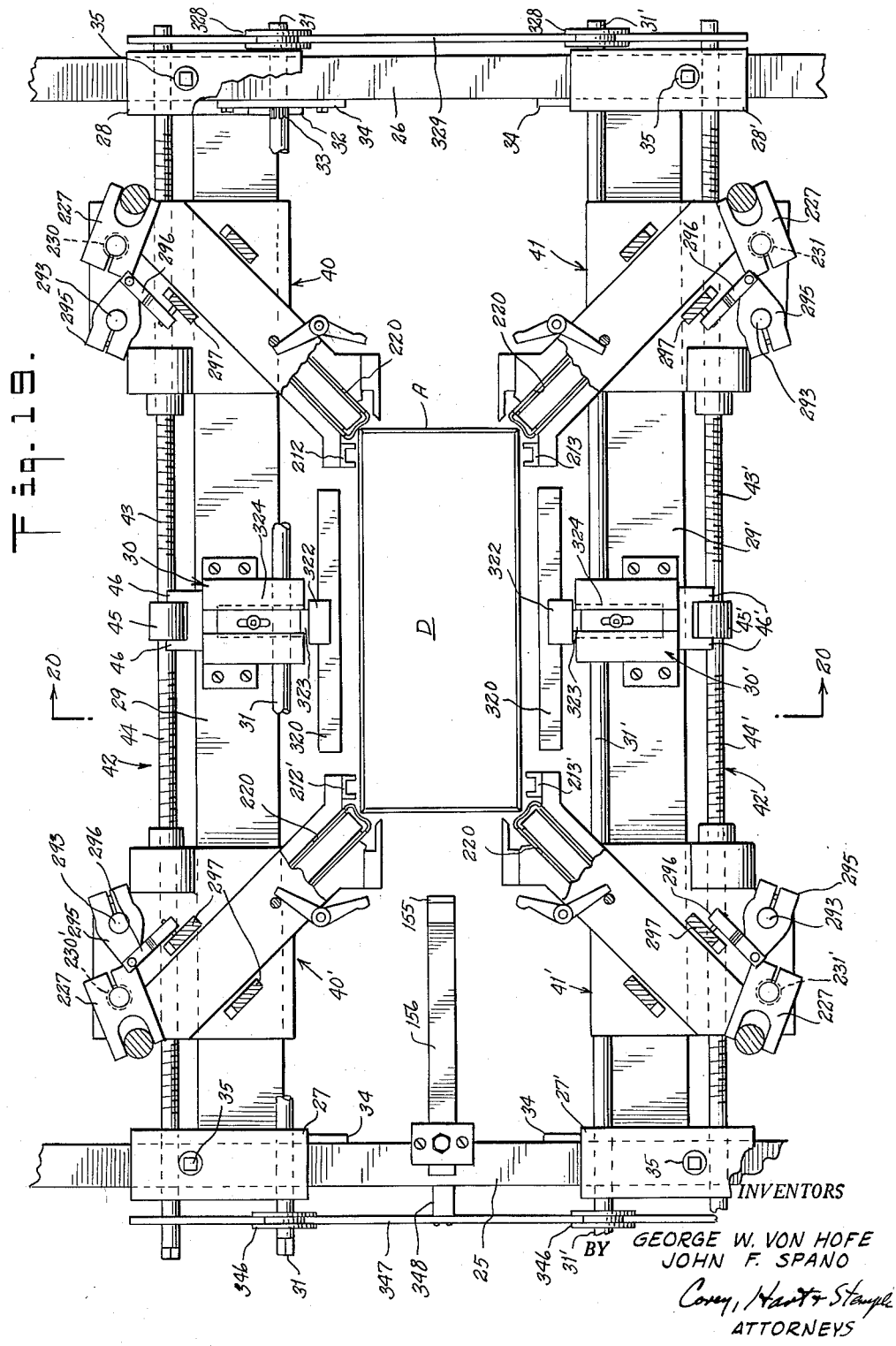

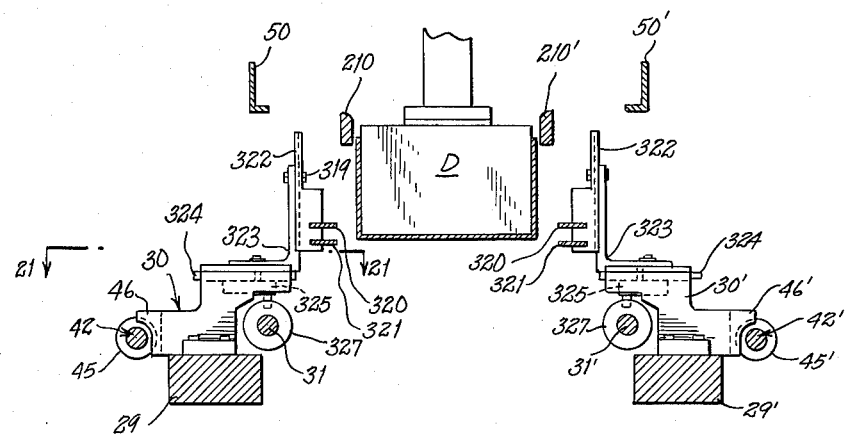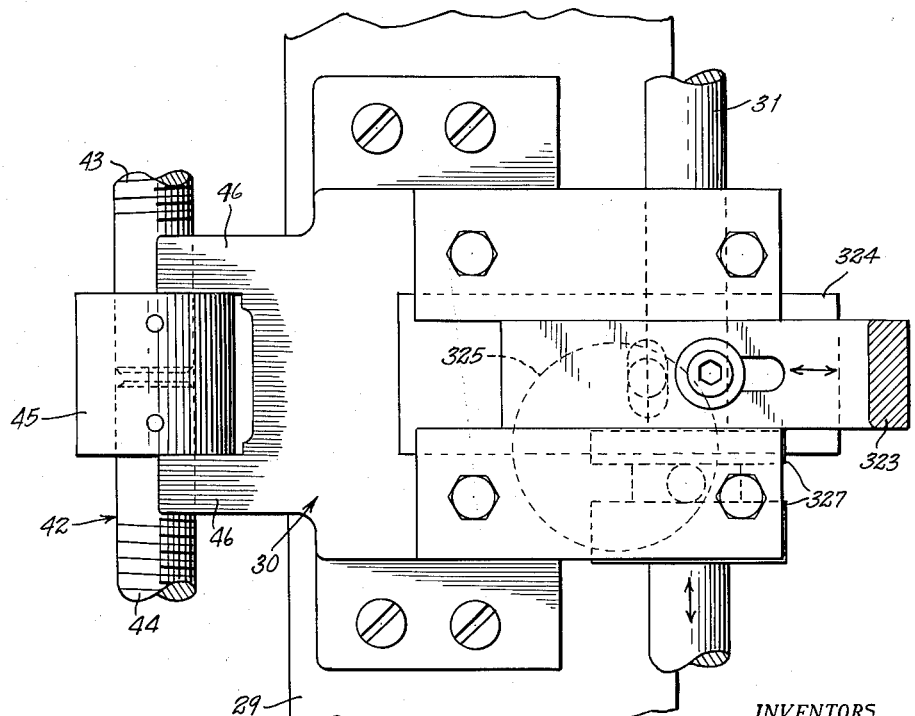

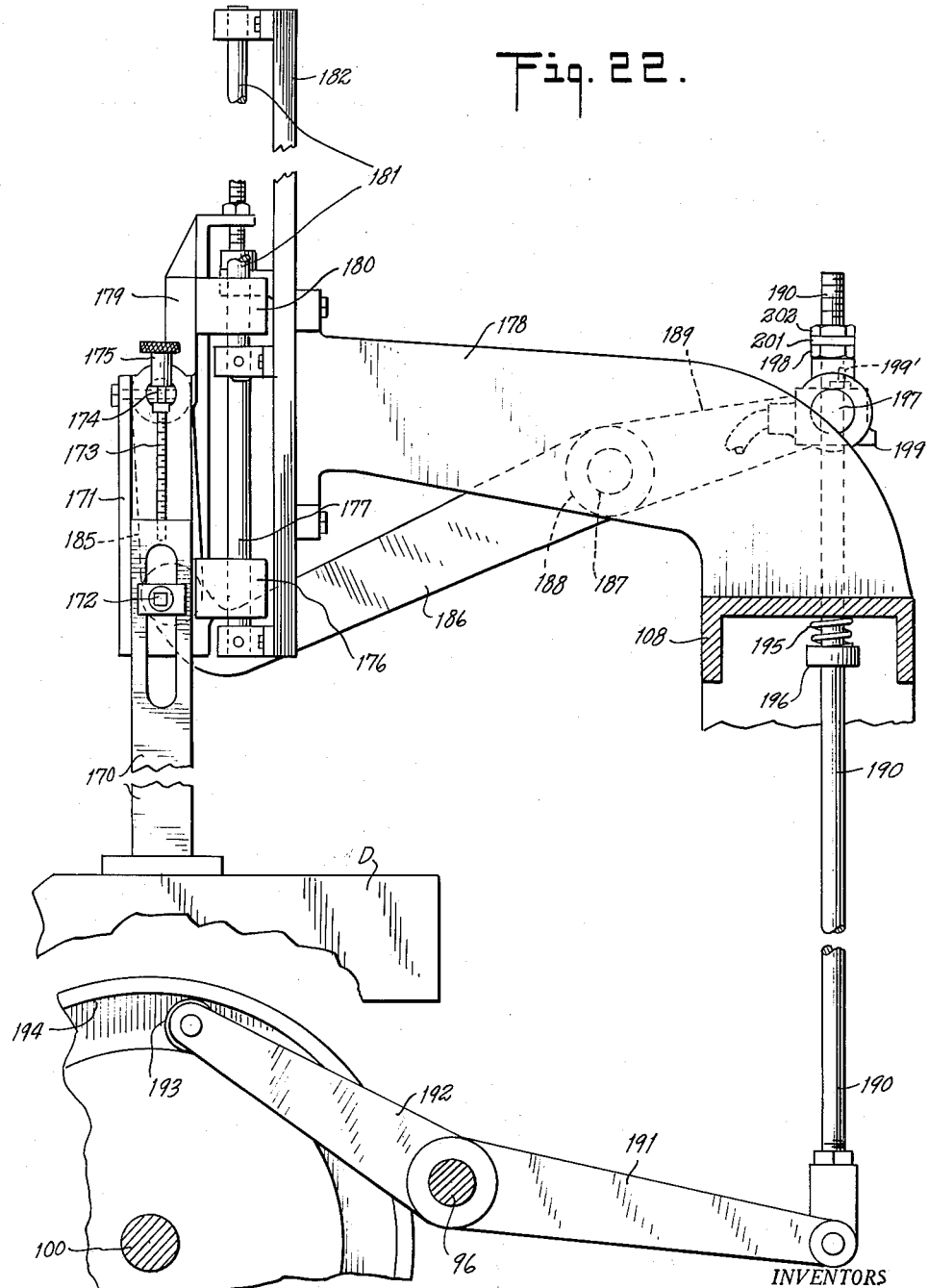

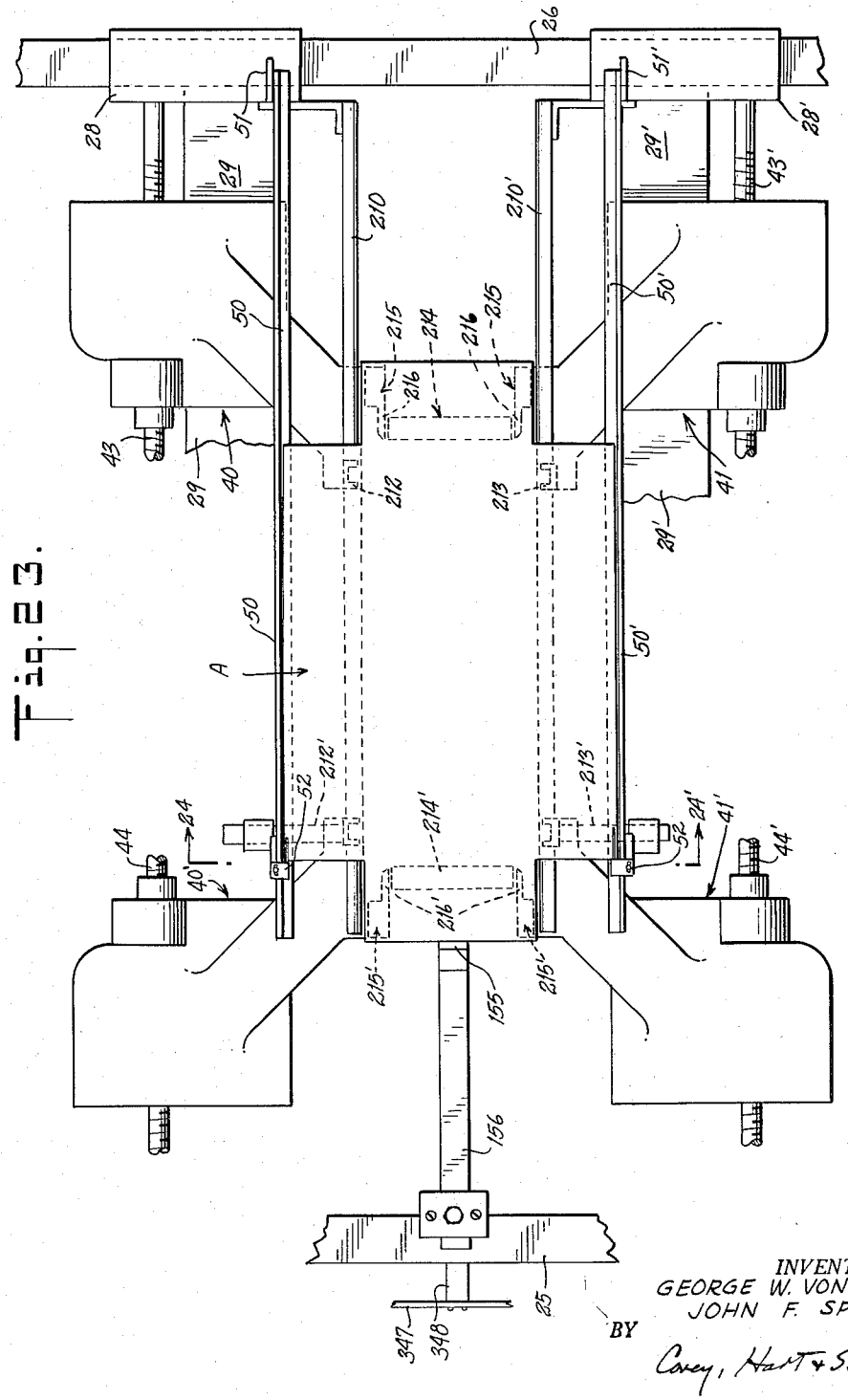

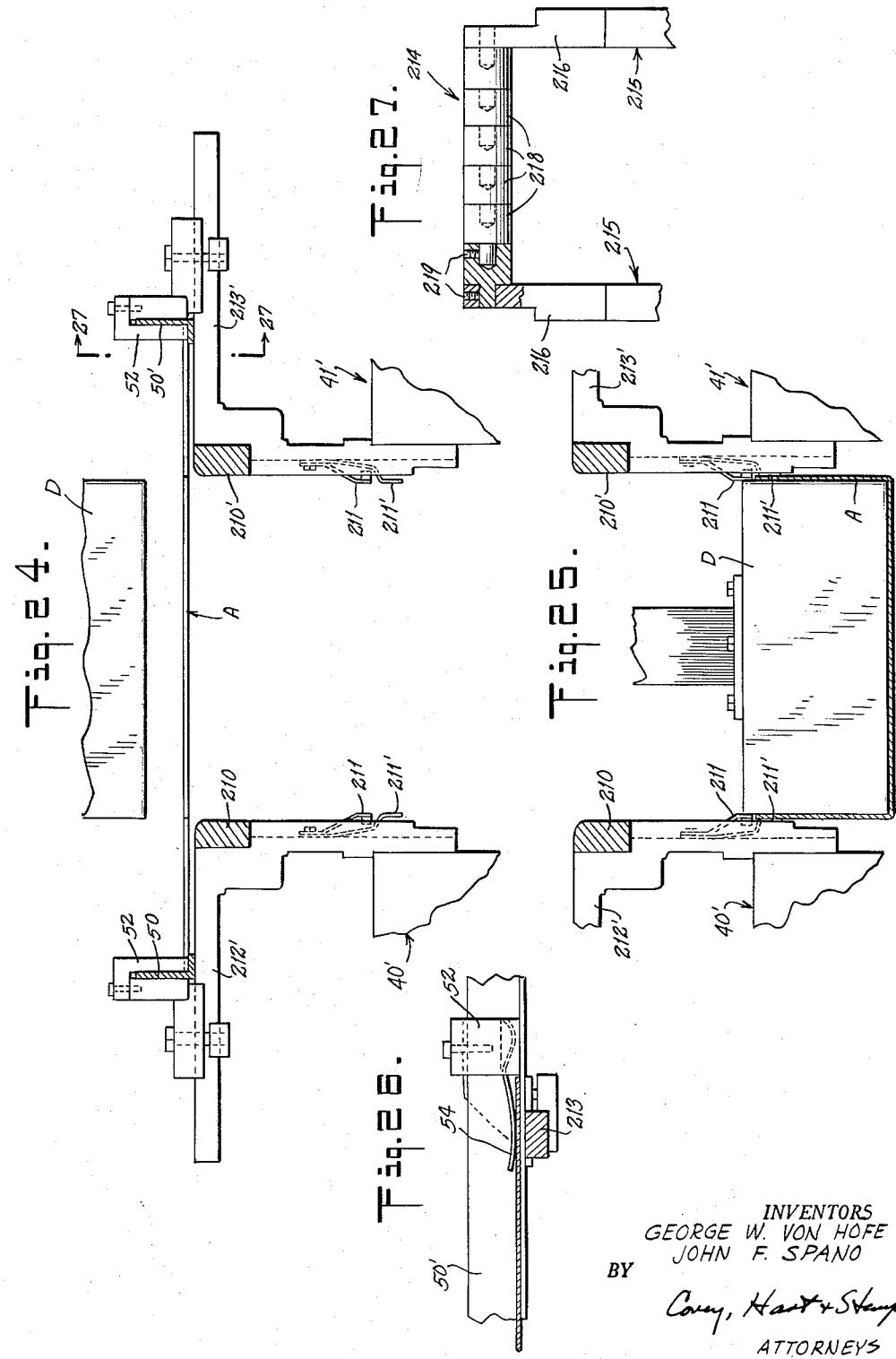

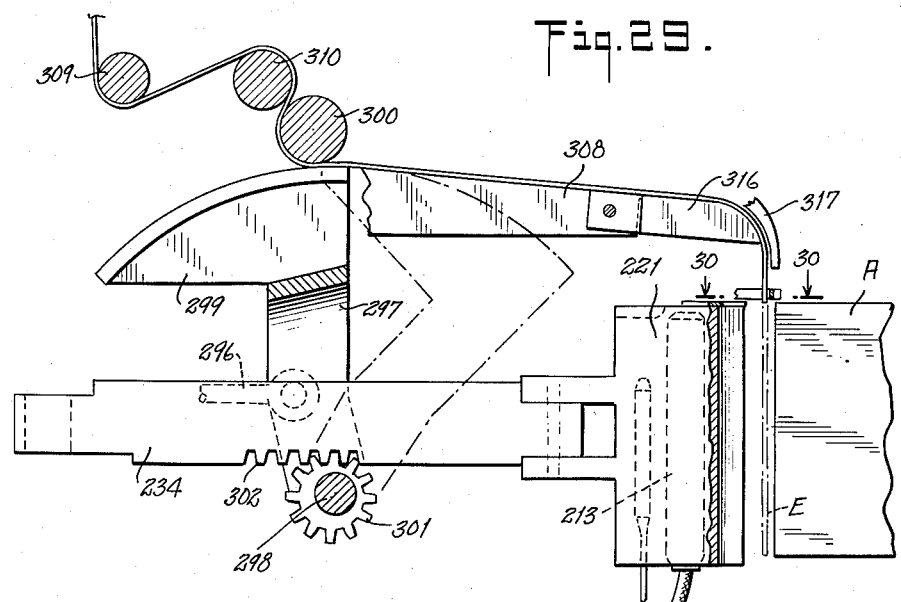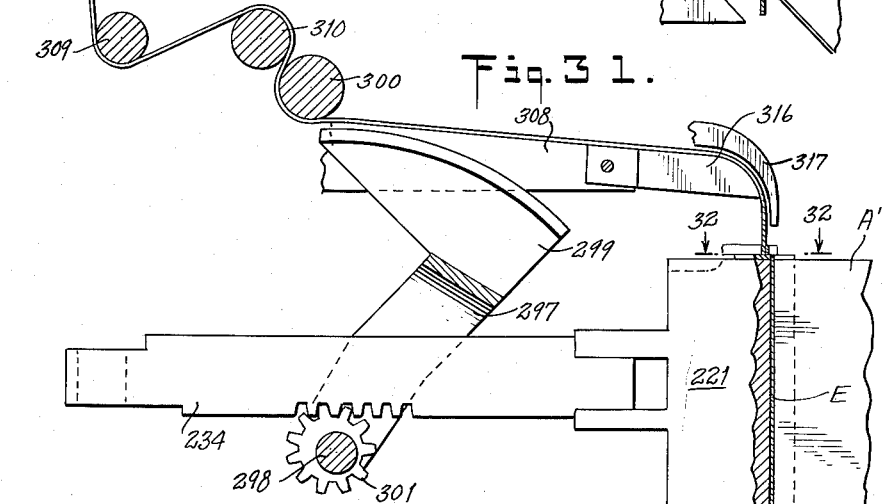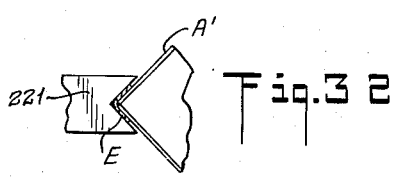

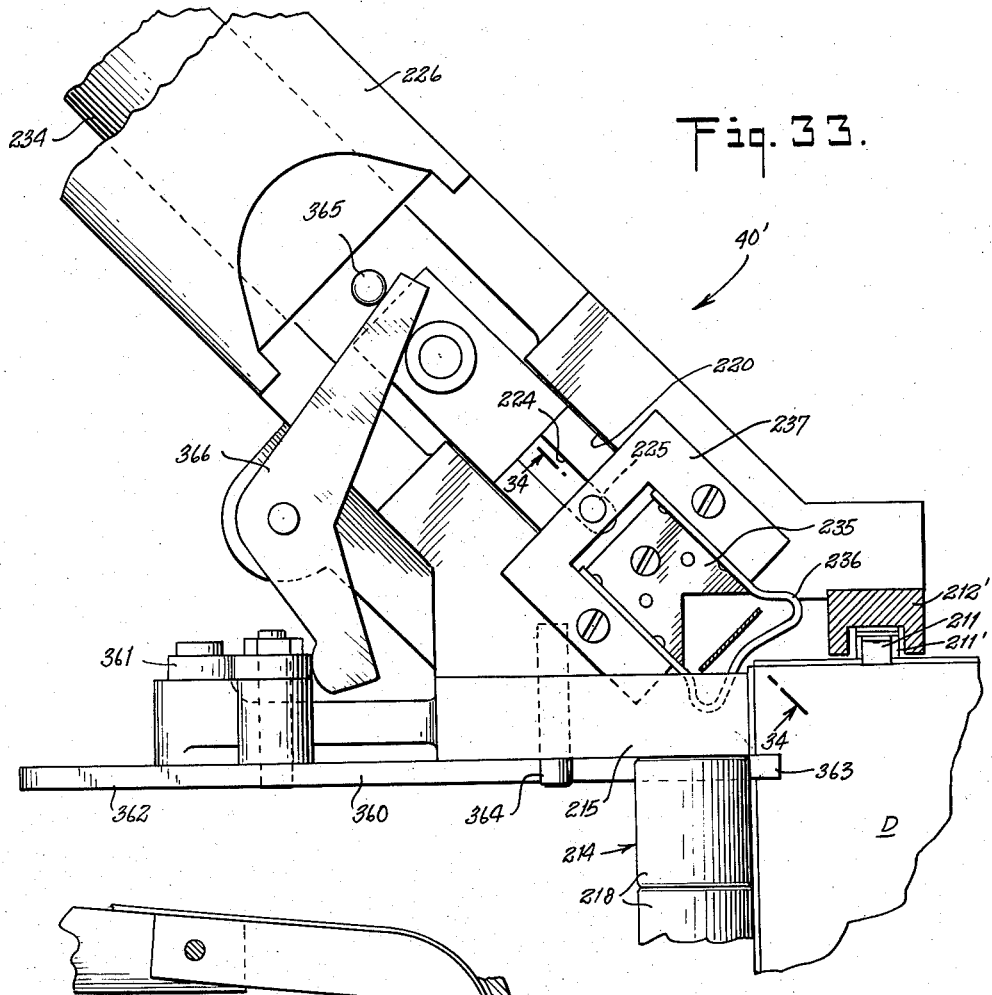
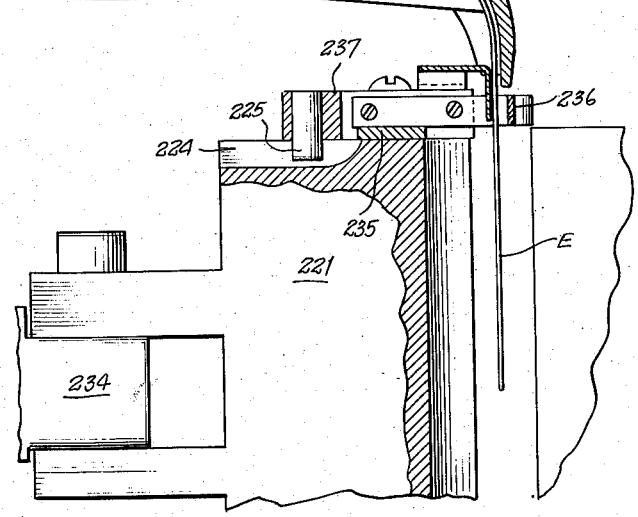

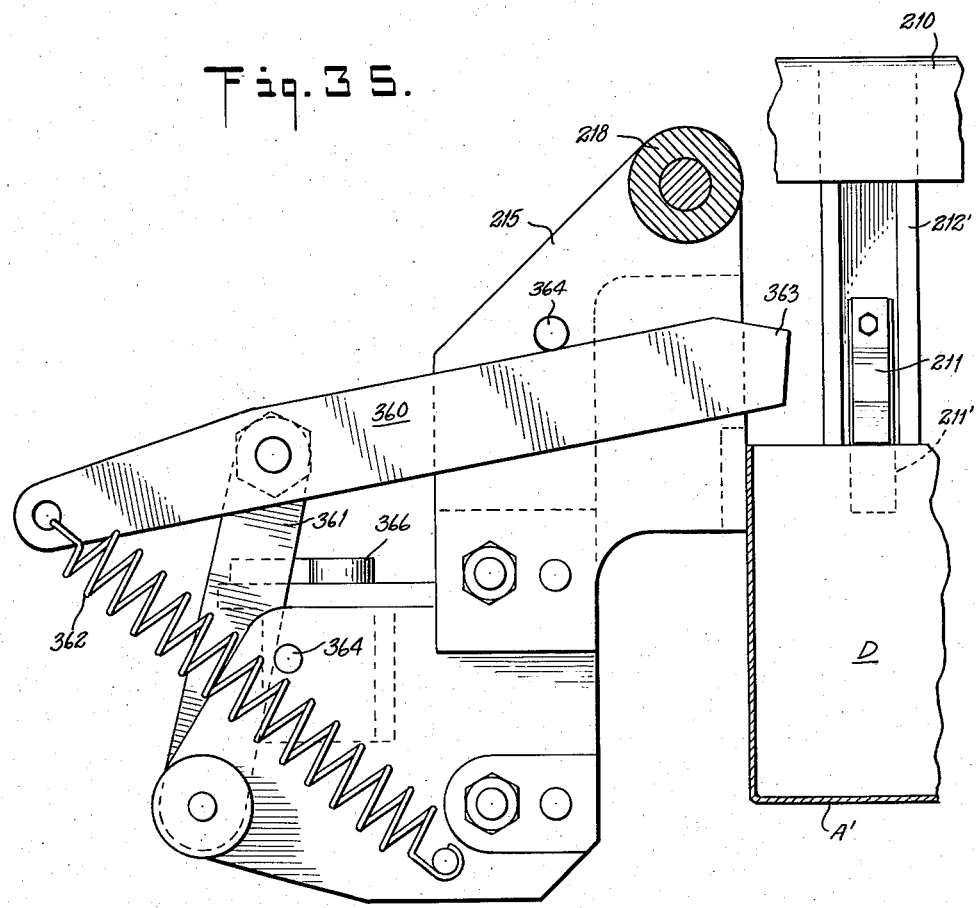
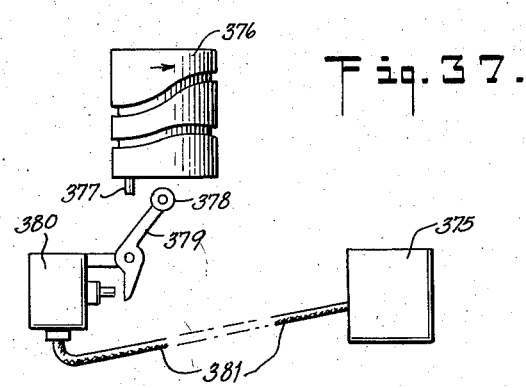

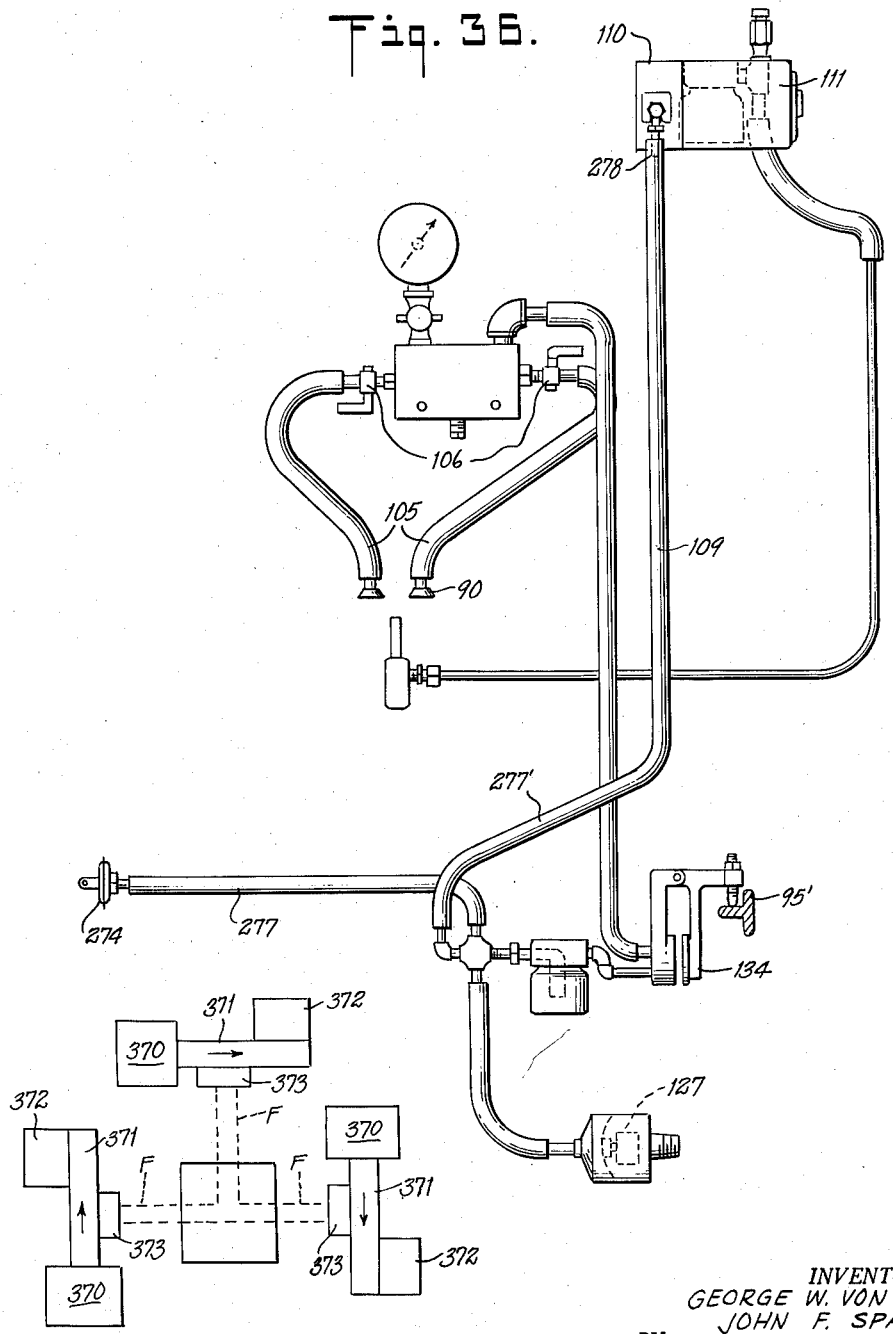

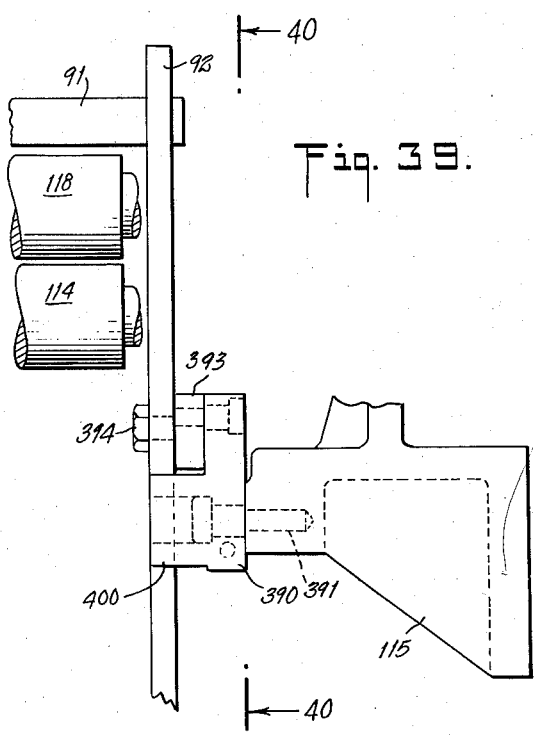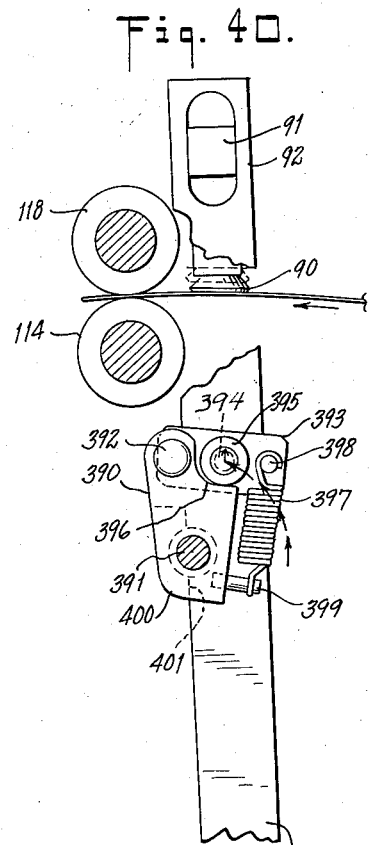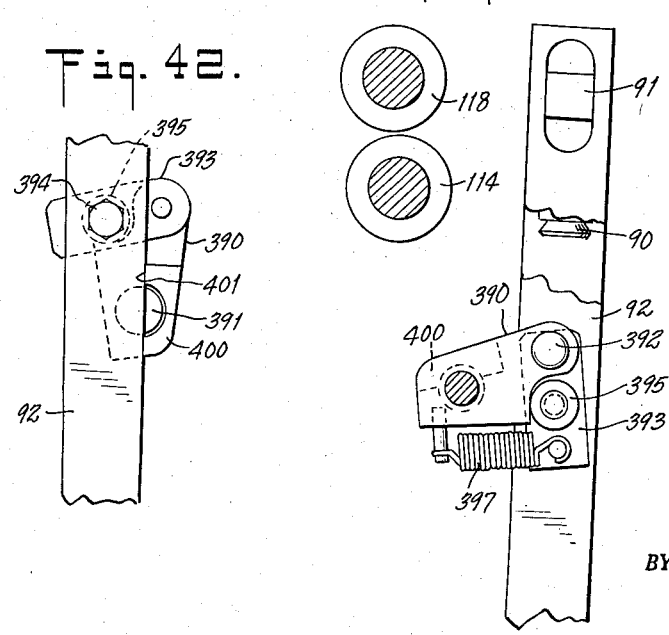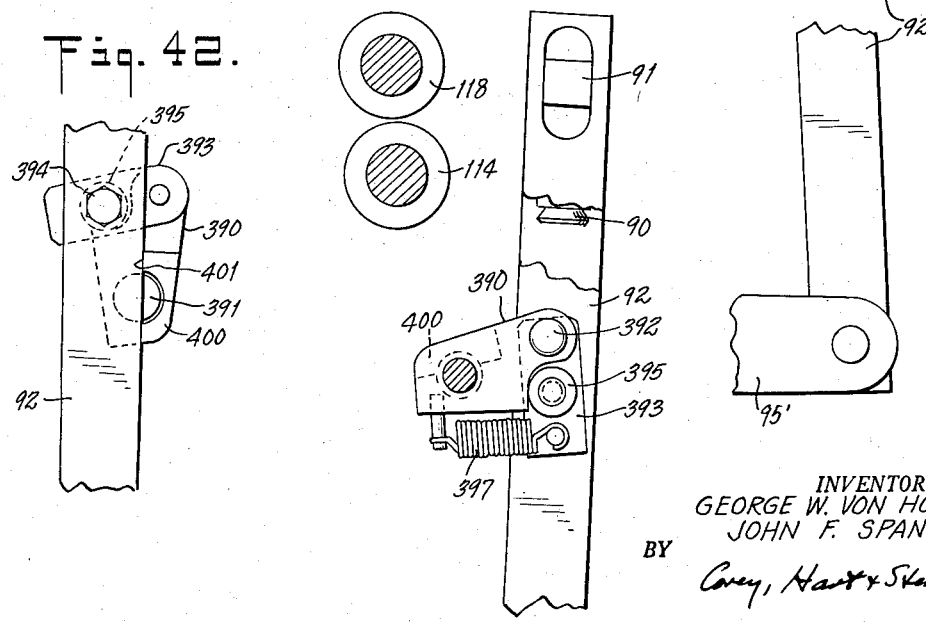

United States Patent Office 2,982,188
Patented May 2, 1961

2,982,188

BOX MAKING MACHINES

George W. von Hofe, Millington, and John F. Spano, Cresskill, N.J., assignors to New Jersey Machine Corporation, Hoboken, N.J., a corporation of New Jersey Filed Apr. 26, 1957, Ser. No. 655,214

88 Claims. (Cl. 93—41)

This invention relates to paper box forming machines and has for its primary object the provision of an improved and wholly automatic machine for setting up flat box blanks into box form, simultaneously applying stay strips to all four corners thereof, and discharging the completed boxes therefrom.

Another object of the invention is to provide an improved box making machine which can be readied for manufacturing boxes of widely varying sizes with a minimum of adjustment so that relatively little time is lost in changeovers.

A further object of the invention is to provide a box making machine capable of ejecting stayed box blanks in any one of three directions, thereby enhancing the flexibleness of this type of machine by making it possible to readily couple the same to any one of three different lines of operations for the manufacture of boxes and trays of different sizes.

A still further object of the invention is to provide an improved box making machine which is relatively simple in construction and in which the parts thereof are readily accessible in the event of jam and for adjustment, maintenance and replacement.

A particular object of the invention is to provide in an improved machine of this type completely reorganized stay feeding and applying devices which may be readily adjusted for different sized boxes without changing their connections with the driving parts therefor.

Another particular object is to provide in a box making machine, improved wholly automatic means for feeding the blanks and forming them into boxes and for controlling the stay feeding means in the event of failure of the blank feeding means.

A further particular object is to provide in a box making machine, improved mechanism for feeding stay strips coated with thermoactivatable adhesive material and so constructed that the stay feeding parts thereof will remain at substantially room temperature during the opereration of the machine to prevent preactivation of the adhesive material on the stay strips.

A still further particular object of the invention is to provide in a box making machine, improved stay mechanism capable of handling wide ranges of stay material both as regards thickness and types of adhesive coating and particularly stay mechanism capable of successfully handling stock stay material of any weight supplied to the trade and applying such material to box corners in lengths ranging from short length to a length corresponding to the depth of the largest box capable of being manufactured by the machine.

Other objects as well as the novel features of construction and the advantages thereof, will appear from the following description when read in connection with the accompanying drawings which show an illustrative embodiment of the invention and in which Fig. 1 is a perspective view showing a box staying machine made in accordance with the invention, the view looking toward the front and a side of the machine, and some of the parts of the machine shown being eliminated and one of the frame members thereof being broken away to present a clearer illustration of the construction of the machine;

Fig. 2 is a perspective view of the upper rear portion of the machine shown in Fig. 1;

Fig. 3 is a perspective view looking down through a side of the machine at the stay feeding and forming mechanisms;

Fig. 4 is a perspective view illustrating a type of box that may be stayed on the machine of this invention;

Fig. 5 is a perspective view somewhat similar to Fig. 3 and illustrates the cam mechanism which is located below the stay feeding and forming mechanisms and which controls the several operating mechanisms of the machine;

Fig. 7 is a side elevational view, partly in section and partly broken away, showing in greater detail the mechanism which controls the stay feed;

Fig. 8 is a top plan view looking along the line 8—8 of Fig. 7;

Fig. 11 is a vertical sectional view of the mechanism for feeding the box blanks to the machine;

Fig. 12 is a sectional view taken the line 12—12 of Fig. 11;

Fig. 13 is a longitudinal vertical sectional view showing the box crimping mechanism and the means for actuating the same;

Fig. 14 is an elevational view showing in enlarged detail the means for feeding the box blanks to the box forming mechanism;

Fig. 15 is a sectional view taken along the line 15—15 of Fig. 14;

Fig. 16 is a longitudinal vertical sectional view showing the mechanism which feeds the box blanks forwardly and which positions such blanks in proper relation to the box forming member;

Fig. 17 is a longitudinal vertical sectional view showing the means for actuating a portion of the blank feeding means;

Fig. 18 is a sectional view taken along the line 18—18 of Fig. 17;

Fig. 19 is a horizontal section showing in plan view the means for supporting the box staying devices;

Fig. 20 is a vertical sectional view taken along the line 20—20 of Fig. 19;

Fig. 21 is a sectional view taken along the line 21—21 of Fig. 20;

Fig. 22 is a side elevational view, partly broken away and in section, and showing in enlarged detail, the mechanism for operating the box forming device;

Fig. 23 is a horizontal section showing in plan view the relation of the blank supporting and box forming mechanism to the blocks supporting the stay feeding devices;

Fig. 24 is a vertical sectional view taken along the line 24—24 of Fig. 23 and showing the box forming and holding mechanism, the forming block being shown in position to advance and form a blank into box form;

Fig. 25 is a similar view showing the forming block in an advanced position;

Fig. 26 is an enlarged detailed view of a portion of one of the blank registering means;

Fig. 27 is a view taken along the line 27—27 of Fig. 24;

Fig. 29 is a view similar to Fig. 28, but omitting many of the parts to illustrate more clearly the manner in which a section of stay is fed to a box on the forming block;

Fig. 30 is a detail looking along the line 30—30 of Fig. 29;

Fig. 31 is a view similar to Fig. 29, but showing the relation of the parts at the moment a piece of stay material is applied to the corner of the box;

Fig. 32 is a detail looking along the line 32—32 of Fig. 31;

Fig. 33 is a top plan view of the working end of the stay applying mechanism and showing the relation of the parts just prior to the cutting and applying of a stay strip to a corner of the box;

Fig. 34 is a vertical sectional view taken along the line 34—34 of Fig. 33;

Fig. 35 is a side elevational view of a part of the mechanism shown in Fig. 33 and showing more clearly the elements which control the discharge of a box from the forming block;

Fig. 36 is a schematic view showing the air system of the machine;

Fig. 37 is a schematic view illustrating the manner in which the staying machine is controlled by the wrapping machine;

Fig. 38 is a schematic view illustrating how the machine of this invention may be arranged with relation to other box making units;

Fig. 39 is a rear elevational view of a portion of a modified form of mechanism for actuating the blank feeding device and showing embodied in such mechanism a novel compound lever construction;

Fig. 40 is a side elevational view of such blank feeding mechanism, the view being taken along the line 40—40 of Fig. 39, being partly in section and showing the relation of the parts in an advanced position of the mechanism;

Fig. 41 is a view similar to Fig. 40 and shows the relation of the compound lever parts when the mechanism is in a retracted condition; and Fig. 42 is a side elevational view of the composed lever construction when viewed from the back of Fig. 40.

Figure 1:
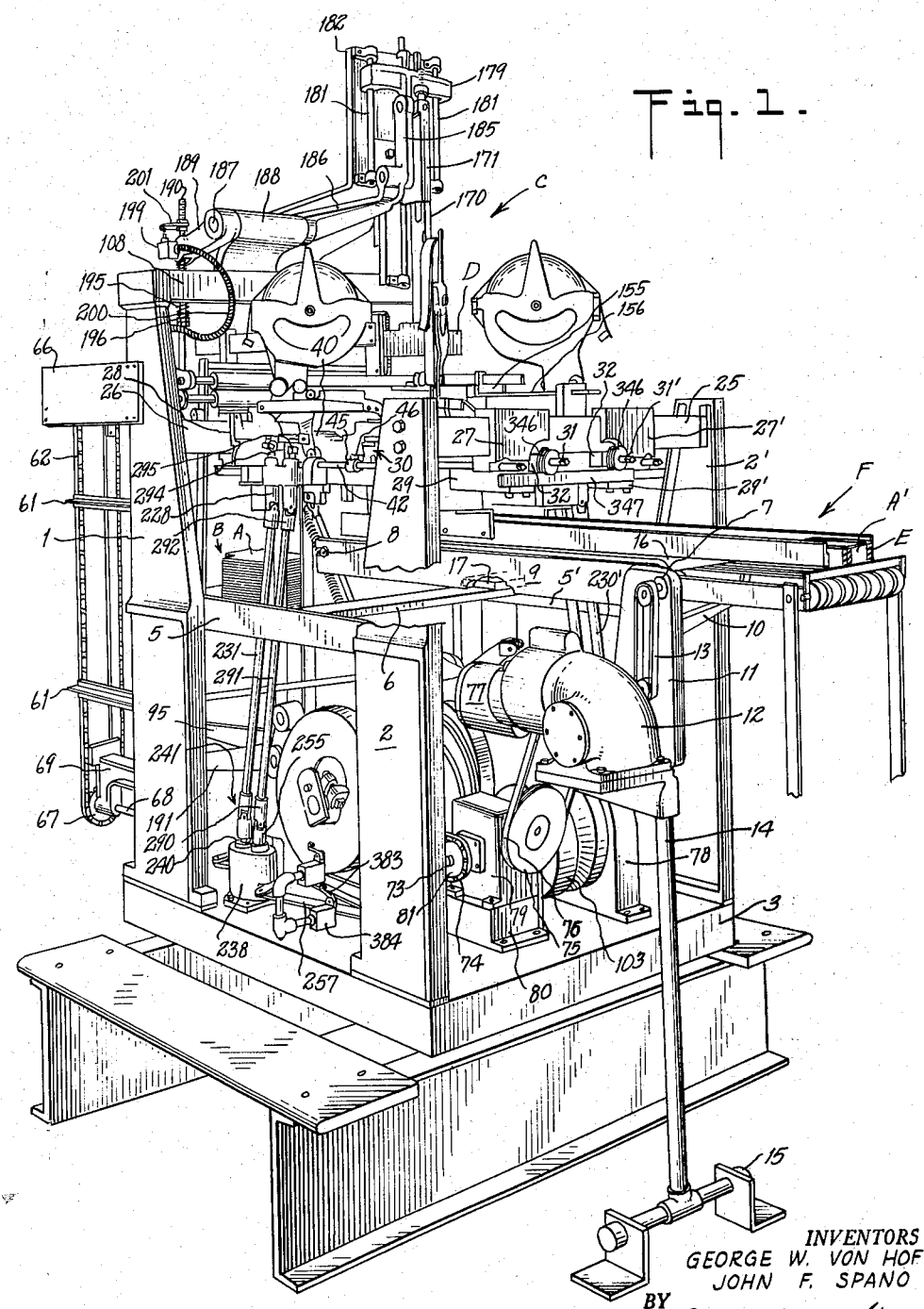

The machine illustrated in the drawings manufactures rectangularly-shaped boxes or trays from blanks A which are cornered and scored and which are fed successively from a pile or stack B of such blanks to a station C (compare Figs. 1, 2 and 3). As each blank A arrives at station C it is bent into box or tray form by the coaction of a block or form D and folding devices which bend the flanges of the blank up against the sides of the form D as the latter descends in its advancing stroke. The blank A being properly bent on the form D, stay strips E are then simultaneously applied to the four corners of the formed blank to secure together the abutting ends of the blank flanges forming such corners (note Fig. 4). The completed box A' is then stripped from form D and deposited on the belt of a conveyor unit F which transports the box out of the machine.

It will be noted from Figs. 1 and 2 of the drawings, that the frame of the machine comprises a pair of spaced rear standards 1, 1' and a pair of spaced front standards 2, 2'. The four standards stand upon and are secured by bolts to the corners of a rectangularly-shaped base or foundation 3. The area defined by the four standards is divided into a lower half and an upper half by a side bar 5 secured to standards 1 and 2, a side bar 5' secured to standards 1', 2' and a cross bar 6 secured at its ends to the central portions of side bars 5, 5'. The cross bar 6 extends in spaced relation below the folding and staying devices which are located in the upper half of the machine, and supports the inner end of the conveyor unit F. As is shown in Fig. 1 of the drawings, the conveyor unit F comprises a belt 16 which is supported on rolls 7, 8 and motion is imparted thereto through driven roll 7. Roll 8 is rotatably supported on the inner ends of a pair of parallelly arranged side bars 9 which are connected at their other ends to a U-shaped upper end 10 of a bracket 11. The driven roll 7 is rotatably supported by U-shaped end 10 and is drivingly connected by a belt 13 to a motor 12 supported by bracket 11. The bracket 11 is mounted on the upper end of rod 14 provided with a base 15 which sits upon the floor beyond the machine base 3. Connected to the lower edges of the side bars 9 is a transverse bar 17 which is located between the ends of belt 16 and pivotally connected, as by a bolt, to crossbar 6. It will be noted that by reason of the fact that the machine parts are mounted on two spaced pairs of spaced standards and are arranged on such standards so that the machine is open at the sides and front thereof, the conveyor unit F may be incorporated in the machine so that it will convey the finished boxes out through either side of the machine or through the front thereof. This enables the machine to be located relative to other machines constructed to operate on different sizes of boxes or trays so that it may readily be included in the chain of operation of any one of three lines of equipment. Thus, the machine of the invention may be located centrally of three machines constructed to wrap boxes or trays of different sizes, two of such wrapping machines being arranged on the sides of the instant machine and the third wrapping machine being positioned in front of the latter. With this arrangement, the instant machine may be connected by the conveyor unit F to either of the three wrapping machines depending upon the type of box or tray it was desired to make. It will be evident therefore that the instant machine is readily adaptable to small orders and short runs of a wide variety of boxes and trays. This frame construction also has the advantage that the various mechanisms embodied in the machine are readily accessible for purposes of setting or maintenance, as will hereinafter become more clear. As a result, the times required for resetting the machine in a changeover from one size box or tray to another size, or to repair or replace parts, or for correcting jam conditions which might arise in the operation of the machine, are substantially less than those ordinarily required in machines of this type.

The tops of the pair of front standards 2, 2' are approximately at the level of the folding and staying devices at station C in the machine and are connected by a fixed bar 25 bolted to such standards. A similar transverse bar 26 is fixedly secured to the rear standards 1, 1' at the same level as bar 25. These two fixed bars 25, 26 support the mechanism which bridge the space over the cross bar 6 and the conveyor unit F. As shown in Figs. 1–3 and 19 of the drawings, the fixed bar 25 has slidably mounted thereon a pair of slides 27, 27' and the fixed bar 26 has slidably mounted thereon a pair of slides 28, 28'. The slides 27, 28 are connected to the ends of a movable bar 29 to support the latter in depending relation on the fixed bars 25, 26. In a similar manner slides 27', 28' support the parallelly arranged movable bar 29' on the fixed bars 25, 26. Secured to and located approximately centrally on the bars 29, 29' in predetermined accurate position with respect to the forming block D, are brackets 30, 30', through which extend rods 31, 31', respectively. The rods 31, 31' are both slidable and rotatable with respect to their associated brackets. The ends of rods 31, 31' are rotatably supported in bearings 32 provided on the members connecting the ends of the movable bars to the slides, and adjacent to such bearings, are formed in the shape of pinions 33 (note Figs. 3 and 19). Secured to the fixed bars 25 and 26 are racks 34 which engage the pinions 33 on rods 31, 31' (note also Fig. 13). The front ends of rods 31, 31' extend forwardly of the slides 27, 27' and are nut-shaped so that a wrench or suitable hand crank may be utilized to rotate the same. It will be understood that when rods 31, 31' are rotated, they will travel along the four racks 34 on bars 25, 26 to cause the slides 27, 27', 28, 28' and consequently the movable bars 29, 29' to be slidably moved on the fixed bars 25, 26. The movable bars 29, 29' can thus be adjusted parallelly relative to each other to a position determined by the width of the box or tray to be made by the machine. When the bars 29, 29' are properly positioned, they are fixed with relation to the fixed bars 25, 26 by manually operable set screws 35 provided on the slides and engageable with the fixed bars 25, 26 when tightened.

Mounted on the movable bars 29, 29' and capable of movement longitudinally along the same, are four corner blocks on which are mounted the stay feed and stay applying mechanisms of the machine. It will be noted from Figs. 3, 19 and 23 of the drawings, that corner blocks 40, 40' are slidably mounted in spaced relation on movable bar 29 so that bracket 30 is located therebetween and that blocks 41, 41' are slidably mounted in spaced relation on movable bar 29' so that bracket 30' is located therebetween. The blocks are formed so that the rods 31, 31' extend therethrough, the blocks being thus slidable relative to such rods as well as the movable bars. The blocks are adjusted lengthwise of the movable bars 29, 29' by a pair of threaded rods or screws 42, 42'. Rod 42 includes a right-hand threaded section 43 which extends through and is in threaded engagement with block 40 and a left-hand threaded section 44 which extends through and is in threaded engagement with block 40'. The two sections are coupled together by a pin coupling 45 (note also Fig. 21) located between the lugs or projections 46 of bracket 30 which coact with such coupling to fix the position of rod 42 relative to bar 29 but permits rotational movement of such rod relative to bar 29. The ends of rod 42 are rotatably supported by bearings provided on the members connecting the ends of bar 29 with slides 27, 28 and the forward projecting end of rod 42 is nut-shaped so that it may be turned by a wrench or hand crank. It will thus be understood that as rod 42 is rotated it will cause blocks 40, 40' to slidably move toward or away from each other on rod 31 and bar 29 to positions controlled by the length of the box or tray to be manufactured. In the sliding movements thereof, the two blocks 40, 40', are maintained accurately centered with respect to the forming block D by the coupling 45 and the lugs 46 on bracket 30. In a similar fashion rod 42' is composed of a right-hand thread section 43' which extends through and is in threaded engagement with block 41 and a left-hand threaded section 44' which extends through and is in threaded engagement with block 41'. The two sections 43', 44' are connected together by a coupling 45' centered relative to the forming block D by lugs 46' provided on bracket 30'. Rod 42' is operated in a manner similar to that explained with respect to rod 42 to obtain proper adjustment of the corner blocks 41, 41' relative to the box or tray to be manufactured and to locate such blocks in accurate position relative to the forming block D. It will be noted also that by reason of the above described construction, the adjustments of rods 31, 31' which control the spacing between corner blocks 40, 40', 41 and corner blocks 40', 41', and the said adjustment of rods 42, 42' which control the spacing between corner blocks 40, 40' and 41, 41', may all be made from a central location at the front of the machine. Thus adjustments for any desired arrangement of the corner blocks supporting the stay feed and applying mechanism may be made readily at this easily accessible position.

Associated with the corner blocks 40, 40', and 41 and 41', are guide and supporting bars for holding a blank A in proper position to be bent into box form when the forming block D descends between such bars. As is shown in Figs. 3, 23 and 24, such guide and supporting bars include a pair of angle bars or rails 50, 50', each of which is adjustably supported at its front end on an associated corner block and at its rear end on a slide on bar 26. Rail 50 is supported by block 40' and slide 28, while rail 50' is supported by block 41' and slide 28'. The rails are connected to the blocks 40' and 41' by vertical bars 212' and 213' respectively (note also Fig. 19), the latter of which have adjustably secured thereto bracket members 52 formed at their ends to slidably hold the rails. The rails are adjustably connected at their rear ends to blocks 51, 51' mounted on slides 28, 28', respectively. Each rail has a horizontal edge on which the outer edge of a flange of the blank rests and a vertical edge which guides the blank in its advancing movement on the rails. It will be noted in Figs. 23 and 24 that the holding ends of bracket members 52 also function as stops to engage the leading ends of the side flanges of the blank and thereby properly register the blank with respect to the form D. As will hereinafter become more clear, bracket members 52, in effecting a proper registration of the blank for the forming operation, cooperate with a stop lug 155 (Fig. 23) which engages with the leading edge of the forward end flange of the blank after it has been deposited on the rails 50, 50', and a pusher 53 (Fig. 16) which engages with the rear edge of the rear end flange of the blank and pushes the blank into registration with the bracket members or stops 52 and the end stop 155.

The blank A is fed to the guide rails 50 from the stack or pile B by mechanism now to be described. As shown in Figs. 2, 11 and 12, the pile B of blanks is carried by a plate 60 whose sides are detachably supported by a pair of angle bars 61 each secured to a pair of vertically disposed chains 62. The chains are supported at the upper ends thereof by sprockets 63 which are secured to shafts 64 rotatably mounted on bearing brackets 65. The bearing brackets are provided on a pair of frame extensions 66, 66' supported by the standards 1, 1'. At their lower ends the chains pass over sprockets 67 mounted on shafts 68 which are rotatably supported by bearing brackets 69 mounted on the base 3 adjacent to the feet of the standards 1, 1'. The shafts 68 are provided at their inner ends with gears 70 that mesh with a pair of driving worm gears 71 provided on the ends of a transverse shaft 72 located at the rear of the machine. The shaft 72 is driven by a reducer shaft 73 located at the front of the machine (note Figs. 1, 5 and 6), through an electric clutch 126 (Fig. 12) which controls the connection of shaft 72 with one end of a chain 74 that is supported at its forward end by a sprocket 81 secured to shaft 73. The reducer shaft 73 is connected by the gearing of reducer 79 to a wheel 75 which is connected by a belt 76 to the drive shaft of a motor 77 located above such wheel (note Fig. 5). The motor is secured to a bracket provided on a standard 78 which is mounted on the base 3 between the front standards 2, 2' (note Figs. 1 and 6). The reducer 79 of which shaft 73 forms a part is mounted on a block 80 secured to base 3.

The blanks A are removed from the top of the stack on plate 60 by a suction mouthpiece 90 which is adjustably mounted on a transverse rod 91 supported on the upper ends of a pair of vertically disposed spaced rods 92 located between the frame extensions 66, 66' (note Figs. 2, 3 and 13). The rods 92, adjacent to the upper ends thereof, are pivotally supported at 93 on a pair of rearwardly extending arms 94 secured to the feed roll bearing brackets 115 mounted on the standards 1, 1' (note also Figs. 14 and 15). The lower ends of rods 92 are connected to the ends of lever arms 95, 95' secured to a transverse shaft 96 rotatably supported by frame members mounted on the base 3 of the machine. Lever arms 95, 95' are oscillated through shaft 96 by a forwardly extending lever arm 97 integral with lever arm 95' and carrying at its outer end a cam roller 98 which rides on the outer cam surface of a cam 99 mounted on cam shaft 100. Mounted on shaft 100 is a gear 101 (note Figs. 5 and 6) driven by a gear 102 secured to a shaft 73' aligned with and connected to reducer shaft 73 through a clutch 103. Shaft 73' is rotatably supported by bearings provided on the standard 78. As a result of this construction the arms 92 are periodically oscillated about pivots 93 during the operation of the machine to move the transverse rod 91 and mouthpiece 90 towards and away from the top of the stack B.

Suction is supplied to the mouthpiece 90 through a tube 105 connected to an adjustable valve 106 which is provided on a pipe 107 that is secured to a transverse beam 108 mounted on the upper ends of the rear frame members 1, 1' (note Fig. 2). The pipe 107 is connected by a tube and pipe assembly 109 to a suction unit 110 mounted on the beam 108. The suction unit 110 is directly coupled to the shaft of a motor 111 mounted on beam 108 adjacent to such unit. Motor 111 is also drivingly connected by a belt 112 to a pulley 113 secured to one end of a roll 114 rotatably supported by the fixed feed roll bearing brackets 115 (note Fig. 14). Roll 114 is connected by gears 116, 117 to a feed roll 118 rotatably supported by bearing brackets 115' pivotally carried by the brackets 115 and preferably spring biased to normally urge feed roll 18 towards a predetermined adjusted position with relation to feed roll 114. The arrangement is such that motor 111 constantly rotates rolls 114 and 118 in opposite directions so that a blank fed thereto by the mouthpiece 90 will pass rapidly between such rolls toward the front of the machine. A blank is fed to the rolls 114, 118 on the upward stroke of mouthpiece 90, the suction in the latter having an insufficient hold on the blank to prevent the rolls seizing the blank and feeding it forwardly when positioned therebetween. Almost simultaneously, means come into operation to open the vacuum line to the atmosphere. This means includes a valve member 134 controlled by the lever arm 95' and connected in the suction line represented by the pipe assembly 109 (note Fig. 36). Suction is created in mouthpiece 90 when it comes into engagement with the top of the stack. As the lever arm 95' reaches the end of its upward stroke it actuates the valve member 134 to connect the suction line with the atmosphere.

The blanks A are maintained in proper position in the stack B so that they will be fed properly by the mouthpiece 90 through the rolls 114, 118 to the operating mechanism of the machine by a pair of vertical guide rods 120 which are carried by the two slides 28, 28'. Thus as the slides are actuated to change the movable bars 29, 29' for a different width of box or tray, the guides 120, 120 are automatically adjusted simultaneously to coact with the different sized blank to be used in making the new box or tray. As shown in Fig. 2, the guides engage the corners of the end flange of the blank adjacent to the rolls 114, 118 to properly hold the stack of blanks relative to the suction mouthpiece 90. The notches formed by the end flange and the ends of the two side flanges of the blank on the other end of the stack of blanks are engaged by a pair of guides 122 adjustably mounted on a transverse rod 121. The rod 121 is supported in depending relation by a slide 123 adjustably mounted on a bar 124 extending lengthwise of the machine. The bar 124 is adjustably supported by a bracket 125 secured to the transverse beam 108. When in adjusted position, the bar is secured to the bracket 125 by a hand operated clamping knob 125' provided on such bracket.

As the stack on the plate 60 is depleted by the mouthpiece 90 during the operation of the machine, the chains 62 are actuated to raise the plate in a step-by-step fashion. As shown in Fig. 12 of the drawings, the shaft 72 driving such chains is provided with an electric clutch 126 which controls the connection of such shaft with the driving belt 74. The clutch 126 is controlled by the mouthpiece 90 through a vacuum controlled built-in microswitch 127 which is electrically connected to the clutch 126 and is included in the suction line represented by the pipe assembly 109 (note Fig. 36). The construction of the clutch 126 and switch 127 is such that when there is vacuum in the line, switch 127 is open and clutch 126 is disengaged. On the other hand, when there is no vacuum in the line, clutch 126 is in a condition to connect shaft 72 to the driving chain 74. The clutch 126 is also controlled by a micro switch 128 (note Figs. 13 and 16) that is actuated by an arm 129 mounted on a rod 92. In the reciprocal movement of rod 92, if the stack is low, the arm 129 will always engage and close switch 128 to close the circuit for clutch 126, because switch 127 is closed as a result of no suction in the line. On the other hand, if the top of the stack is within a predetermined range, the arm 129 will be prevented from closing switch 128 thus maintaining the circuit for clutch 126 open even though there is suction in the line and switch 127 is closed. The clutch 126 is further controlled by an arm 130 provided on rod 92 and engaged by the plate 60 when the latter is raised above a predetermined level. When this occurs, plate 60, through arm 130, will prevent the rod 92 from completing its downward stroke and thereby render the arm 129 unable to actuate switch 128. The switch 128 may be manually closed by actuating a knob 131 provided on a rod 132 movably supported on the chain guide bar 133 and operatively associated at its inner end with the switch 128.

The blank A fed forwardly by the rolls 114, 118 is ejected thereby onto the guide rails 50, 50'. During such movement of the blank, positioning mechanism comes into operation to insure accurate registration of the blank relative to the forming block C. As shown in Figs. 2 and 16 to 18 of the drawings, such positioning mechanism comprises a vertical rod 140 which is connected at its lower end to an arm of a cam lever 135 pivotally mounted on the lower end of the standard 1'. The other arm of lever 135 carries a cam roller 136 which rides on cam 137 secured to shaft 100. The rod 140 is provided at its upper end with a rack 141 that vertically reciprocates in a guide 142 pivotally connected to the underside of the crossbeam 108 to pivot about the longitudinal axis of shaft 144. The rack engages with a pinion 143 mounted on one end of the shaft 144 which is rotatably supported in depending relation by bearing brackets 145 secured to crossbeam 108. Mounted on the other end of shaft 144 is a sprocket 146 which engages with the lower run of a chain 147. Shaft 144 and sprocket 146 are connected to the drive pinion 143 through a clamping screw 138 which may be loosened to permit free rotational movement of sprocket 146 and the adjustment of the chain 147 with which such sprocket is engaged. Chain 147 is supported on the longitudinally extending vertically disposed plate or bar 124 by a pair of sprockets 148, 149 rotatably mounted on such plate at a fixed predetermined distance from each other. The upper run of chain 147 spans the distance between sprockets 148, 149 and is therefore, of fixed length. Bar 124 has connected thereto a depending vertically disposed section 150 on the lower end of which is rotatably mounted a sprocket 151 between which and the sprocket 149 extends a vertical leg of the chain 147. The lower run of the chain is composed of three portions, one portion of which extends from under sprocket 151 substantially horizontally to and under a sprocket 152 rotatably mounted on a stub shaft fixed to the frame of the machine. The second portion of such lower run extends upwardly and rearwardly from sprocket 152 to ride over the fixed sprocket 146, and the third portion thereof extends substantially horizontally from sprocket 146 to sprocket 148. Bar 124 and its depending portion 150 are adjustably carried by bracket 125 secured to beam 108 so that they may be shifted longitudinally to correctly position the lower run of the chain relative to the box or tray being made. Inasmuch as sprockets 148, 149 and 151 are movable with bar 124 and its portion 150 in adjustments of the latter, they are moxable relative to fixed sprockets 152 and 146. In any adjustment of the movable sprockets therefore, the lengths of the lower horizontal run portions will vary proportionately so that the length of the lower run of the chain from sprocket 151 to sprocket 146, can be varied to adjust for a relatively wide range in lengths of boxes or trays without requiring any change in the tension of the chain itself. In the operation of the machine, as sprocket 146 is rotated alternately in one direction and then the other, as the rack 141 is reciprocated vertically, the section of chain between sprockets 146 and 151 will advance and retract alternately. Secured to such chain section is a lug 154, which during each reciprocation of the chain in each cycle of the machine, will advance to a position beneath sprocket 151 and then retract to a position adjacent to sprocket 146. As the lug travels from sprocket 152 to sprocket 146 in its retracting movement, it will be lifted or moved up out of the path of feed of a blank ejected by the rolls 114, 118 to a position above the roll 118. This upward movement of the lug is accomplished while the mouthpiece 90 is feeding a blank to the rollers 114, 118. The arrangement and timing of the mechanisms is such that when a blank A is advanced by rollers 114, 118 onto the guides 50, the lug 154 will be dwelling in its predetermined uppermost position and will be at rest so that the portion of the chain between sprockets 151, 152 will act as a top guide for the blank in its advancing movement. Upon this advance of the blank A, the chain 147 is then advanced to move the lug 154 downwardly into engagement with the rear edge of the blank between the guides 50 and to thus positively continue the advancement of the blank until the leading edges of the latter comes into engagement with the stop lug 155 and the holding ends of the bracket members 52, as has previously been explained. The stop lug 155 is provided on the inner end of an arm 156 adjustably secured to the fixed bar 25 (note Fig. 19). In order that the described feeding operation by lug 154 may be accomplished, the parts are so designed that lug 154 travels downwardly into the path of feed of the blank in a following position as the blank is advanced under the compulsion of the rolls 114, 118. The lug 154 will pause in its advanced position, coacting with stop lug 155 and bracket members 52 to hold the blank A on guides 50 in proper registration relative to the forming block D until the latter strikes the blank to form it into a box.

The forming block or box form D is secured to the lower end of a vertical plunger rod 170 (note Fig. 1), the upper end of which is slidably received in a flanged plunger head 171 and adjustably secured in position thereon. As shown more clearly in Fig. 22, the upper end of rod 170 is provided with a slot through which extends a bolt 172 that secures the rod in adjusted position relative to the head. Fine vertical adjustments of rod 170 relative to head 171 are accomplished by a screw 173 which is in threaded engagement with the upper end of rod 170 and is supported by a stud 174 on head 171. The upper end of screw 173 is provided with a knurled hand nut 175 which may be manipulated to adjust rod 170 when bolt 172 is loosened. The head 171 is provided with a slide 176 which receives a vertical guide bar 177 mounted on the outer end of an arm or frame piece 178 secured to the top of the transverse beam 108 supported by the standards 1, 1'. The plunger head 171 is also provided with an integral cross piece 179 provided with vertical openings at its outer ends 180 to sildably receive the vertical guide bars 181 provided on the vertical bracket frame 182 secured to the outer end of the arm 178. It will be noted that as a result of this construction the forming block D is suspended for vertical reciprocal movement from one side of the machine only, thereby leaving the remaining three sides of the machine open for easy access thereto and to enable the discharge conveyor unit F to be located in any one of the three positions previously mentioned.

The plunger head 171 has pivotally connected to its upper end the upper end of a parallelly arranged link 185 (note Fig. 1) whose lower end is connected to the outer end of a lever arm 186 secured to one end of a pin 187 pivotally supported by a bearing bracket 188 mounted on the transverse beam 108. The other end of pin 187 has secured thereto a lever arm 189 which extends rearwardly and is connected at its outer end to the upper end of an actuating rod 190. The rod 190 extends downwardly through an opening in beam 108 and in rear of fixed beam 26 to an arm 191 of a rock lever rotatably mounted on shaft 96. The other arm 192 of the rock lever is provided with a roller 193 which engages the closed track of a cam 194 mounted on the cam shaft 100. Thus as cam 194 is rotated, the arm 191 of the rock lever will vertically reciprocate the rod 190 up and down during each cycle of the machine. On the upward movement of rod 190 lever arms 189, 186 are actuated to advance the forming block D toward a blank resting in registered position on the guide rails 50 and to form such blank into box form. It will be noted in Figs. 1, 2 and 22 that the connection between the actuating rod 190 and arm 189 is a resilient connection accomplished through a spring 195 encircling rod 190 and seated at its lower end on a nut 196 threadedly engaged with the rod and adjustable to vary the tension in spring 195 without disturbing the relation of rod 190 to lever arm 189 and forming block D. The upper end of spring 195 bears against a cross pin 197 provided on the outer end of lever arm 189 and through which the upper end of rod 190 slidably extends. The upper end of rod 190 is threaded and is threadedly engaged by a nut 198 adjustable to vary the position of arm 189 and consequently forming block D relative to the rod 190. It will thus be seen that the forming block D in its box forming operation is driven by the spring 195 which is under predetermined tension. Mounted on the outer end of arm 189 is a switch 199 connected by a cable 200 to the electrical circuit of the machine so that it does not interfere with the normal operation of the machine. When however, switch 199 is actuated while the rod 190 is advancing the forming block D to form a box, the machine is immediately stopped in its advancing movement. The arrangement may be such that the machine is reversed electrically to instantly impart a reverse motion to rod 190 to lift the block D, and when the latter is raised to its retracted position, the machine is then automatically stopped. Preferably however, the machine is immediately automatically stopped with the forming block D remaining in its advanced position so that it will be necessary that the obstruction or jam be taken care of before the forming block is again moved. Such actuation of switch 199 is accomplished by an arm 201 secured to ¬od 190 by nuts 198, 202 and located so as to trip the switch when the compressive force exerted on spring 195 during the upward movement of rod 190 goes beyond a predetermined limit. Thus, if the forming block D should fail to properly fold a blank A in its downward movement, due to the fact that such blank is incorrectly registered therewith, the increased pressure which would be needed to force such blank through the folding rods is immediately transmitted to the spring and causes arm 201 to trip the switch 199 to cause the immediate stoppage of forming block D, as previously explained. When this occurs the machine must be started again by the operator who will have observed what caused the machine to stop. Arm 201 may be adjusted relative to the switch 199 by manipulation of the adjusting screw 203 mounted on the arm 201 and engaging with the actuating plunger 199' of the switch.

In the downward movement of the forming block D, the body of the registered blank A is driven down between a plurality of forming or breaker bars 210, 210' which fold the side flanges of the blank up against the sides of the block (note Figs. 23 to 25). The block D drives the blank through the bars 210, 210' to a position where the tops and sides of the side flanges thereof are engaged by four pairs of fingers 211, 211', two pairs thereof being on each side of the block D. The fingers 211 which engage the tops of the box side flanges are stripping fingers which strip the finished box from the form D on the next upward movement of the latter. The fingers 211' of each pair are holding fingers which hold the side flanges up against the sides of the form D during the staying operation. Also when the form D is retracted, the fingers 211' hold the box in suspended position until the crimper bars or blades 320, 321 (see Figs. 19 and 20) operate on the bottom folds of the side flanges of the box in a manner that will be hereinafter more fully explained. The breaker bars 210, 210', are slidably mounted at their front ends on upright bars 212', 213' provided on corner blocks 40', 41' respectively, (note Fig. 23). It will thus be understood that the spring between the folding or breaker bars 210, 210' will be automatically varied to the proper extent and with the corner blocks 40', 41' when the latter are adjusted for width of a box or tray. Further, by reason of their slidable connection with the bars 212', 213' on such blocks, the breaker bars 210, 210' will be automatically adjusted relative thereto when the corner blocks are adjusted longitudinally for different lengths of boxes or trays. It will be noted from Fig. 23 of the drawings, that the breaker bars at their rear ends are also supported by and secured to the slides 28, 28', respectively, so that they move with such slides in adjustments of the corner blocks for box widths. By securing the rear ends of the breaker bars to the slides in this manner, the breaker bars are maintained in proper registry with relation to the feeding rolls and the forming block during adjustments of the corner blocks, and the breaker bars are not adjusted longitudinally with longitudinal adjustments of the corner blocks. The holding fingers 211, 211' are adjustably mounted in the channels formed in the bars 212, 212' 213, 213'.

The ends of the blanks are folded up against the forming block D in the downward movement of the latter by a pair of end folding members 214, 214' provided at each end of the block D. As shown in Figs. 23 and 29 of the drawings, such end folding members are secured to the ends of plates 215, 215', respectively, provided on the corner blocks 40, 41 and 40', 41', respectively. The members 214, 214' are located so that they come into engagement with the end flanges of the box before the side flanges thereof come into engagement with the fingers 211, 211'. The plates 215, 215' have extensions 216, 216', respectively, providing holding edges for holding the end flanges of the box up against the form D after the box passes below the members 214, 214' in the downward movement of such form and during the application of the stay strips to the folded box. The extensions 216, 216' are so formed that they do not interfere with the operation of the stay applying means in applying strips of stay material to the box. As is shown more clearly in Fig. 27, the members 214, 214' are each composed of a plurality of segments 218 which may be increased or decreased in number for varying widths of boxes or trays. The members 218 have interengaging male and female ends by which they may be interengaged in an endwise fashion and are secured to the plates 215, 215' and to each other by set screws 219.

The stay strips E are simultaneously applied to the four corners of the folded box on the forming block D by four stay pressers mounted on the corner blocks 40, 40', 41 and 41'. As shown more clearly in Figs. 3, 19 and 33, the corner blocks are provided with guideways 220 which are arranged diagonally to the forming block D. The corner blocks are adjusted in the manner previously explained so that the longitudinal axes of such guideways will exactly bisect the corner angles of block D and of the box which has been folded thereon. Slidably mounted in the guideways 220 of corner blocks 40, 40', are the heads 221, 221', respectively, of the pressers associated with such blocks (note Figs. 28–34). In a similar manner presser heads 222, 222' are slidably mounted in the guideways 220 of corner blocks 41, 41', respectively (note Fig. 3). The presser heads are each formed with the usual dihedral angle to receive a corner of the box and are each provided with an electric type heating element 213 to maintain the head at the operating temperature range necessary for activating the thermoplastic adhesive coatings on the stay strips E. The presser heads also each have on their top ends a pin guideway 224 (note Figs. 33 and 34) which slidably receives a fixed pin 225 provided on the stationary knife bracket 237 secured to its associated corner block. Because of this pin guideway arrangement, the head is confined in a vertical plane to hold it square with relation to the stationary cutting knife during the cutting operation and to guide it accurately towards the surfaces of the box corner with which it engages (note Fig. 32). The pin 225 and guideway 224 become disengaged just before the head comes into engagement with the box corner on which it is to apply the strip of stay material. Thus the presser is enabled to find itself should the corner be slightly off the vertical. As a result, accurate conformation of the working end of the head to the surfaces of the engaged box corner is effected and the presser parts are subjected to equal pressures in the operations of the same.

Each presser head is provided with a pair of lugs by which it is connected to an elongated shank member 234 which extends through a longitudinal housing or sleeve 226 formed on its associated corner block. Shank member 234 is pivotally connected at its outer projecting end to an arm 227 that is clamped to the upper end of a vertically disposed coupling member 228 (note Fig. 3). The connection between member 234 and arm 227 comprises a cylindrically-shaped stud 216 that is adjustably clamped in the split end of member 234 and is maintained in adjusted position on such member by a collar screw 217 in Fig. 3. The stud 216 is provided at its lower end with a depending eccentric reduced portion on which is mounted a ball bearing 218 that is contained in the U-shaped end of arm 227. The upper end of stud 216 is nut-shaped to enable it to be rotated by a tool when screw 217 is backed out, thereby adjusting the position of member 234 relative to arm 227 to advance or retract the presser head to a desired adjusted position. The coupling member 228 is rotatably supported in a bearing 229 formed on the associated corner block and is joined by a universal connection to the upper end of an actuating shaft, such as the actuating shaft 231, shown in Fig. 1 of the drawings. There are four such actuating shafts which are indicated by the numerals 230, 230', 231, 231' in Figs. 1 and 19 of the drawings. The actuating shafts 230, 230' are operatively connected in the manner described to pressure heads 221, 221', respectively, and actuating shafts 231, 231' are operatively connected to pressure heads 222, 222', respectively. It will be understood that as the actuating shafts are reciprocally rotated, the reciprocal rotational movement imparted to coupling members 228 and arms 227 will cause the associated pressure heads to be advanced and retracted toward and away from the box on form block D. During the advancing movement of each pressure head, a knife 235 mounted thereon and having a V-shaped cutting edge conforming with the right dihedral angle working surfaces of the presser head, will coact with a stationary knife 236 to cut a stray strip from a length of tape fed between the presser head and the box corner (note Figs. 30, 33 and 34). As previously mentioned, the stationary knife 236 is mounted on a stationary knife bracket 237 provided on the associated corner block. The knife 236 is constituted of a looped strip of tool steel through which the stay tape is fed and bent to form a forward V-shaped cutting edge having an angle greater than the angle of the cutting edge in movable knife 235 so that the two knives cut the stray strip with a shearing action.

Figure 6:
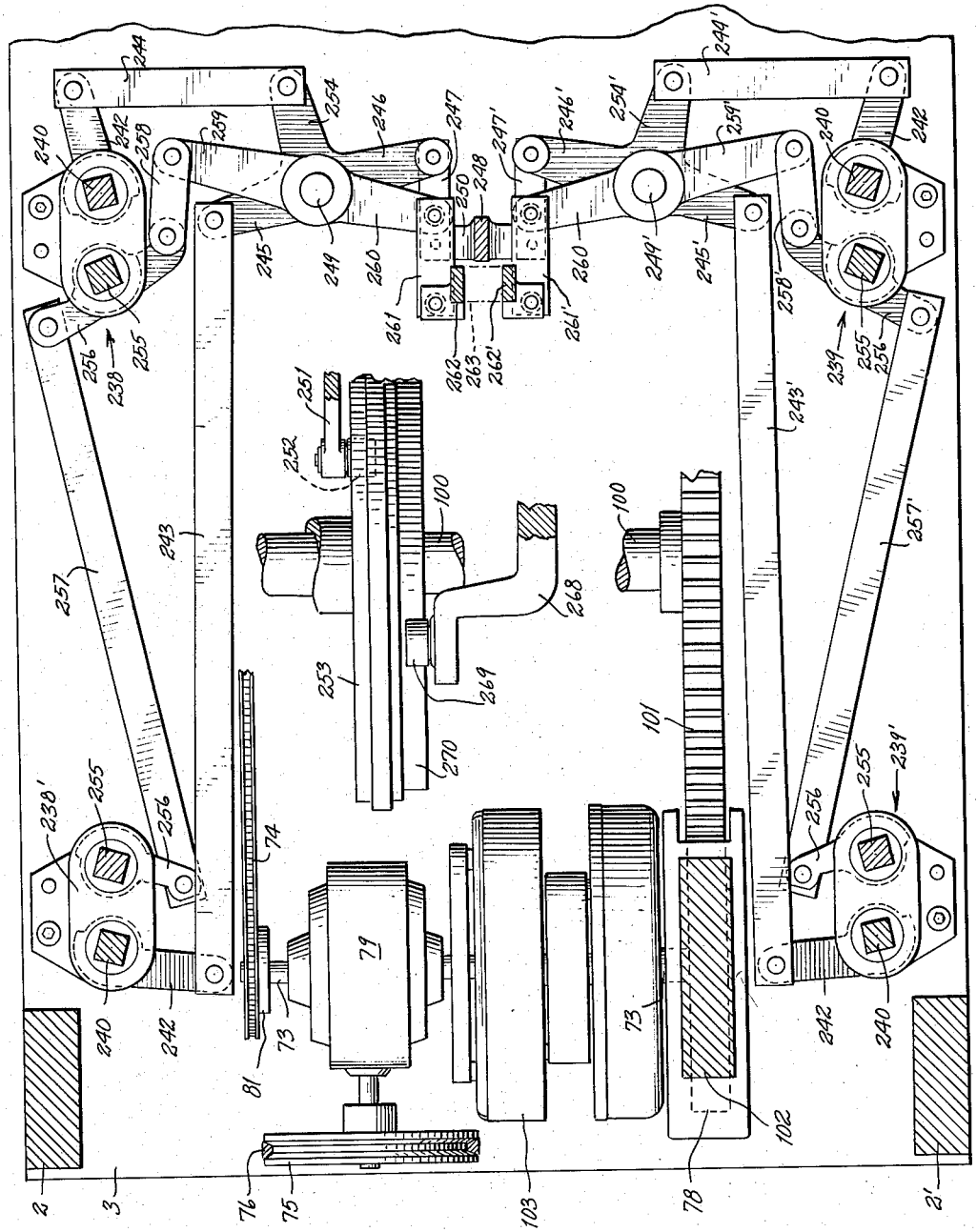
Fig. 6 is a top plan view, partly in section and partly broken away, and shows the mechanism for driving the stay feeding devices and pressure applying devices.

The actuating shafts for the pressure heads are connected to four fixed stations 238, 238', 239 and 239', which, as is shown in Figs. 1, 5 and 6 of the drawings, are secured, as by bolts, to the base 3 of the machine adjacently to the feet of the standards 1, 2, 1' and 2', respectively. Each of the fixed stations is provided with a vertically disposed, rotatably mounted, stub shaft or pin 240 to which the lower ends of an actuating shaft is secured by a universal coupling member 241. The actuating shafts 230, 230', 231 and 231' are coupled in this manner to the pins 240 of stations 238, 238', 239 and 239', respectively. Each pin 240 is slidably connected to a lever arm 242 by which the pin is connected to mechanism for reciprocating the same about its longitudinal axis. As is shown more clearly in Fig. 6 of the drawings, the lever arm 242 at fixed station 238 is connected by a link 244 to the arm 254 of a three arm rock lever mounted for pivotal movement about a vertical axis on a post 249 secured to the base 3. The arm 242 at fixed station 238' is connected to a second arm 245 of such rock lever by a link 243 extending longitudinally toward the rear of the machine. The third arm 246 of the rock lever is connected by a link 247 to one end of a transverse portion 250 of arm 248 of a lever rotatably mounted on shaft 96 and having an arm 251 provided with a roller 252 engaging the camway of a cam 253 (note also Fig. 5). Thus as lever arms 248, 251 are oscillated by cam 253, link 247, rocker lever arms 245, 246 and 254, links 243, 244, and arms 242 at fixed stations 238, 238' will be actuated to reciprocatingly rotate the pins 240 at such stations. In a similar fashion, the arms 242 secured to the pins 240 at fixed stations 239, 239' are connected by links 243', 244', arms 245', 246' and 254' of a three arm lever rockingly mounted on vertical post 249' and link 247', to the other end of the transverse portion 250 of lever arm 248. The pins at stations 239, 239' therefore will be reciprocatingly rotated with the pins at stations 238, 238' so that the four presser heads on the corner blocks will be simultaneously advanced and retracted. It will be seen that by reason of the above described arrangement, the reciprocation of the pressure heads will be simultaneous, and the magnitude of such reciprocation will remain constant even though the corner blocks on which such pressure heads are mounted may be adjusted to take care of varying lengths and widths of boxes and without any necessity of making any adjustment of the motion transmitting means for such heads. By coupling the motion transmitting means for the pressure heads to four fixed stations of the type described, the driving elements of the machine can be mounted on the base 3 in convenient and accessible locations in a permanent fashion without necessitating adjustments thereof with adjustments of those parts concerned with performing operations on the box being formed, and even though the motion transmitting mechanisms coupling such driving elements to the pressure heads may be shifted with the adjustment of the corner blocks.

Figure 9:
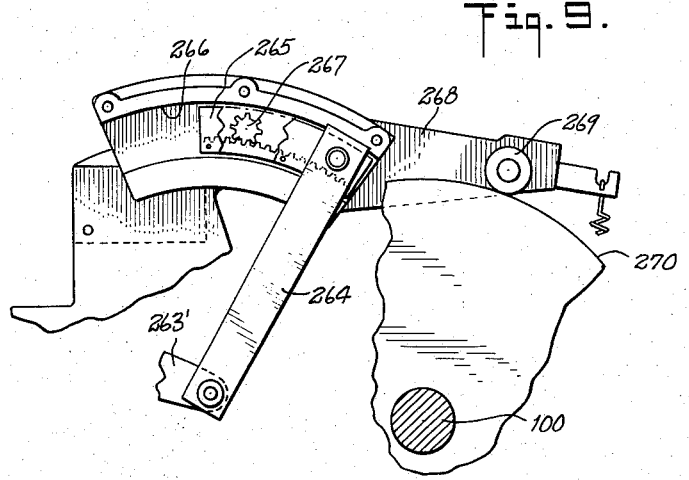
Fig. 9 is a side elevational view of a portion of the stay feed control mechanism, looking from the rear of Fig. 7.
Figure 10:
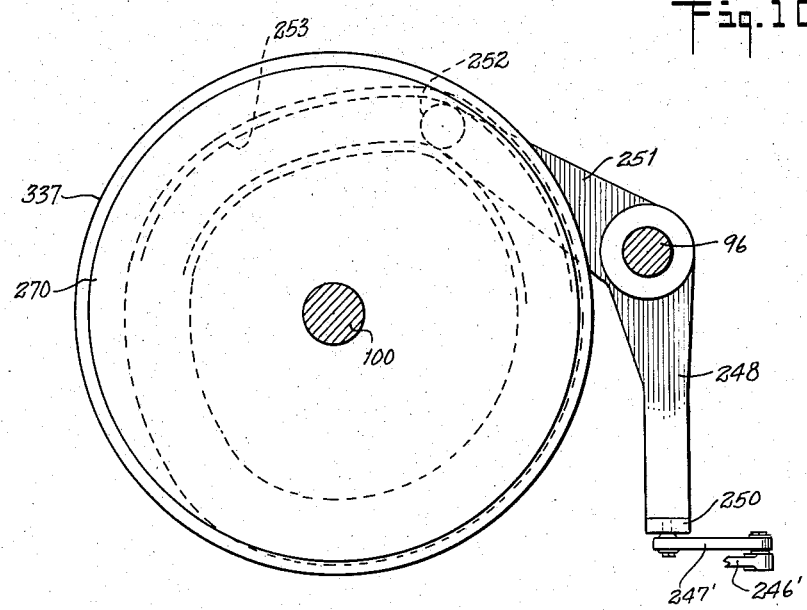
Fig. 10 is a side elevational view of the actuating means for such mechanism.

Most of these advantages are also realized for the stay feeding mechanism of the machine for they are likewise drivingly connected to the four fixed stations as will now be explained. As shown in Figs. 1, 5 and 6 of the drawings, each of the fixed stations is provided with a second shaft or pin 255 mounted at such station for rotational movement about its vertical axis and being slidably connected to a lever 256 by which the pin is connected to mechanism for reciprocating the same about its longitudinal axis. Secured to the levers 256 at stations 238, 238' is a link 257. The lever at station 238 is also connected by a link 258 to the arm 259 of a rock lever mounted for pivoted movement on pin 249. The other arm 260 of the rock lever is connected by a link 261 to a transverse portion 262 of the arm 263 of a lever rotatably mounted on shaft 96. As is shown more clearly in Fig. 7 of the drawings, the other arm 263' of such rotatable lever is pivotally connected by a link 264 to an arcuately shaped segment or shoe 265 longitudinally adjustable in an arcuately shaped guide 266 connected at one end to the pivot 267 of a lever arm 268 provided at its other end with a cam roller 269 engaging a cam 270 (compare Figs. 5 to 10). It will be understood that as lever 268 is pivoted about its axis 267 by the cam 270, the arcuately shaped guide 266 will also be caused to pivot about axis 267. Should the pivotal connection of lever arm 264 with the shoe 265 coincide with the axis 267 it will be understood that no oscillatory movement will be imparted to lever arm 263'. However, if the shoe 265 is shifted in guide 266 to the left, as viewed in Fig. 7, or to the right, as viewed in Fig. 9, so that the pivotal connection of such shoe with lever arm 264 is offset from axis 267, lever arm 263' will be given an oscillatory movement which will be transmitted through lever arm 263, link 261, rocker lever arms 259, 260, links 258 and 257 and arms 256 to pins 255. The amount of offset of the pivotal connection of lever arm 264 with shoe 265 thus determines the amount of reciprocating rotary movement imparted to pins 255 and this in turn determines the amount of feed which will be given to the tapes located on the corner blocks 40, 40'. This feed can be adjusted from zero feed to a feed of about 4½ inches by adjustment of a dial 271 (note Figs. 5 and 8), which is mounted on the outer end of shaft 272 supported by a bracket 273 forming part of the frame standard 1' and connected at its inner end to the guide 266. The shaft 272 serves as the axis for guide 266 and lever arm 268. Also associated with the guide 266 and lever arm 269 is a diaphragm 274 mounted on a bracket 275 (compare Figs. 5, 7 and 36). Diaphragm 274 controls a finger 276 which is moved into the path of lever arm 268 to block movement of such arm when the feeding mouthpiece fails to feed a blank A to the forming mechanism. As shown in Figs. 7 and 36, the diaphragm is connected by a tube 277, 277' to the nozzle 278 on pump 110 so that it is displaced by a condition of suction whenever the mouthpiece 90 grips a blank A to feed it to the rolls 116, 118. It is during this interval that the lever arm 268 is actuated to cause the previously mentioned reciprocating motion of pins 255. When however the mouthpiece 90 fails to feed a blank, the finger 276 will remain in blocking position so that lever arm 268 shall be unable to operate in the normal fashion. In other words, when there is vacuum in the system due to the fact that the mouthpiece 90 is engaging a blank, the diaphragm will position finger 276 so as to enable rotary movement to be imparted to the pins 255 and thereby permit the paper to be fed. On the other hand, when there is no vacuum in the system due to the fact that the mouthpiece 90, in its movement towards the rolls 114, 118, is not feeding a blank, the diaphragm will prevent the rotary movement of the pins 255 and consequently prevent the feed of the stay strips.

The levers 256 at stations 239, 239' are also connected with the tape feed control mechanism in a manner similar to that above described, so that the pins 255 at such stations are either reciprocally rotated, or prevented from being rotated because of the failure of the feeding mechanism to feed a blank simultaneously with the pins 255 of stations 238, 238'. Thus, the levers 256 at stations 239, 239' are connected by links 257', 258', arms 259', 260' of the rock lever on pin 249' and link 261' to the transverse portion 262' of the arm 263 of the lever mounted on shaft 96. From arm 263 to cam 270 and diaphragm 274 the mechanism is the same as that previously described.

The pins 255 are connected by universal couplings 290 to actuating shafts 291 which are connected at their upper ends by universal couplings 292 to vertically disposed pins 293 rotatably supported in bearings 294 formed on the corner blocks 40, 40', 41, 41' (note Figs. 1, 3 and 19). Clamped to the upper ends of pins 293, are arms 295 which are pivotally connected at their outer ends to one end of links 296 (note Figs. 3 and 28). The other ends of links 296 are pivotally secured to an intermediate portion of levers 297 located adjacent to the housings 226 containing the shanks 234 of the pressers. The levers 297 are mounted for pivotal movement about the axes of shaft ends 298 rotatably supported by the corner blocks. As shown more clearly in Figs. 28, 29 and 31, the upper ends of levers 297 are in the form of segments 299 which coact with feed rolls 300 to advance the stay strips. As has previously been mentioned, the amount of rotation of pins 255 will depend on the adjustment of the segment or shoe 265 with relation to the pivotal axis 267 of lever 268. The resulting rotation of each of the pins 255 will be transmitted through the associated shaft 291, pin 293, arm 295, link 296 and lever 297 to reciprocate the segment 299 on such lever a corresponding amount.

The pins 240, 255 at each fixed station are slidable vertically so that as the corner blocks are adjusted on the movable bars the positions of such pins will be varied. Thus when a corner block is located in a position directly over a fixed station, the pins 240, 255 at such station are at their lowest positions. When, however, such corner block is shifted away from such position in any direction, because of adjustments of such block to accommodate boxes or trays of varying widths or lengths, the pins 240, 255 will be raised by the oscillating shafts and other parts connecting such pins to the corner blocks. The pins 240 and 255 are preferably rectangularly-shaped, as illustrated, so that they may function in the nature of splines, to move longitudinally in the fixed stations and to transmit rotational movement from the levers associated therewith to the shafts 231, 231' and 291, 291', respectively.

As previously mentioned the reciprocating stroke of the segment can be adjusted so that the feed of the paper by the coaction of segment 299 and feed roll 300 can be varied from 0 to approximately 4½ inches. The shaft ends 298 are controlled by the reciprocating movements of the associated pressers so that just prior to the advancing movement of the levers 297, the shaft ends 298 are raised approximately ½₂ of an inch (note Fig. 29), while at the end of such advancing movement of the levers 297 and just prior to the return movements of such levers, the shaft ends 298 are dropped ½₂ of an inch to their initial positions (note Fig. 31). This is accomplished by making the shaft ends 298 integral with, and offset with relation to, the longitudinal axis of, a gear 301 rotatably supported at its ends by bearings provided on the housing 226 of the associated corner block. Each gear 301 engages a rack 302 formed on the lower edge of the shank 234 of the associated presser. As a result of the cyclic raising and lowering of the shafts 298, the segments 299 will move up and swing forwardly with relation to the feed rolls 300, and at the end of such movement will drop down and return to retracted positions.

Figure 28:
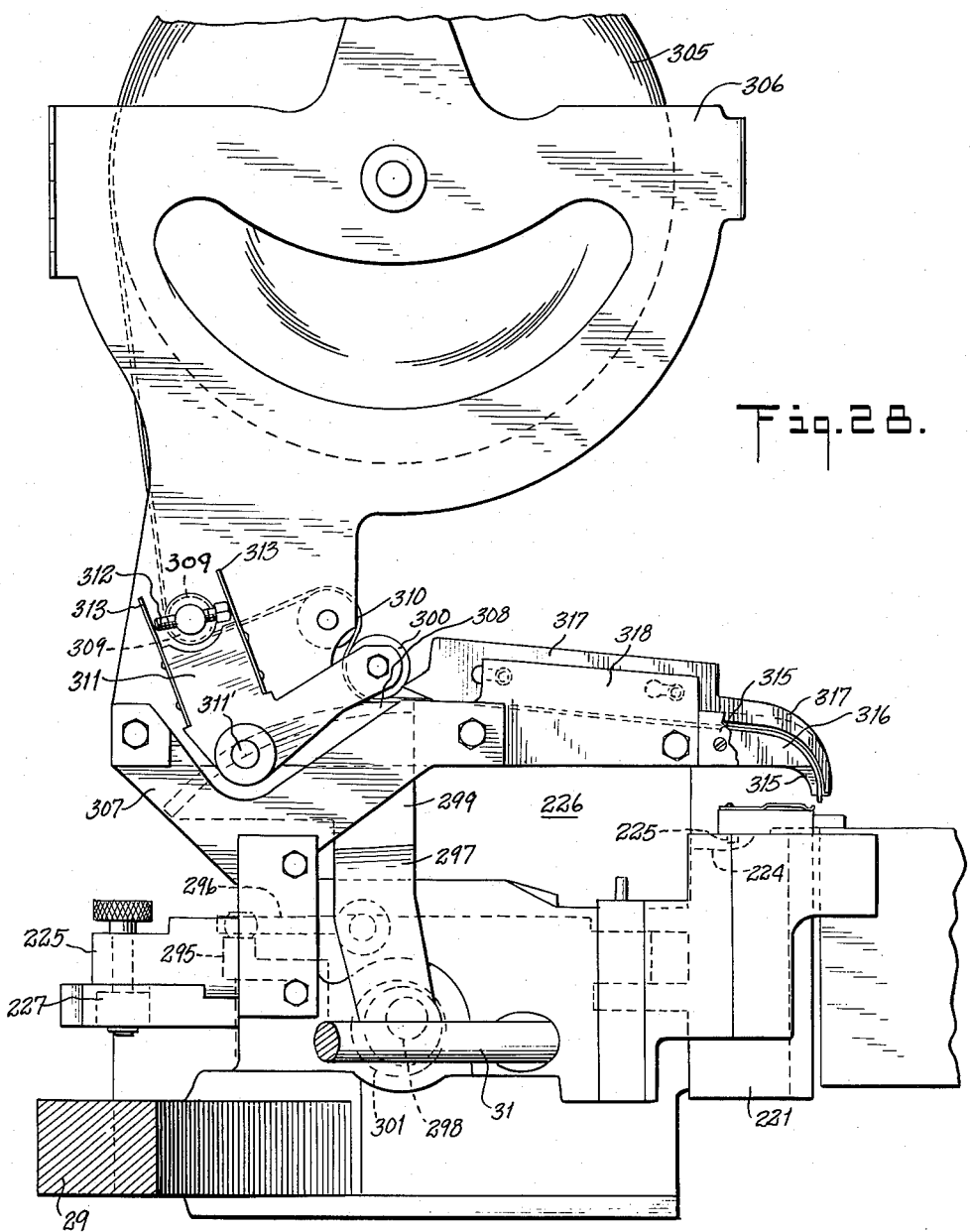
Fig. 28 is an enlarged detailed side elevational view of one of the stay feeding mechanisms.

The stay strips E are fed from supply rolls 305 supported by reels 306 mounted on brackets 307 secured to one side of the corner block housing portions 226 (note Fig. 28). Also secured to each of the brackets 307 are a pair of horizontal disposed spaced plates constituting a rail 308 to which the stay strip is fed from the associated roll 305 and between which the associated segment 299 reciprocates. As shown in Figs. 28, 29 and 31 of the drawings, the strips in their feed from the reels 306 to the rails 308, pass under fixed guides 309 and then over fixed rolls 310. The guide 309 and roll 310 in each unit are mounted in side by side relation on the shank of the associated reel 306. The shafts of the guides 309 extend through the shanks of the reels 306 and carry an adjusting screw 312 which coacts with spring fingers 313 provided on an end of an arm 311. The arms 311 are mounted on fixed pivots 311' and carry the feed rolls 300. The rolls 300 receive the stay strips from the fixed rolls 310 and by reason of the coaction of the screws 312 and spring fingers 313, such rolls 300 may be maintained in such biased position on the fixed pivots 311' as either to cause them to alternately clamp the stay strips to the rails 308 and to the segments 299, or to the roll 310 when manual feeding is desired. Each roll 310 is formed with a hand feed knob 314 which may be manipulated to accomplish manual feeding of the stay strip.

During the advancing movements of the segments 299, the same move up and swing forwardly between the rails 308 so that the outer curved surfaces thereof are slightly above the rail surfaces. During such advancing movement of the segments, the outer surfaces thereof also slightly lift the paper strips and the rolls 300, and together with the latter feed the strips forwardly on the horizontal edges of such rails. On the return stroke of the segments 299, the outer working surfaces thereof initially drop below the top surfaces of the rails allowing the feed rolls 300 to drop and clamp the paper to the rails. The segments then return to retracted positions with the outer working surfaces thereof below the clamped strips of paper.

The stay strips fed intermittently forward by the segments 299 and feed rolls 300, are each guided on the associated horizontal rails 308 in an inclined manner toward a pair of guides 315 secured to the sides of a block 316 mounted on the outer ends of the rails 308 (note Figs. 3, 28, 29 and 31). It will be noted that the upper surface of the block 316 onto which the strip passes from the rails 308, curves downwardly at its outer end through an angle of ninety degrees. The side guides 315 also curve in a similar fashion through an angle of ninety degrees. Overlying the rails 308 from roll 300 towards the block 316 and bending through an angle of ninety degrees in the region of such block, is a vertically disposed blade 317 supported by the brackets 307 so that the blade is located between the spaced rails 308. The blades 317 which are extremely thin, having a thickness of the order of .045 inch, extend vertically down past the outer ends of the blocks 316 and together with the latter guide the stay strips from horizontal to vertical planes and into the openings formed in the stationary looped knives 236 associated with the pressers. The blades 317 are spaced above the rails 308 and the surfaces of the blocks 316 a distance slightly more than the thickness of the stay strips; the stay strips as previously explained being pushed through such space by the segments 299 and feed rolls 300. As a result of this construction, the inner vertically disposed portions of the blades 317 only are in the region of operation of the heated presser heads. As the blades 317 are so thin that no temperature can build up in them, no heat will be trapped in the guiding surfaces of the stay strips. Preferably also the block 316 is made of aluminum so as to dissipate the heat as fast as possible back to the steel rails 308 through which air passes to maintain them at substantially room temperature. As a result, the thermoactivable adhesive coatings on the stay strips will not be activated until they have moved past the lips of the guiding blocks 316. Thus, no adhesive will build up in the feeding mechanism. Further, as the stay advancing means, the segments 299 and feeding rolls 300, are remote from the heated area, there is obviated the danger of the strips sticking under pressure, which danger would be present if heat were transmitted from such area to the area of operation of such advancing means.

As has been previously explained, advanced portions of the stay strips E are cut off and secured to the corners of a box during the advancing movements of the pressers. When the stay strips have so been applied to a box, thus completing the formation of the latter, the forming block D is retracted. As the block D is retracted, the fingers 211 strip the box off the same, the box being then held in suspended fashion by the fingers 211' (compare Fig. 25). While the box is so held in suspension, crimping blades 320 and 321 (note Figs. 19 and 20) move in to crimp or bend the fold lines of the two side flanges of the box to an angle greater than 90° so that when such blades are retracted, any tendency of the side flanges or walls of the box to spring outwardly will have been eliminated. There are two pairs of crimping blades or bars 320, 321 provided to accomplish this crimping of the side walls of the box, one pair for each side wall. The blade 320 in each pair is located vertically above the blade 321 so that during the advancement of the crimping blades toward a box held by the fingers 211', blades 320 will come into engagement with the side walls of the box, while the blades 321 will advance to positions under the bottom of the box. The blades 321 are thus positioned to fix the position of the bottom of the box and to prevent any downward movement of the same while the side walls of the box are bent in by the blades 320. Each pair of blades 320, 321 is provided on the lower end of a vertically disposed bracket 322 carried by one of the brackets 30, 30' mounted on the movable bars 29, 29', respectively, between the corner blocks of the staying mechanism. The brackets 322 which are located on each side of the forming block D, are each slidably mounted for adjustment in a vertical direction on the vertical leg of a bracket 323 and is maintained in adjusted position on such leg by a holder nut 319. The bracket 323 is secured upon a slide 324 slidably mounted on one of the brackets 30, 30'. The slides 324 overlie and are connected by pins to discs 325 which are provided with depending pins engaging collars 327 provided on the bars 31, 31' within the brackets 30, 30', respectively. Secured to the rear ends of the bars 31, 31' are collars 328 which engage a transverse bar 329 mounted on a slide 330 (note Figs. 13 and 16). The slide 330 moves in a bracket 331 located between the slides 28, 28' and suspended from fixed bar 26. The slide 330 is connected to one arm of a rock lever 332 pivotally mounted on a shaft supported by bracket 333. The other arm of rock lever 332 is connected to the upper end of a rod 334 which is connected at its lower end to a cam lever 335 mounted on shaft 96. A cam roll 336 is provided on the outer end of cam lever 335 and engages a cam 337 provided on shaft 100 (note Figs. 5 and 13). A spring 338 maintains the cam roll 336 in engagement with the cam surface of cam 337. It will be understood from the foregoing, that as the cam 337 rotates, arm 334 will be actuated through cam roller 336 and arm 335, to actuate lever 332, which in turn reciprocates slide 330 lengthwise of the machine. The reciprocal movement of slide 330 is imparted to rods 31, 31' through bar 329 and collars 328. The rods 31, 31', in turn, reciprocate the crimping blades 320 and 321 toward and away from the box through collars 327, discs 325, slides 324, and brackets 323 and 322.

There are also provided two pairs of end crimpers 344, 345 (note Figs. 13 and 16) for bending the end flanges or walls of the box A' about their fold lines to eliminate any tendency of such end walls to pivot outwardly. The end crimpers 344 correspond to end crimpers 320 in that they engage with the end walls of the box, and the end crimpers 345 correspond to the end crimpers 321 in that they advance to positions under the bottom of the box to prevent the ends of the box from bending down while the end walls thereof are moved inwardly by the crimpers 344. Each pair of end crimpers 344, 345 is mounted on a bracket 343 similar to bracket 322. The bracket 343 located in front of the box (see Figs. 13 and 19) is adjustably mounted on an angle support 349 provided on a slide 348. The slide 348 is slidably mounted in a bracket 350 depending from the front fixed cross bar 25. The slide 350 carries a front transverse bar 347 which is engaged by collars 346 provided on the front ends of the longitudinal bar 31, 31' (note also Figs. 1). It will thus be seen that as the bars 31, 31' are reciprocated in the manner previously explained, the collars 346 on the front ends thereof, reciprocate slide 348 through the collars 346 and transverse bar 347. As slide 348 is reciprocated it will reciprocate the front end crimper blades or members 344, 345 toward and away from the box to crimp the fold line of the front wall of the box.

The bracket 343 supporting the pair of crimper blades 344, 345 for crimping the fold line of the rear wall of the box, is adjustably mounted on an angle support 351 provided on a slide 352 (note Figs. 13 and 16). The slide 352 is located in spaced relation above the slide 330 and is also slidably supported by the brackets 331 depending from the rear fixed cross bar 26. Slide 352 is drivingly connected to slide 330 by racks 353 secured to opposed surfaces of such slides and engaged by a pinion gear 354 located therebetween and mounted for rotational movement about a fixed axis on a shaft supported by bracket 331. Thus as slide 330 is reciprocated by the lever 332 in the manner explained, it will reciprocate slide 352 through the racks 353 and gear 354. Because of the rack and pinion connection between the two slides, slide 352 will advance the crimping blades 344, 345 carried thereby toward the rear wall of the box A', while slide 330, moving in the opposite direction, will be moving the rear transverse rod 329 and consequently the front transverse rod 347 in a direction which causes the set of front crimper blades to move toward the front of the box. As shown more clearly in Fig. 16 of the drawings, the slide 330 is also provided with a bracket 355 which carries the pusher 53. As previously explained, the pusher 53 is for registration of the blank against the stops 52, 155 and under the forming block D. The pusher 53 is adjustable in a slot on the bracket 355 to accomodate any blank size. It is to be noted that pusher 53 together with stops 52, 155 provides the required accurate registration of the blank with relation to the forming block D, and that the lug 154 on chain 147 merely insures that the blank A will be transported to a position beyond the leading edge of the pusher 53, which travels with a sliding, reciprocal motion within a distance range of approximately ½ to ⅝ of an inch. The bracket stop 52 may be provided with a spring finger or clip 54 which engages the advancing end of the blank to cushion its engagement with stop 52 and to yieldably hold the blank properly in position until engaged by the forming block D (note Fig. 26).

Following the crimping operations above described, the box is ejected from the machine to the conveyor unit F by four box separating fingers 360 pivotally mounted intermediate their ends on connecting lines 361 pivotally secured to the plates 215 supporting the end flange folding members (note Figs. 33 and 35). The outer ends of the fingers 360 are biased downwardly and outwardly by springs 362 so that the ejecting heads 363 formed on the inner ends of such fingers are biased upwardly and inwardly towards and into the path of the descending forming block D. The arrangement is such that when the forming block D descends, the heads 363 of the fingers are engaged and depressed by the bottom of the box being formed on such block, the heads 363 remaining in depressed condition under such box. As the heads 363 are so depressed they force the previously formed box A' held by the fingers 211' downwardly out of the grip of such fingers. During the movement of the presser heads to apply the stay strips to the corners of the box, pins 365 on the shanks 234 of such pressers, engage levers 366 pivotally mounted on the sides of the corner blocks. The levers 366 push against the plates 361 to retract the finger heads 363 from underneath the formed box on the block D. Upon release of the pressure of the levers 366 the springs 362 bring the heads 363 back into engagement with the side portions of the forming block D above the formed box. When the forming block D is withdrawn, the box A' will be stripped therefrom by the fingers 211 and held by the fingers 211' as has been explained. During this stripping action the heads 363 move into the path of movement of the forming block D, in position to eject the stripped box while the next box is being formed on the next downward movement of the forming block D. The movements of the fingers 369 during such actions of the heads are restricted by a pair of stops 364.

It is believed that an adequate understanding of the method of operation of the staying machine of this invention shall have been obtained from the foregoing description thereof. As has been previously indicated, the machine lends itself readily to the flow manufacture of boxes or trays within a substantially wide range of sizes because its construction permits the discharge conveyor unit F to be arranged to transport the completed boxes or trays out through the front, or either side of the machine to other box making units. Thus, as shown in Fig. 38 of the drawings, the instant staying machine may be located centrally of three box making units each composed of a gluer 370, a conveyor 371, and a wrapping machine 372 and constructed and arranged substantially in the manner disclosed in U.S. Letters Patent No. 2,705,905, granted April 12, 1955. Each of the units may be provided with a table 373 onto which the conveyor unit F discharges the boxes fabricated by the instant staying machine, in position to be readily accessible for the operator taking care of the operation of such units. As the machine of this invention can readily be adjusted for the manufacture of trays and boxes of widely different dimensions from one position, this arrangement enables small orders of the same to be made with no substantial shutdown of the staying machine. Preferably also, the system shown in Fig. 38 of the drawings, is constructed so that the wrapper 372 in each unit sets the pace of operation of the centrally located staying machine when it is operatively connected to the latter thereby enabling the staying machine to transport the finished boxes directly to such wrapper and eliminating the necessity of making the boxes in batches and then storing them until such time as the wrapping machine is ready to use them. As has previously been described, the instant staying machine is provided with an electric clutch brake 103 of any suitable construction, such as the P.B. 825 brake and S.F. 825 clutch combination manufactured by the Warner Electric Company. Clutch brake 103 is mounted on shaft 73, as is shown in Figs. 1 and 5 of the drawings, and is electrically connected to and controlled in a known manner by a suitable one revolution stop switch provided in the control panel 375 mounted on the frame of the machine (note Fig. 2). At the end of each cycle of operation of the machine, the stop switch, as is usual, will automatically deenergize a relay to cause the clutch brake to operate and stop the machine. Provided on the main cam 376 of each wrapper 372 is a switch actuating member or pin 377 (note Fig. 37) arranged to engage a wheel 378 located in the path of movement of such pin in every revolution of cam 376. Wheel 378 is mounted on the upper end of a switch arm 379 which controls a suitable micro-switch 380. It will be apparent that upon the engagement of pin 377 with wheel 378, arm 379 will be actuated to close switch 380 which is electrically connected by a cable 381 to the circuit of the box making machine and closes such circuit to start the operation of such machine. The construction of the staying machine is such, that immediately thereafter a member 382 on cam 194 (note Fig. 5) will actuate a switch arm 383 to close a micro-switch 384 which is mounted on the frame of the box making machine, and which is electrically connected to the one revolution stop switch. The closing of switch 384 causes the stop switch to close for the cycle of operation of the box making machine, which was thus initiated in the manner described by the wrapping machine. At the end of such cycle the staying machine will automatically stop in the manner indicated and await actuation by the wrapping machine. If the wrapping machine continues to operate, the staying machine will also continue to run with it cycle for cycle. Thus when the staying machine is connected with a box making unit in the manner described, the wrapping mechanism will set the pace and the staying machine will follow.

While I have hereinabove described and illustrated in the drawings one form in which the invention may be practiced, it will be apparent that various modifications may be made in the construction and arrangement of the parts thereof within the scope of the invention. For example, instead of using a pair of levers of the construction of lever arms 94 (note Fig. 13) for connecting the upper end portions of the rods 92 which support the transverse rod 91 on which the suction mouthpiece 90 is mounted, to the feed roll bearing brackets 115, there may be used in place of each arm 94, a compound lever constructed to cause the mouthpiece 90 to be raised vertically after the advancing end of a blank A carried by such mouthpiece has been inserted between the feed rolls 114, 118. By thus removing the rubber vacuum cups which constitute the mouthpiece 90, to a position in which they will not become engaged by the blank A as the latter is drawn through the feed rolls 114, 118, substantial wear thereof is avoided. A compound lever capable of accomplishing these results is shown in Figs. 39 to 42 of the drawings, in which those parts which are similar to the parts hereinabove described, have been given similar reference numerals. It will be understood that in the machine each of the rods 92 will be supported at its upper end by the compound lever construction illustrated in Figs. 39 to 42 and that each of such levers includes a lever arm 390 pivotally connected at its lower end to an associated feed roll bearing bracket 115 by a pin 391. The lever arm 390 is substantially vertically disposed and is pivotally connected at its upper end by a pin 392 to one end of a lever 393 which is loosely connected intermediate its ends to its associated rod 92 by a pin 394. The pin 394 carries a roll 395 which seats on a curved shoulder 396 formed in the upper end of lever 390 adjacent to pin 392. Roll 395 is normally maintained in engagement with shoulder 396 by a spring 397 which is connected at its upper end to a stud 398 provided on the other end of lever 393 and which is connected at its lower end to a stud 399 mounted on lever arm 390 adjacently below pin 391. It will be noted that the axes of pin 392, pin 394 and stud 398 are all contained in one plane and that the actual lever arm of compound levers 390, 393 is the distance between the axis of pin 391 and a second plane passed vertically through said one plane at the axis of pin 394. This actual lever arm which is relatively short in length, affords substantially the same leverage as the lever arms 94 in the above described embodiment. On the other hand, the levers 95, 95' which are loosely connected to the lower ends of the rods 92, are of relatively long length. As a result of the short leverage of the compound levers, the long length of rods 92 and the long length of levers 95, 95', a relatively small angular motion of rods 92, as arms 95, 95' are raised, causes a relatively large angular motion of the compound levers. The angular motion of the compound levers is such that the blank supporting portions of the vacuum cups carried on the transverse rod 91 supported on the upper ends of rods 92 are caused to follow a substantially arcuate path from the top of the stack of blanks to the proximity of the bight of the feed rolls 114, 118. The direction of the arcuate path is indicated in Fig. 40 of the drawings by a series of arrows which show the path of movement of the axis of pin 394 during such lifting action of the rods 92. Fig. 40 of the drawings shows the relation of the parts at the end of such arcuate movement which is just prior to the completion of the upward stroke of rods 92. Compare this with Fig. 41 which shows the relation of the parts in the retracted position of rod 92. The aforesaid arcuate movement of the vacuum cups, it is understood, will take place also in the operation of the construction that has been previously described. In the instant construction, however, means are provided to break the normal arrangement in which the compound levers are held by the spring 397 after the vacuum cups have inserted the advancing end of a blank between the feed rolls 114, 118. This means comprises an abutment 400 provided on lever 390 so that it is in the path of movement of its associated rod 92. The abutment 400 has an elongated vertical surface 401 which is disposed in opposed relation to the direction of angular movement of its associated rod 92 when the latter is raised by its associated long lever 95, or 95' and which is located adjacently beyond the axis of pin 391. When an advancing rod 92 comes into engagement with its associated surface 401 any further lifting action by its associated long lever 95 or 95' will result in a movement of the compound lever around the axis of the pivot pin 391. In other words, the angular motion of the associated long lever will be transformed into a sliding motion of rod 92 on surface 401 so that the vacuum cups 90 will be lifted against the tension of spring 397 up and out of the range of the path of travel of a blank passing through the feed rolls 114, 118 (note the dotted line position of cups 90 in Fig. 40 of the drawings and the additional vertical motion at the end of the arcuate path indicated by the arrows in such figure). Surface 401 is provided with a very smooth finish so that its associated rod 92 can readily slide thereover. When the levers 95, 95' are again lowered, the springs 397 will again return the rolls 395 to seating position on the shoulders 396 and the compound levers will again function as unitary levers.

It will be understood by those skilled in the art that other modifications and changes may be made in the construction hereinabove described and illustrated in the drawings without departing from the spirit of the invention. Hence, I do not wish to be limited to the particular form illustrated and described, or to the details of construction thereof, but intend to cover all constructions coming within the scope of the invention as expressed in the following claims.

We claim:

1. In a box staying machine, in combination, a frame, a pair of supporting bars mounted on said frame and fixed on the latter in spaced relation, a pair of movable bars arranged in spaced relation, means supporting said movable bars on said fixed bars to enable movement of said movable bars independently of each other, means operative to move said movable bars on said fixed bars relative to each other, said operative means being mounted on said movable bars and movable therewith, staying mechanism mounted on said movable bars, and means for moving said staying mechanism along said movable bars and operable to move the staying mechanism on one of said movable bars independently of the staying mechanism on the other of said movable bars.

2. In a box staying machine, in combination, a frame, means for setting up box blanks into box form, a plurality of staying devices arranged around said setting up means, means on said frame for supporting said staying devices and permitting movement of the same relative to each other, actuating link means at each of a plurality of spaced fixed stations arranged around said setting up means so that each fixed station is associated with a staying device, driving mechanism connected to each of said actuating link means and causing oscillative movements of the latter in the operation of the machine, and positive driving means coupling each of said actuating link means to its associated staying device.

3. In a box staying machine, in combination, a frame housing for the machine and having a plurality of open sides through which finished boxes may be discharged, means for setting up box blanks into box form located above said openings, a plurality of staying devices arranged around said setting up means, means on said frame for supporting said staying devices above the openings on said frame sides and permitting movement of said devices relative to one another, actuating link means provided at each of a plurality of spaced fixed stations located on the base of the machine below said staying devices and arranged around said setting up means so that each fixed station is associated with a staying device, driving mechanism mounted on the base of the machine and connected to each of said actuating link means to cause oscillative movements of the latter in the operation of the machine, and positive driving means coupling each of said actuating means to its associated staying device and extending from said fixed stations upwardly to said devices without obstructing the openings on said frame sides, whereby discharge of the stayed boxes may be made through either of said open sides.

4. In a box staying machine, in combination, a frame, a pair of fixed supporting bars mounted on said frame in spaced parallel relation, a pair of movable bars arranged in spaced parallel relation at right angles to said fixed bars, a pair of slides slidably mounted on each of said fixed bars and supporting the ends of said movable bars, means operable to move said slides supporting each of said movable bars to move said movable bars independently of each other on said fixed bars, said operable means including operative means mounted on each of said movable bars and movable therewith, staying mechanism mounted on said movable bars, and means operable to move said staying mechanism on one of said movable bars independently of said staying mechanism on the other of said movable bars.

5. In a box staying machine, in combination, a frame, a pair of fixed supporting bars mounted on said frame in spaced relation, a pair of movable bars arranged in spaced relation, means supporting said movable bars on said fixed bars to enable movement of said movable bars independently of each other, means operative to move said movable bars on said fixed bars relative to each other, said operative means being mounted on said movable bars and movable therewith, staying mechanism mounted on said movable bars, means operable to move said staying mechanism on one of said movable bars independently of said staying mechanism on the other of said movable bars, actuating link means at a fixed station complementary to each of said staying mechanisms, said fixed stations being spaced from each other, and positive driving means connecting the actuating link means at each station to the operating elements in the staying mechanism associated therewith, said actuating link means and positive driving means being constructed to enable each staying mechanism to be moved by said operable means relative to its associated fixed station.

6. In a box staying machine, in combination, means for setting up box blanks into box form, a corner presser disposed to bisect the angle of a corner of the box being formed, a device for feeding a stay strip to said corner presser, a support for said corner presser and stay feeding device, means operable to adjust the position of said support relative to such box, a fixed station substantially spaced from said associated presser and feeding devices and the support therefor and having located thereat a pair of movable link means, means for causing alternate movement of one of said movable link means, means for causing alternate movement of the other of said movable link means, positive driving means operatively connecting one of said movable link means to said corner presser and the other of said movable link means to said feeding device, said positive drive connecting means being constructed to transmit the alternate movements of said one movable means to said corner presser and the alternate movements of said other of said movable means to said feeding device and to enable said support to be moved by said operable means relative to said fixed station without destroying the ability of said connecting means to transmit such alternate movements.

7. In a box staying machine, in combination, means for setting up box blanks into box form, a corner presser disposed to bisect the angle of a corner of the box being formed, a device for feeding a stay strip to said corner presser, a support for said corner presser and stay feeding device, means operable to adjust the position of said support relative to such box, a fixed station substantially spaced from said associated presser and feeding device and the support therefor and having located thereat a pair of movable link means, means for causing alternate movement of one of said movable link means, means for causing alternate movement of the other of said movable link means, positive drive means operatively connecting one of said movable link means to said corner presser and the other of said movable means to said feeding device for transmitting the alternate movements of said one and other movable means separately to said corner presser and feeding device, respectively, said positive drive connecting means being of a fixed length, but constructed to enable said support to be moved by said operable means relative to said fixed station without destroying the ability of said connecting means to transmit such alternate movements, said movable link means being movable relative to said fixed station in a direction transverse to the alternate movement thereof during the movements of said support.

8. In a box staying machine, in combination, means for setting up box blanks into box form, a corner presser disposed to bisect the angle of a corner of the box being formed, a device for feeding a stay strip to said corner presser, a support for said corner presser and stay feeding device, means operable to adjust the position of said support relative to such box, a fixed station substantially spaced from said associated presser and feeding device and the support therefor and having located thereat a pair of pins mounted for rotatable movement about vertical axes at said station, means for causing oscillatable movement of said pins about their vertical axes, means operatively connecting one of said pins to said corner presser and the other of said pins to said feeding device for transmitting the oscillatable movements of said pins separately to said corner presser and feeding device, respectively, said connecting means being constructed to enable said support to be moved by said operable means relative to said fixed station without destroying the ability of said connecting means to transmit such oscillatable movements, and said pins being constructed and arranged with relation to said fixed station as to be movable in the direction of their vertical axes relative to said fixed station during the movements of said support.

9. In a box staying machine, in combination, a frame housing for the machine having a plurality of openings in its sides through which finished boxes may be discharged in any one of three directions, a plurality of staying devices, means on said frame for supporting said staying devices in the upper portion of the frame, and including a pair of fixed supporting bars mounted on said frame in spaced relation, a pair of movable supporting bars, means for movably supporting said movable bars on said fixed bars, and means for adjustably mounting said staying devices on said movable bars, said fixed and movable bars being constructed and arranged to provide below said movable bars a space communicating with the openings in said frame sides and large enough to receive the inner end of a discharge conveyor unit, and a discharge conveyor unit adapted to be extended through any one of the three openings in said frame sides with its inner end located in the space below said movable bars in position to receive finished box bodies.

10. In a box staying machine, in combination, a frame, a pair of parallelly arranged bars, a pair of slides connected to the ends of each bar and slidably supporting such bar on said frame for movement toward and away from the other bar, a plurality of staying devices mounted on each bar, means including said slides associated with each bar for adjusting such bar and consequently the staying devices mounted thereon relative to the other of said bars and the staying devices mounted on such other bar, a hopper located between said movable bars and adjacent to one end thereof for stacking box blanks to be fed to said staying devices, movable vertical guide bars forming part of said hopper to position the blanks in proper position to be fed to said staying devices, and means connecting said guide bars to said slides supporting the ends of said bars adjacent to said hopper to enable said slides on movement thereof relative to each other to simultaneously adjust the positions of said guide bars.

11. In a box staying machine, in combination, a frame, a plurality of supporting bars, a pair of parallelly arranged staying devices mounted on each of said bars, means movably supporting the ends of said bars on said frame, means for moving said bars toward and away from each other, a hopper for stacking box blanks located between said movable bars, movable vertically disposed bars forming part of said hopper to position the blanks in proper position relative to the operating mechanisms of the machine, said movable bars being carried by said bar supporting means and consequently adjustable simultaneously with the adjustment of said bars by said moving means.

12. In a box staying machine, in combination, staying devices for applying stay material to the corners of a set up box, means associated with said staying devices for setting up box blanks into box form including a plurality of forming members and a form coacting with said members, resilient means to drive said form through said forming members in forming a box, means to stop the advancing movement of said form when said resilient driving means is subjected to stresses beyond a predetermined limit in its advancing movement, and means for actuating said staying means to stay the box formed by said form and forming members, 13. In a box staying machine, in combination, staying devices for applying stay material to the corners of a set up box, means associated with said staying devices for setting up box blanks into box form including a plurality of forming members and a form coacting with said members, a plunger carrying said form, means for actuating said plunger including a resilient driving means, a circuit including a switch operable to condition such circuit to stop the advancing movement of said form by said actuating means, means controlled by said resilient driving means and operable to actuate said switch when said resilient driving means is subjected to stresses beyond a predetermined limit in its advancing movement, and means for actuating said staying means to stay the box formed by said form and forming members.

14. In a box staying machine, in combination, staying devices for applying stay material to the corners of a set up box, means associated with said staying devices for setting up box blanks into box form including a plurality of forming members and a form coacting with said members, a plunger carrying said form, means for actuating said form including positive driving means and a resilient member drivingly connecting said positive driving means to said plunger, means to instantly render said positive driving means inoperative to advance said plunger when said resilient member, through said plunger and form, is subjected to stresses beyond a predetermined limit, and means for actuating said staying means to stay the box formed by said form and forming members.

15. In a box staying machine, in combination, staying devices for applying stay material to the corners of a set up box, means associated with said staying devices for setting up box blanks into box form including a plurality of forming members and a form coacting with said members, a plunger carrying said form, means for actuating said form including positive driving means, a coiled spring drivingly connecting said positive driving means to said plunger and means controlling said positive means, means to instantly render said positive driving means inoperative to advance said plunger when said spring, through said plunger and form, is subjected to stresses beyond a pre-determined limit, said last mentioned means being operatively connected to said spring and controlling said controlling means, and means for actuating said staying means to stay the box formed by said form and forming members.

16. In a box staying machine, in combination, staying devices for applying stay material to the corners of a set up box, means associated with said staying devices for setting up box blanks into box form including a plurality of forming members and a form coacting with said members, a plunger carrying said form, means for actuating said form including positive driving means and a coiled spring drivingly connecting said positive driving means to said plunger, means to instantly render said positive driving means inoperative to advance said plunger when said coiled spring, through said plunger and form, is subjected to stresses beyond a predetermined limit, means operative to reverse said positive driving means when so rendered inoperative to advance said plunger to enable the removal of the cause of increased stress on said spring through said form, and means for actuating said staying means to stay the box formed by said form and forming members.

17. In a box staying machine, in combination, means for setting up box blanks into box form, means for applying stays to the box corners, means for feeding stay material to said applying means including a feeding roll located on one side of the path of feed of the stay material, a reciprocating segment located on the other side of the path of feed of the stay material and movable into and out of stay clamping relation with said roll, means to move said segment toward and away from said path of feed to bring it into and out of clamping relation, respectively, with said roll, and means to reciprocate said segment.

18. In a box staying machine, in combination, means for setting up box blanks into box form, means for applying stays to the box corners, means for feeding stay material to said applying means including a feeding roll located on one side of the path of feed of the stay material, a movable member located on the other side of the path of feed of the stay material, means for moving said member into said path of feed and into stay clamping relation with said roll, and means for moving said member in the direction of the feed of the stay material while such stay material is clamped between said member and said roll.

19. In a box staying machine, in combination, means for setting up box blanks into box form, means for applying stays to the box corners, means for feeding stay material to said applying means including a feeding roll located on one side of the path of feed of the stay material and an oscillative segment located on the other side of the path of feed of the stay material and coöperable with said roll, means to move said segment toward and away from said path of feed, means to oscillate said segment, means for feeding a box blank to said setting up means including a suction feeding device, and detecting means controlled by the suction in said feeding device and operable to interfere with said segment oscillating means when said suction feeding device fails to feed a blank.

20. In a box staying machine, in combination, means for setting up box blanks into box form, means for applying stays to the box corners, means for feeding stay material to said applying means including a feeding roll located on one side of the path of feed of the stay material, a movable member located on the other side of the path of feed of the stay material, and means for advancing said member into gripping relation with said feeding roll to enable the feed of the stay material by said member and roll, means for feeding a box blank to said setting up means including a suction feeding device, and means controlled by the suction in said feeding device and operable to prevent the advancement of said member when said suction feeding device fails to feed a blank.

21. In a box staying machine, in combination, means for setting up box blanks into box form, means for applying stays to the box corners including an oscillative pressure member, means for feeding stay material to said applying means including a stay feeding member capable of engaging and disengaging the stay material during the feed thereof, and means actuated in its oscillative motion by said pressure member for controlling the engagement and disengagement of said stay feeding member with the stay material.

22. In a box staying machine, in combination, means for setting up box blanks into box form, means for applying stays to the box corners, means for feeding stay material to said applying means, said applying and feeding means being located at a forming station and each including an oscillative stay engaging member, an oscillative lever operatively connected to each member, and an oscillating shaft driving each of said levers, said shafts being oscillatable about substantially parallel adjacent axes.

23. In a box staying machine, in combination, means for setting up box blanks into box form, means for applying stay material to the box corners, means for feeding stay material to said applying means, said applying and feeding means being located at a forming station and each including an oscillative stay engaging member, an oscillative lever operatively connected to each oscillative member, an oscillative shaft driving each of said levers, the magnitude of oscillation of the driving shaft for said applying means being substantially constant, and means for varying the oscillation of the driving shaft for said feeding means.

24. In a box staying machine, in combination, means for setting up box blanks into box form, means for applying stay material to the box corners, means for feeding stay material to said applying means and including an oscillative stay engaging member, an oscillative lever operatively connected to said oscillative member, an oscillative shaft driving said lever, and means for varying the oscillation of said driving shaft to vary the feed of said stay engaging member.

25. In a box staying machine, in combination, means for setting up box blanks into box form, means for applying stay material to the box corners, means for feeding stay material to said applying means and including an oscillative stay engaging member, an oscillative lever operatively connected to said oscillative member, an oscillative shaft driving said lever, and means for varying the oscillation of said driving shaft to vary the feed of said stay engaging member, said last mentioned means including a lever arm having a constant range of oscillation about a fixed axis, means drivingly connecting said lever arm to said driving shaft, and means for varying the connection of said connecting means to said lever arm.

26. In a box staying machine, in combination, means for setting up box blanks into box form, four staying devices for applying stay material to the box corners, and each including a feed roller and an oscillative stay engaging member cooperable to feed the stay material, means for moving each of said members into cooperable relation with their associated rolls to feed stay material to be applied to the box corners, and means controlling said movable means to simultaneously control the length of stay material fed by said four staying devices, said controlling means including an adjusting lever provided with a dial, a movable member mounted on said lever and operatively connected to said movable means, and means for moving said member relative to said lever.

27. In a box staying machine, in combination, means for setting up box blanks into box form, means for applying stays to the box corners, means for feeding stay material along a path of feed to said applying means including a support for said stay material, a driven oscillating member and a movable roll, means for oscillating said member toward and away from said path of feed to bring it into and out of clamping relation with said roll, said member in its advancing movements being in stay clamping relation with said roll and coacting with the latter to feed the stay material, and means for biasing said roll toward said support, to cause the same to coact to clamp the stay material during the retracting movements of said member.

28. In a box staying machine, in combination, means for setting up box blanks into box form, means for applying stays to the box corners, means for feeding stay material to said applying means including means for advancing the stay material in a substantially horizontal plane, means for guiding the advancing stay material into a substantially vertical plane towards said applying means, said guiding means including a track supporting the stay material, and a complementary guide of thin material overlying said track and providing an elongated material guiding surface disposed in substantial parallelism to said track and spaced therefrom a distance slightly greater than the thickness of the stay material, said advancing means pushing the stay material through the space between said track and upper guide.

29. In a box staying machine, in combination, means for setting up box blanks into box form, means comprising a heated pressure member for applying stays to the box corners, means for feeding stay material to said applying means in position to be engaged by said heated pressure member, said feeding means including means spaced from said pressure member for advancing the stay material to the latter, a pair of spaced rails extending from said stay advancing means towards said pressure member and forming a guide for the advancing stay material, and a guide member located in spaced relation between said guide rails and providing an elongated material guiding surface disposed in substantial parallelism to said spaced rails so that the stay material is advanced between said member and said rails by said advancing means, said spaced rails and guide member permitting such free circulation of air therebetween that the amount of heat conducted by the same from said heated pressure member to said advancing means is insufficient to change the condition of the stay material in the region of said advancing means.

30. In a box staying machine, in combination, means for setting up box blanks into box form, means comprising a heated pressure member for applying stays to the box corners, means for feeding stay material to said applying means in position to be engaged by said heated pressure member, said feeding means including means spaced from said pressure member for advancing the stay material to the latter, a pair of spaced rails extending from said stay advancing means towards said pressure member and forming a guide for the advancing stay material, a guide member located in spaced relation between said guide rails so that the stay material is advanced between said member and said rails by said advancing means, and guide means forming an extension of said rails and coacting with the advanced end of said guide member to direct the advancing stay material in between said pressure member and a box corner, said guide means being composed of a material having a substantially higher heat conductiveness than the material of said rails so that heat from said pressure member is passed away substantially fast, said guide member being substantially thinner than said rails, and said spaced rails and guide member permitting such free circulation of air therebetween that the amount of heat conducted by the same from said heated pressure member to said advancing means is insufficient to change the condition of the stay material in the region of said advancing means.

31. In a box staying machine, in combination, means for setting up box blanks into box form, four staying devices, two of said devices each being supported on a movable bar, said movable bars being arranged in substantially parallel relation, means supporting the ends of each of said movable bars to enable independent movement of the same toward and away from the other bar, independent rotary means associated with each bar and operable at one end of said bars for adjusting said movable bars relative to each other, and secondary independent rotary means associated with each bar and operable at said end of said bars for adjusting the staying devices on each bar relative to each other, said first mentioned and secondary rotary means associated with each bar being mounted on said bar and movable therewith.

32. In a box staying machine, in combination, means for setting up box blanks into box form, means for applying stays to the box corners, means for feeding stay material to said applying means, means for stripping a stayed box from said setting up means, ejecting means for ejecting the stripped box from the machine, and means operatively connecting said ejecting means and said applying means and enabling the latter to control the operative position of said ejecting means.

33. Box-making apparatus including, in combination, a box staying machine for setting up and staying paper boxes, means in said staying machine for automatically stopping the same at the end of each cycle of operation thereof, and a box making machine located in spaced relation to said staying machine and including means operable at a predetermined time in each cycle of operation of such box making machine and during an interval of rest of said staying machine, said operable means being operatively connected to and initiating a cycle of operation of said staying machine by each operation thereof.

34. Box-making apparatus including, in combination, a box staying machine for setting up and staying paper boxes, electrically controlled means in said staying machine for automatically stopping the same at the end of each cycle of operation thereof, a box-making machine located in spaced relation to said staying machine and including electrical means operable at a predetermined time in each cycle of operation of such box making machine and during an interval of rest of said staying machine, said operable means being electrically connected to said staying machine to enable the same on each operation thereof to initiate a cycle of operation of said staying machine, and electrical means in said staying machine and operable at a predetermined time following the initiation of a cycle of operation of such machine to control the time of operation of said electrically controlled means to stop the staying machine.

35. Box-making apparatus including, in combination, a box-making unit including a station at which paper boxes are introduced into a line of feed of such unit, a box staying machine for setting up and staying paper boxes and including a conveyor unit for feeding boxes from such machine to said station, said box staying machine being constructed to enable boxes to be discharged from the staying mechanism thereof outwardly from any one of a plurality of sides of said machine and said conveyor unit being adjustable to deliver boxes from such staying mechanism out through any one of said sides of said machine to said station, the staying mechanism of said machine delivering a stayed box to said conveyor unit at the end of each cyclic operation of such staying machine, means in said staying machine for automatically stopping the same at the end of each cycle of operation thereof, and means in said box-making unit operable in each cycle of operation thereof and following the completion of a cycle of operation of said staying machine, said operable means being operatively connected to and initiating a cycle of operation of said staying machine by each operation thereof.

36. In a box making machine, means at the set up station thereof for setting up box blanks into box form, means for applying stays to the corners of a box set up by said setting up means, means at such station for supporting a stayed set up box, means movable into position between said supported set up box and the next succeeding box, said movable means being controlled by said setting up means and operable by the latter in the said position to eject such set up box as the next succeeding box is brought into position to be set up, and means for actuating said setting up means to fold a blank delivered to said station into blank form and for actuating said staying means to stay the folded blank.

37. In a box making machine, means at the set up station thereof for setting up box blanks into box form and comprising a presser movable toward and away from said station, means for applying stays to the corners of a box set up on said presser, means at such station for supporting a stayed set up box, a member, means supporting said member for movement into and away from the path of movement of the set up boxes through the machine, means connecting said member to said presser to enable the latter to position said member between said supported set up box and the next succeeding box, said member in the said position being operable to eject such set up box as the next succeeding box is brought into position to be set up, and means for actuating said setting up means to fold a blank delivered to said station into blank form and for actuating said staying means to stay the folded blank.

38. In a box making machine, means at the set up station thereof for setting up box blanks into box form, means for applying stays to the corners of a box set up by said setting up means, means at such station for supporting a stayed set up box, means movable into position between said supported set up box and the next succeeding box, means for moving said member into said position after said set up box has been formed, said setting up means being operable to cause said movable means to discharge such set up box from said supporting means as the next succeeding box is brought into position to be set up, and means for actuating said setting up means to fold a blank delivered to said station into blank form and for actuating said staying means to stay the folded blank.

39. In a box staying machine, means including stay heating means at the staying station thereof for staying box blanks into box form, horizontally disposed means for guiding box blanks from a position remote from such station into box-forming position at said staying station, and means for feeding stay strip to said staying means, said stay strip feeding means including strip advancing means substantially spaced in a horizontal direction from said guiding means and the place of application of the stays at said staying station so as to be substantially unaffected by heat from said heating means, and means for guiding the tape pushed from said advancing means to said place of application and comprising elongated guide members providing elongated material guiding surfaces disposed in substantial parallelism so as to receive the stay material therebetween and to afford free ventilation to the stay material pushed therethrough.

40. In a box staying machine, means at the staying station thereof for staying box blanks into box form, horizontally disposed means for guiding box blanks from a position remote from such station into box-forming position at said staying station, and means for feeding stay strip to said staying means, said stay strip feeding means including strip advancing means substantially spaced in a horizontal direction from said box blank guiding means and the place of application of the stays at said station, and an extended horizontally disposed stay paper guiding means located between said strip advancing means and said place of stay application by said staying means and extending from said strip advancing means and under said box blank guiding means into operative proximity to the place of stay application by said staying means, said horizontally disposed stay paper guide means including upper and lower elongated guide members providing elongated material guide surfaces disposed in substantial parallelism and spaced apart a distance slightly greater than the thickness of the stay material to enable such material to advance therebetween in guided relation.

41. In a box staying machine, in combination, means for setting up box blanks into box form, means for applying stays to the box corners, and means for feeding stay strip to said applying means comprising a feed roll, means directly cooperative with said roll to feed the stay strip automatically to say applying means, means directly cooperative with said roll and operative manually to feed the stay strip to said applying means, and means movably supporting said feed roll and selectively adjustable to bring said feed roll into operative relation with either said automatic means or said manually operable means.

42. In a box staying machine, in combination, means for setting up box blanks into box form, means for applying stays to the box corners, and means for feeding stay strip to said applying means comprising a feed roll, an oscillatable member located on one side of the axis of rotation of said feed roll and cooperable with said feed roll to feed the stay strip to said applying means, means for automatically oscillating said member to cause an intermittent feed of the stay strip, a second roll mounted for rotatable movement about a stationary axis located on the other side of the axis of said feed roll and cooperable with said feed roll to advance the stay strip to said applying means, said second roll being manually operable, an arm supporting said feed roll, means pivotally supporting said arm, and selective means operable on said arm to bias said feed roll into operative relation with said oscillatable member or said second roll.

43. In a box staying machine, in combination, means for setting up box blanks into box form, means for applying stays to the box corners including a slide, a presser block mounted on the forward end of said slide, means slidably supporting said slide for longitudinal reciprocating movement, slide actuating means including a member having a recessed end connected to said slide at a point spaced rearwardly of said block, and means carried by said slide and including an eccentric interengaged with the recessed end of said member and operable to change the position of said slide and consequently the position of said block relative to said member.

44. In a box staying machine, in combination, a frame comprising a base, a pair of spaced front standards mounted on said base, and a pair of rear standards mounted on said base and spaced from said front standards, means supported by said standards and located in the upper portion of the area defined by said standards for folding box blanks and for staying the corners of said folded blanks, means mounted on said base and located in the lower portion of the area defined by said standards for driving said folding and staying means, said folding and staying means being spaced substantially above said driving means to provide therebetween a free space of sufficient height to accommodate the inner end of a box conveyor unit for removing from the machine boxes discharged by said folding and staying means, driven means connecting said driving means to said folding and staying means and extending substantially vertically therebetween adjacently to said standards to provide vertically disposed open areas centrally between the front standards and between at least one pair of associated front and rear standards, such central areas each being of sufficient size to accommodate a box conveyor unit for removal of boxes from the space between said folding and staying means and said driving means, through the area through which such unit is extended and out of the machine.

45. In a box staying machine, in combination, a frame having openings of substantial size in at least two sides thereof, means supported by said frame and located in the upper portion of the area defined by said frame for folding box blanks and for staying the corners of said folded blanks, means mounted in the lower portion of the area defined by said frame for driving said folding and staying means, said folding and staying means being spaced substantially above said driving means to provide a free space of sufficient height to accommodate the inner end of a box conveyor unit for removing finished boxes from the machine through one of said frame openings, and driven means connecting said driving means to said folding and staying means and constructed and arranged within said frame so as not to interfere with such placement of the box conveyor unit through either of said openings.

46. In a box staying machine, in combination, a frame having openings of substantial size in at least two sides thereof, means supported by said frame and located in the upper portion of the area defined by said frame for folding box blanks and for staying the corners of said folded blanks, means mounted in the lower portion of the area defined by said frame for driving said folding and staying means, a box conveyor unit connected to said machine, means for supporting said conveyor unit within the machine mounted on said frame and located between said folding and staying means and said driving means, said folding and staying means being spaced substantially above said supporting means to provide a free space of sufficient height to accommodate the inner end of said box conveyor unit in position upon said supporting means to transport boxes discharged by said folding and staying means out of the machine through one of said frame openings, means connecting said box conveyor unit to said supporting means, and driven means connecting said driving means to said folding and staying means and constructed and arranged within said frame so as not to interfere with such placement of the box conveyor unit through either of said openings.

47. In a box staying machine, in combination, a frame having openings of substantial size in at least two sides thereof, each of said openings being capable of receiving a box conveyor unit for the removal therethrough of the boxes finished within the machine, means supported by said frame and located in the upper portion of the area defined by said frame for folding box blanks and for staying the corners of said folded blanks, means mounted in the lower portion of the area defined by said frame for driving said folding and staying means, said folding and staying means being spaced substantially above said driving means to provide in the intermediate portion of said area defined by said frame a space in free communication with all of said frame openings and of sufficient height to enable a box conveyor unit to be accommodated in such intermediate portion, in position to receive the finished boxes from said folding and staying means and to transport them through one of said frame openings to a place of discharge outside of the machine, means driven by said driving means and located in the lower portion of the area defined by said frame, and means connecting said driven means to said folding and staying means so as not to interfere with such placement of the box conveyor unit with relation to either of said openings.

48. In a box staying machine, in combination, a frame having openings of substantial size in at least two sides thereof and each capable of receiving a box conveyor unit for the removal therethrough of the box finished within the machine, said frame including in the upper portion thereof a pair of fixed transverse supporting bars arranged in spaced substantially parallel relation, a pair of movable bars arranged in spaced parallel relation and extending at right angles to said fixed bars, means supporting said movable bars on said fixed bars to enable movement of said movable bars relative to each other, staying mechanism mounted on said movable bars, means mounted in the lower portion of the area defined by said frame for driving said staying mechanism, said staying mechanism being spaced substantially above said driving means to provide in the intermediate portion of said area defined by said frame a space in free communication with all of said frame openings and of sufficient height to enable a box conveyor unit to be accommodated in such intermediate portion, in position to receive the finished boxes from said folding and staying means and to transport them through one of said frame openings to a place of discharge outside of the machine, means driven by said driving means and located in the lower portion of the area defined by said frame at a plurality of fixed places complementing said staying mechanism, and means connecting said driven means to said staying mechanism so as not to interfere with such placement of the box conveyor unit with relation to either of said openings.

49. In a box staying machine, in combination, a frame having openings of substantial size in at least two sides thereof and each capable of receiving a box conveyor unit for the removal therethrough of the box finished within the machine, said frame including in the upper portion thereof a pair of fixed transverse supporting bars arranged in spaced substantially parallel relation, a pair of movable bars arranged in spaced parallel relation and extending at right angles to said fixed bars, means supporting said movable bars on said fixed bars to enable movement of said movable bars relative to each other, staying mechanism mounted on said movable bars, means mounted in the lower portion of the area defined by said frame for driving said staying mechanism, a removable box conveyor unit detachably connected to said machine, means for supporting said conveyor unit within the machine fixedly mounted on said frame and located between said staying mechanism and said driving means, said staying mechanism being spaced substantially above said conveyor unit supporting means to provide in the intermediate portion of said area defined by said frame space in free communication with all of said frame openings and of sufficient height to enable said box conveyor unit to be accommodated in such intermediate portion, in position to receive the finished boxes from said folding and staying means and to transport them through one of said frame openings to a place of discharge outside of the machine, means connecting said box conveyor unit to said supporting means, means driven by said driving means and located in the lower portion of the area defined by said frame, and means connecting said driven means to said staying mechanism so as not to interfere with such placement of the box conveyor unit with relation to either of said openings, said connecting means being adjacent to and available through said openings but not obstructing the areas of the latter.

50. In a box staying machine, in combination, a frame having openings of substantial size in at least two sides thereof, means supported by said frame and located in the upper portion of the area defined by said frame for folding box blanks and for staying the corners of said folded blanks, means mounted in the lower portion of the area defined by said frame for driving said folding and staying means, said folding and staying means being spaced above said driving means to provide in the intermediate portion of the area defined by said frame a space of substantial area and said side frame openings being in free communication with the space provided in such intermediate portion and being of sufficient size and configuration to expose and to render such folding and staying means accessible therethrough through the space in such intermediate portion between said folding and staying means and said driving means, driven means connecting said driving means to said folding and staying means and constructed and arranged within said frame so as not to interfere with the accessibility of said folding and staying means through said side frame openings, said box folding means including a vertically disposed plunger connected to said driving means by said driven means, and means movably supporting said plunger mounted on said frame so as not to interfere with the accessibility of said folding and staying means through said side frame openings.

51. In a box staying machine, in combination, a frame having openings of substantial size in the sides thereof, means supported by said frame and located in the upper portion of the area defined by said frame for folding box blanks and for staying the corners of said folded blanks, said box folding means being arranged centrally of said frame and said staying means comprising four staying devices, two of which are arranged in associated relation on each side of the machine, means mounted in the lower portion of the area defined by said frame for driving said folding and staying means, said folding and staying means being spaced above said driving means to provide in the intermediate portion of the area defined by said frame a space of substantial area and each of said side frame openings being in free communication with the space provided in such intermediate portion and being of sufficient size and configuration to expose and to render said box folding means and the two associated staying devices accessible therethrough upwardly through the space in such intermediate portion between said folding and staying means and said driving means, driven means connecting said driving means to said folding and staying means and constructed and arranged within said frame so as not to interfere with the accessibility of said folding and staying means through said side frame openings, said box folding means including a vertically disposed plunger connected to said driving means by said driven means, an upright support mounted on one side of said frame so as not to interfere with the accessibility of said folding and staying means through said side frame openings, and transverse means movably supporting said plunger mounted on said support and extending inwardly therefrom over said folding and staying means to a position overlying said box forming means, said plunger being movably supported on the inner free end of said transverse means.

52. In a box staying machine, in combination, a frame, means supported by said frame and located in the upper portion of the area defined by said frame for folding box blanks and for staying the corners of said folded blanks, said box folding means being arranged substantially centrally of said frame and said staying means comprising four staying devices, two of which are arranged in associated relation on each side of the machine, means mounted in the lower portion of the area defined by said frame for driving said folding and staying means and being spaced below the latter to provide in the intermediate portion of the area defined by said frame a space of substantial area, the sides of said frame in the region of the space in such intermediate portion between said driving means and said folding and staying means being open so as to expose and to render such folding means and two associated staying devices accessible through each side of the frame, driven means connecting said driving means to said folding and staying means and constructed and arranged within said frame so as not to interfere with the accessibility of said folding and staying means through the frame sides, said box forming means including a vertically disposed plunger connected to said driving means by said driven means, and means movably supporting said plunger mounted at one end on a side of said frame so as not to interfere with the accessibility of said folding and staying means through the frame sides and extending inwardly therefrom between the pairs of associated staying devices to a position overlying said box forming means, said plunger being movably supported on the inner other end of said supporting means.

53. In a box staying machine, in combination, a frame having in at least one side thereof an opening of a size enabling the insertion therethrough of a box conveyor unit for the removal through such opening of boxes finished within the machine, means supported by said frame and located in the upper portion of the area defined by said frame for folding box blanks and for staying the corners of said folded blanks, said box folding means being arranged substantially centrally within such area and including a box form, means mounted in the lower portion of the area defined by said frame for driving said folding and staying means, said driving means being spaced substantially below said folding and staying means to provide in the intermediate portion of the area defined by said frame a space in free communication with the opening in said frame and of sufficient area to enable a box conveyor unit to be accommodated therein, in position to receive the downwardly discharged finished boxes from said folding and staying means and to transport them through said opening out of the machine, means spaced from said folding and staying means for supporting a stack of box body blanks, means for feeding blanks from said stack and along a predetermined line of feed into position beneath the box form of said box folding means, a plunger carrying said form, means supporting said plunger for reciprocating movement in a vertical direction comprising a cantilever support mounted at one end thereof on said frame at a place where it does not interfere with the discharge of the finished boxes by the box conveyor unit through said frame opening and extending from said place inwardly over said folding and staying means to terminate at a place above said box form, and means connecting said plunger to such terminating end of said cantilever support.

54. In a staying machine, in combination, a frame, means supported by said frame and located in the upper portion of the area defined by said frame for folding box blanks and for staying the corners of said folded blanks, said box folding means being arranged substantially centrally of said frame and said staying means comprising four staying devices, two of which are arranged in associated relation on each side of the machine, means mounted in the lower portion of the area defined by said frame for driving said folding and staying means and being spaced below the latter to provide in the intermediate portion of the area defined by said frame a space of substantial area, the sides of said frame upwardly from a horizontal plane through the space in such intermediate portion between said driving means and said folding and staying means being open so as to expose and to render such folding means and two associated staying devices accessible through each side of the frame, the front of said frame having a height related to the field of action of said folding and staying means with the top thereof at approximately the same level as such field of action to render said folding means and the two front staying devices accessible over the top of the front of the frame, and driven means connecting said driving means to said folding and staying means and constructed and arranged within said frame so as not to interfere with the accessibility of said folding and staying means through the frame sides.

55. In a staying machine, in combination, a frame, a pair of elongated movable supports spanning in spaced parallel relation the upper portion of the area defined by the sides of said frame and extending in substantial parallelism with the sides of said frame, box folding means arranged substantially centrally of said frame and between said movable supports, box staying means comprising a pair of staying devices mounted on each of said movable supports in associated relation with said box folding means, means supporting the ends of said movable supports on fixed portions of said frame to enable movement of said supports on said frame independently of each other, means for adjusting said movable supports separately on said frame relative to one another and to said box folding means, said adjusting means including said supporting means and operative means mounted on each of said movable supports and movable therewith, means for adjusting the pair of staying devices on each movable support longitudinally of the latter relative to one another and independently of the staying devices on the other movable support, and means at a predetermined location on said frame controlling the means for adjusting at least one of said movable supports and the means for adjusting the staying devices mounted thereon and operable to affect adjustment of such movable support and associated staying devices.

56. In a staying machine, in combination, a frame, a pair of elongated movable supports spanning in spaced parallel relation the upper portion of the area defined by the sides of said frame and extending in substantial parallelism with the sides of said frame, box folding means arranged substantially centrally of said frame and between said movable supports, box staying means comprising a pair of staying devices mounted on each of said movable supports in associated relation with said box folding means, means supporting the ends of said movable supports on fixed portions of said frame to enable movement of said supports on said frame independently of each other, means for adjusting said movable supports separately on said frame relative to one another and to said box folding means, said adjusting means including said supporting means and operative means mounted on each of said movable supports and movable therewith, means for adjusting the pair of staying devices on each movable support longitudinally of the latter relative to one another and independently of the staying devices on the other movable support, and means at a predetermined location on the front of the frame controlling the means for adjusting said movable supports and the means for adjusting the staying devices mounted thereon and operable from the front of the machine to affect adjustment of said movable supports and staying devices.

57. In a staying machine, in combination, a frame, a pair of elongated movable supports arranged in spaced parallel relation in the upper portion of the area defined by said frame and extending in substantial parallelism with the sides of said frame, box folding means arranged substantially centrally of said frame and between said movable supports, box staying means comprising a pair of staying devices mounted on each of said movable supports in associated relation with said box folding means, means for adjusting said movable supports on said frame relative to one another and to said box folding means, means for adjusting the pair of staying devices on each movable support longitudinally of the latter relative to one another, and means at a predetermined location on the front of the frame controlling the means for adjusting said movable supports and the staying devices mounted thereon and operable from the front of the machine to affect adjustment of said movable supports and staying devices, means mounted in the lower portion of the area defined by said frame for driving said folding and staying means and being spaced below the latter to provide in the intermediate portion of the area defined by said frame a space of substantial area, the sides of said frame upwardly from a horizontal plane through the space in such intermediate portion between said driving means and said folding and staying means being open so as to expose and to render such folding means and two associated staying devices accessible through each side of the frame, the front of said frame having a height related to the field of action of said folding and staying means with the top thereof at approximately the same level as such field of action to render said folding means and the two front staying devices accessible over the top of the front of the frame, and driven means connecting said driving means to said folding and staying means and constructed and arranged within said frame so as not to interfere with the accessibility of said folding and staying means through the frame sides.

58. In a staying machine, in combination, a frame housing for the machine, a pair of elongated movable supports arranged in spaced parallel relation in the upper portion of the area defined by said frame and extending in substantial parallelism with the sides of said frame, devices supporting the front and rear ends of said supports on said frame and being movable on said frame in sidewise directions at right angles to the lengths of said supports, box folding means arranged substantially centrally of said frame and between said movable supports, box staying means comprising a pair of staying devices mounted on each of said movable supports in associated relation with said box folding means, means associated with the rear ends of said supports for supporting a stack of box blanks and including a plurality of vertical guide bars to position the blanks in proper position on said stack supporting means, said guide bars being carried by said supporting devices and movable with the same, means for effecting sidewise adjustment of said supporting devices on said frame and therefore said guide bars and said movable supports, said adjusting means including operative means mounted on said movable supports and movable therewith, and means at the front ends of said supports and operable to actuate said adjusting means.

59. In a staying machine, in combination, a frame housing for the machine, a pair of movable bars arranged in spaced relation in the upper portion of the area defined by said frame and extending in substantial parallelism with the sides of said frame, slides slidably mounted on said frame for sidewise movement at right angles to the lengths of said bars and supporting the front and rear ends of said bars, box folding means located between said bars and substantially centrally of said frame, a pair of staying devices mounted on each of said bars in associated relation with said box folding means, a hopper for stacking box blanks mounted on the rear of said frame and associated with the rear ends of said bars, movable vertical blank guide bars forming part of said hopper and carried by the pair of slides supporting the rear ends of said bars, means for effecting sidewise adjustment of each movable bar and its associated slides and the guide bar carried by the rear associated slide, said adjusting means including operative means mounted on each movable bar and movable therewith and means at the front of said frame and operable to actuate said adjusting means.

60. In a box staying machine, in combination, means for folding box blanks and for staying the corners of said folded blanks including a box forming member engageable with a blank, means for advancing said forming member into engagement with a blank comprising a resilient drive member constructed to function as a rigid drive member under normal conditions of operation and to yield when during the box forming operation forces opposing the advancement of said drive member become greater than normal, means to stop the advancing movement of said forming member when the forces opposing the advancement of said drive member cause the latter to yield substantially, and means for actuating said staying means to stay a box formed by said forming member under said normal conditions.

61. In a box staying machine, in combination, means for folding box blanks and for staying the corners of said folded blanks including means for driving said folding and staying means, a box forming member engageable with a blank, means connected to said driving means for advancing said forming member into engagement with a blank and comprising a resilient drive member constructed to function as a rigid drive member under normal conditions of operation and to yield when during the box forming operation forces opposing the advancement of said drive member become greater than normal, means controlling the operation of said driving means, means connected to said resilient drive member and operative when the forces opposing the advancement of said drive member cause the latter to yield substantially to actuate said control means to render said driving means inoperative to drive said folding and staying means, and means for actuating said staying means to stay a box formed by said forming member under said normal conditions.

62. In a box staying machine, in combination, means for setting up box blanks including a form, means for applying stays to the corners of set up boxes including a slide, means slidably supporting said slide for longitudinal reciprocal movement, a presser block mounted on the forward end of said slide, a cylindrically-shaped stud carried by the other end of said slide, said stud extending transversely through said slide and being provided on one projecting end thereof with a rotatable member having an axis of rotation offset from the central axis of said stud, a rotatably reciprocating slide actuating shaft offset from said stud, an arm fixed to said actuating shaft and having a socket within which said rotatable member is positioned, whereby rotational movement of said shaft is transformed into sliding movement of said slide through said arm, rotatable member and stud, and adjusting means provided on the other projecting end of said stud and operable to turn said stud about its longitudinal axis and thereby to adjust the relative positions of said slide and arm and the relative positions of said presser block and form.

63. In a box staying machine, in combination, means for setting up box blanks including a form, means for applying stays to the corners of set up boxes comprising a pair of elongated movable supports arranged in spaced parallel relation and on opposite sides of said form and a pair of staying devices mounted on each of said movable supports in associated relation with said box folding means, means for adjusting said movable supports relative to one another to adjust the pair of staying devices on each such support as a unit relative to said form, each of said staying devices including a slide, a presser block mounted on the forward end of said slide, a cylindrically-shaped stud carried by the other end of said slide, said stud extending transversely of said slide and being provided on one end thereof with a rotatable member having an axis of rotation offset from the central axis of said stud, a rotatably reciprocating shaft associated with each staying device, an arm fixed to each such shaft and having a socket within which an associated rotatable member is positioned, and means on each stud operable to turn the latter about its longitudinal axis and thereby to adjust individually the position of its associated presser block and slide relative to said form.

64. In a box staying machine, in combination, means for setting up box blanks including a form, means for staying a corner of a box blank set up on said form including a corner presser block, a device for feeding stay strip material between said presser block and the corner, means for cutting said material including an upper knife and a lower knife mounted on said presser block, means supporting said presser block for longitudinal reciprocating movement comprising a rotatable shaft, and means for preventing the rotation of said shaft during the cutting action of said knives on said stay strip material.

65. In a box staying machine, in combination, means for setting up box blanks including a form, means for staying a corner of a box blank set up on said form including a slide, means for reciprocating said slide longitudinally in a fixed path, a corner presser block carried on the forward end of said slide, means pivotally connecting said block to said slide, and means for preventing pivotal movement of said block relative to said slide for a portion of the stroke of said slide, said last mentioned means being operable beyond a point spaced from said corner of a box blank set up on said form and between said point and said corner permitting pivotal movement of said block on said slide.

66. In a box staying machine, in combination, means for setting up box blanks including a form, means for staying a corner of a box blank set up on said form including a slide, means for reciprocating said slide longitudinally in a fixed path, a corner presser block carried on the forward end of said slide, means pivotally connecting said block to said slide, guide means provided on said block and movable therewith, a member fixed relative to said block, guide means provided on said fixed member, said guide means being constructed and arranged to coact for a portion of the stroke of said slide beyond a point spaced from said corner of a box blank set up on said form to prevent pivotal movement of said block relative to said slide and to permit pivotal movement of said block on said slide between said point and said corner.

67. In a box staying machine, in combination, means for setting up box blanks into box form, means for applying stays to the box corners, a plurality of means for feeding stay material to said applying means, means for feeding a box blank to said setting up means including a suction feeding device, and detecting means controlled by the suction in said feeding device and operable to interfere with the operation of said plurality of means for feeding stay material when the suction in said feeding device is not built up to normal degree.

68. Box making apparatus including, in combination, a box staying machine for setting up and staying boxes, means for stopping said staying machine at the end of each cycle of operation thereof, a box making machine associated with said stayer, means for cyclically operating said box making machine through a cycle of longer duration than that of said staying machine cycle, means governed by the operation of said box making machine and actuated in a cycle thereof during stoppage of said staying machine, and means controlled by said governed means and operable on actuation of the latter to start operation of said staying machine for a single cycle in cooperation with a cycle of operation of said box making machine, said stopping means operating to stop said staying machine prior to the completion of the cooperating box making machine cycle.

69. Box making apparatus including, in combination, a box staying machine for setting up and staying boxes, means for causing operation of said staying machine for a single cycle of predetermined duration, a box making machine associated with said stayer, means for causing operation of said box making machine through a cycle of longer duration than that of said staying machine cycle, means governed by the operation of said box making machine and actuated in that portion of a cycle thereof occurring in the interval between cycles of said staying machine, and said staying machine operating means including means controlled by said governed means and operable on actuation of the latter to start operation of said staying machine for a single cycle in cooperation with a cycle of operation of said box making machine, and means operable to stop said staying machine prior to the completion of the cooperating box making machine cycle.

70. Box making apparatus including, in combination, a box staying machine for setting up and staying boxes, means for causing operation of said staying machine for a single cycle of predetermined duration, a continuously operating box making machine associated with said stayer, means for cyclically operating said box making machine without interruption through a number of cycles each of longer duration than that of said staying machine cycle, means governed by the operation of said box making machine and actuated at a predetermined point in that portion of each cycle thereof occurring in the intervals between successive cycles of said staying machine, and said staying machine operating means including means controlled by said governed means and operable on each actuation of the latter to start operation of said staying machine for a single cycle in cooperation with a cycle of operation of said box making machine, and means operable to stop said staying machine prior to the completion of such cooperating box making machine cycle.

71. Box making apparatus including, in combination, an intermittently operating box staying machine for setting up and staying boxes, a continuously operating box making machine connected to said staying machine and coacting with the latter, means for driving said staying machine on each operation thereof through a cycle of predetermined duration, means for operating said box making machine without interruption through a number of cycles each of longer duration than that of said staying machine cycle so that said box making machine in each cycle thereof continues in operation after said staying machine has completed a cooperating cycle, means governed by the operation of said box making machine and actuated at a predetermined point in that portion of each cycle thereof occurring in the intervals between successive cycles of said staying machine, means controlled by said governed means and controlling said stay machine driving means and operable on each actuation of said governed means to cause said driving means to start driving said staying machine for a single cycle in cooperation with a cycle of operation of said box making machine, said stay machine driving means including means operable to stop said staying machine prior to the completion of such cooperating box making machine cycle and independently of said governed means.

72. Box making apparatus including, in combination, an intermittently operating box staying machine for setting up and staying boxes, a continuously operating box making machine connected to said staying machine and coacting with the latter, means including electrical means for driving said staying machine on each operation thereof through a cycle of predetermined duration, means including a rotatable cam for operating said box making machine without interruption through a number of cycles each of longer duration than that of said staying machine cycle so that said box making machine in each cycle thereof continues in operation after said staying machine has completed a cooperating cycle, switch actuating means governed by the operation of said cam and actuated at a predetermined point in that portion of each cycle of movement thereof occurring in the intervals between successive cycles of said staying machine, switch means controlled by said governed actuating means and controlling said electrical means and operable on each such actuation of said actuating means to operate said electrical means to cause said driving means to start driving said staying machine for a single cycle in cooperation with a cycle of operation of said box making machine, said stay machine driving means including a stop switch operable independently of said cam to stop said staying machine prior to the completion of such cooperating box making machine cycle.

73. In a box staying machine, in combination, a frame housing for the machine, a pair of supporting bars mounted in fixed relation on two opposed sides of said frame, a pair of movable bars bridging said opposed frame sides, means supporting the ends of said movable bars on said fixed bars to enable movement of said movable bars on said fixed bars and independently of each other, means including operative means mounted on each movable bar and movable therewith for separately moving said bar, a pair of staying devices movably mounted on each of said movable bars, and means for moving said staying devices on each of said movable bars relative to each other and independently of the staying devices on the other of said movable bars.

74. In a box staying machine, in combination, means for setting up box blanks into box form, means for applying stays to the box corners, means for feeding stay material to said applying means, said applying and feeding means being located at a forming station and including a pair of movable stay engaging members and means for moving said members into and out of engagement with the stay material during the feeding and application of stays thereby, said last mentioned means being operative to cause said feeding means member to advance the stay material as said applying means member is advancing into stay applying position and to withdraw said feeding means member from engagement with such stay material on the retraction of said applying means member from its stay applying position.

75. In a box staying machine, in combination, means for setting up box blanks into box form, means for applying stays to the box corners, means for feeding stay material to said applying means, said applying and feeding means being located at a forming station and including a pair of movable stay engaging members, separate actuating means for each of said members and operable to cause said members to feed and apply the stay material to the box blanks, and means connected to said members and operable on the advancement and retraction of said applying means member to and from its stay applying position to position the feeding means member to advance the stay material as said applying means member is advanced and to withdraw said feeding means member from engagement with the stay material on the retracting motion of said applying means member.

76. In a box staying machine, in combination, means for setting up box blanks into box form, means for applying stays to the box corners, means for feeding stay material to said applying means including a first stay feeding member located on one side of the path of feed of the stay material, a second stay feeding member located on the other side of the path of feed of the stay material, means for moving one of said stay feeding members into and out of stay clamping relation with the other of said members, and means for advancing and retracting one of said members relative to the other in directions transverse to the directions of movement for effecting said clamping and unclamping relation to cause the feed of the stay material and to return such member to a position for advancement.

77. In a box staying machine, in combination, means for setting up box blanks into box form, means for applying stays to the box corners, a plurality of means for feeding stay material to said applying means, means for feeding a box blank to said setting up means including a suction feeding device, and detecting means controlled by the suction in said feeding device and operable to interfere with the operations of said plurality of stay material feeding means when said suction in said feeding device is not built up to a material degree sufficient to enable the feeding of a blank.

78. In a box staying machine, in combination, a frame having openings in at least two different sides thereof so that they face in different directions from said machine, each of said openings being of sufficient size to enable the ready accommodation therein of a conveyor for the removal through such opening of boxes finished within the machine, means supported by said frame and located in the upper portion of the area defined by said frame for folding box blanks and for staying the corners of said folded blanks, said folding and staying means discharging the finished boxes downwardly into an intermediate portion of the area defined by said frame and providing a discharge space in free communication with said frame openings and of sufficient size to enable a box conveyor unit to be accommodated in such intermediate portion, in position to receive the finished boxes from said folding and staying means and to transport them through one of said frame openings to a place of discharge outside of the machine, said box folding means including a box form, a vertically disposed plunger carrying said box form, and means movably supporting said plunger mounted on a side of said frame other than the sides thereof in which said openings are formed so as not to interfere with said placement of a box conveyor through said frame openings, said supporting means extending inwardly from said supporting side of the frame and having an inner end overlying said folding and staying means, said plunger being supported on such inner end of said supporting means.

79. In a box staying machine, in combination, a frame having openings in at least two different sides thereof so that they face in different directions from said machine, each of such openings being of sufficient size to enable the ready accommodation therein of a conveyor for the removal through such opening of boxes finished within the machine, means including a box form supported by said frame and located in the upper portion of the area defined by said frame for folding box blanks and for staying the corners of said folded blanks, the area defined by said frame below said folding and staying means including a space in free communication with both of said openings in said frame and of sufficient size to accommodate the inner end portion of a box conveyor unit, means spaced from said folding and staying means for supporting a stack of body blanks, means for feeding blanks from said stack and along a predetermined line of feed into position beneath the box form of said box folding means, a plunger carrying said box form and operable to move the latter downwardly to form a box, the finished box being discharged into said space below said folding and staying means, a conveyor for removing finished stayed boxes from said machine and being positionable to receive the downwardly discharged finished boxes from said folding and staying means and to transport them in a plurality of different directions through said frame openings and out of the machine, means for supporting said conveyor in either direction in which it is placed for removal of the finished boxes from the machine, and operating mechanism for said form carrying plunger and constructed and arranged on said frame to permit said conveyor to be so positioned for removal of the finished boxes in said plurality of different directions.

80. In a box staying machine, in combination, a frame body having two sides and two ends, the two sides and one end of said frame body defining at the top of such body an area of operation for folding box blanks and for staying the corners of the folded blanks, a box blank supply area adjacent to the remaining side of said area of operation, and means on said frame body for feeding box blanks from said supply area to said area of operation, said frame body including an elongated fixed bar located at the top of that end thereof defining one side of said area of operation and beyond and extending transversely to the line of feed of the box blanks to the place for folding the box blanks in said area of operation, said frame body including a second fixed bar disposed in spaced parallelism with said first fixed bar and located on the other side of the place for folding the box blanks in said area of operation so that both of said fixed bars form opposed sides of such area of operation, said second fixed bar being disposed below the line of feed of the box blanks to said area of operation, a pair of independently movable elongated bars of substantial width horizontally spanning said area of operation and extending from one fixed bar to the other in parallelism with the line of feed of the box blanks to said area, means connecting the ends of said movable bars to said fixed bars and being constructed to enable each movable bar to be slidably moved along said fixed bars independently of the other to an adjusted position in said area of operation, and a plurality of staying devices mounted in spaced relation on the upper surface of each movable bar within said area of operation and movable therewith on adjustment of said movable bar relative to said fixed bars.

81. In a box staying machine, in combination, a frame body having two sides and two ends, the two sides and one end of said frame body defining at the top of such body an area of operation for folding box blanks and for staying the corners of the folded blanks, a box blank supply area adjacent to the remaining side of said area of operation, and means of said frame body for feeding box blanks from said supply area to said area of operation, said frame body including an elongated fixed bar having greater width than thickness located at the top of that end thereof defining one side of said area of operation and beyond and extending transversely to the line of feed of the box blanks to the place for folding the box blanks in said area of operation, the sides of said fixed bar being vertically disposed so that one longitudinal edge thereof is uppermost, said frame body including a second fixed bar of greater width than thickness disposed with its sides in parallelism with the sides of said first fixed bar and located on the other side of the place for folding the box blanks in said area of operation so that both of said fixed bars form opposed sides of said area of operation, the upper longitudinal edge of said second fixed bar being disposed below the line of feed of the box blanks to said area of operation, and both of said fixed bars having a corresponding longitudinal edge disposed at the same level, a pair of independently movable bars having greater width than thickness spanning said area of operation and extending from one fixed bar to the other in parallelism with the line of feed of the box blanks to said area, the sides of said movable bars being horizontally disposed and the longitudinal edges thereof being parallelly arranged, means connecting the ends of said movable bars to said fixed bars so that one side of each movable bar is opposed in slidable relation to the longitudinal edges of both fixed bars disposed at the same level, said connecting means being constructed to enable each movable bar to be slidably moved along said longitudinal edges of the same level independently of the other to an adjusted position in said area of operation, and a plurality of staying devices mounted in spaced relation on the upper side of each movable bar within said area of operation and movable therewith on adjustment of said movable bar relative to said fixed bars.

82. In a box staying machine, in combination, a frame body, means supported by said frame body and located at the top of said frame body for folding box blanks and for staying the corners of the folded blanks, said supported folding and staying means discharging the finished boxes downwardly into an open area within the confines of said frame body immediately below said supported means and providing a discharge space, means spaced below said supported means for supporting a box conveyor unit in position in said discharge space to receive the finished boxes discharged by said supported means, said conveyor supporting means being spaced sufficiently below said supported means so that when a box conveyor unit is supported thereby the discharge space between such unit and said supported means is of sufficient depth to enable such unit to transport the finished boxes without hinderance out of the machine in a direction transverse to the direction of discharge of such boxes from said supported means, said frame body having an opening in at least one side thereof providing an open area in free communication with said discharge space and of sufficient size to enable the box conveyor unit to discharge the finished boxes therethrough without hinderance, said frame body at the top thereof including an elongated fixed bar defining one side of the area of operation of said supported means, and including a second elongated fixed bar disposed in parallelism with said first fixed bar and defining the opposite side of said area of operation, a pair of independently movable elongated bars of substantial width extending in spaced parallelism from one fixed bar to the other, said movable bars bridging said discharge space and together with said fixed bars defining the upper limits thereof, means connecting the ends of said movable bars to said fixed bars and being constructed to enable each movable bar to be slidably moved along said fixed bars over said discharge space and independently of the other movable bar to an adjusted position in said area of operation, and said supported means including a plurality of staying devices mounted in spaced relation on each movable bar within said area of operation and movable therewith on adjustment of said movable bar relative to said fixed bars.

83. In a box staying machine, in combination, a frame body, means supported by said frame body and located in an area of operation at the top of said frame body for folding box blanks and for staying the corners of the folded blanks, means adjacent to said area of operation for supporting a stack of box blanks and including guide means for positioning the blanks in proper position on said stack supporting means, and means on said frame body for feeding box blanks from said stack supporting means to said area of operation, said supported folding and staying means discharging the finished boxes downwardly into an open area within the confines of said frame body immediately below said supported means and providing a discharge space, means spaced below said supported means for supporting a box conveyor unit in position in said discharge space to receive the finished boxes discharged by said supported means, said conveyor supporting means being spaced sufficiently below said supported means so that when a box conveyor unit is supported thereby the discharge space between such unit and said supported means is of sufficient depth to enable such unit to transport the finished boxes without hinderance out of the machine in a direction transverse to the direction of discharge of such boxes from said supported means, said frame body having an opening in at least one side thereof providing an open area in free communication with said discharge space and of sufficient size to enable the box conveyor unit to discharge the finished boxes therethrough without hinderance, said frame body at the top thereof including an elongated fixed bar defining one side of the area of operation of said supported means and located beyond and extending transversely to the line of feed of the box blanks to the place for folding the box blanks in said area of operation, and including a second elongated fixed bar disposed in spaced parallelism with said first fixed bar and located on the other side of such place for folding the box blanks to define the opposite side of said area of operation, said second fixed bar being disposed below the line of feed of the box blanks from said stack supporting means to said area of operation, a pair of independently movable elongated bars of substantial width extending in spaced parallelism from one fixed bar to the other, said movable bars bridging said discharge space and together with said fixed bars defining the upper limits thereof, means connecting the ends of said movable bars to said fixed bars and being constructed to enable each movable bar to be slidably moved along said fixed bars over said discharge space and independently of the other movable bar to an adjusted position in said area of operation, said supported means including a plurality of staying devices mounted in spaced relation on each movable bar within said area of operation and movable therewith on adjustment of said movable bar relative to said fixed bars, and said stack supporting guide means being connected to said movable bars and movable therewith to automatically adjust said stack supporting means in conformance with the adjustment of said staying devices.

84. In a box staying machine, in combination, a frame body, means supported by said frame body and located at the top of said frame body for folding box blanks and for staying the corners of the folded blanks, a box blank supply area provided at one end of said frame body, and means on said frame body for feeding box blanks from said supply area to said supported means, said supported folding and staying means discharging the finished boxes downwardly into an open area within the confines of said frame body immediately below said supported means and providing a discharge space, means spaced below said supported means for supporting a box conveyor unit in position in said discharge space to receive the finished boxes discharged by said supported means, said conveyor supporting means being spaced sufficiently below said supported means so that when a box conveyor unit is supported thereby the discharge space between such unit and said supported means is of sufficient depth to enable such unit to transport the finished boxes without hinderance out of the machine in a direction transverse to the direction of discharge of such boxes from said supported means, said frame body having an opening in at least one side thereof providing an open area in free communication with said discharge space and of sufficient size to enable the box conveyor unit to discharge the finished boxes therethrough without hinderance, said frame body at the top thereof including an elongated fixed bar defining one side of the area of operation of said supported means, and including a second elongated fixed bar disposed in parallelism with said first fixed bar and defining the opposite side of said area of operation, a pair of independently movable elongated bars of substantial width extending in spaced parallelism from one fixed bar to the other, said movable bars bridging said discharge space and together with said fixed bars defining the upper limits thereof, means connecting the ends of said movable bars to said fixed bars and being constructed to enable each movable bar to be slidably moved along said fixed bars over said discharge space and independently of the other movable bar to an adjusted position in said area of operation, and said supported means including a plurality of staying devices mounted in spaced relation on each movable bar within said area of operation and movable therewith on adjustment of said movable bar relative to said fixed bars, a box form associated with said supported means, a vertically disposed plunger carrying said box form, a slide supporting said plunger, vertically disposed guide bars for said slide located above said discharge space, and slide actuating means extending from said supply area end of said frame body and operatively connected to said slide.

85. In a box staying machine, in combination, a frame, a support for holding a supply of box blanks, an area of operation for forming stayed set up boxes from said box blanks located adjacent to said support, means on said frame for feeding box blanks from said support to said area of operation, said area of operation being defined on one side thereof by an elongated bar fixedly mounted on said frame and located between said support and the place for forming the boxes in said area of operation and below the line of feed of the box blanks to said area of operation and extending transversely to such line of feed of the box blanks, so that such blanks pass thereover on their way from said support to said area of operation, a second elongated bar fixedly mounted on said frame in spaced parallel relation to said first fixed bar and located on the other side of and beyond the place for forming the boxes so that both of said fixed bars form opposed sides of said area of operation, a pair of independently movable elongated bars horizontally extending from one fixed bar to the other in substantial parallelism with the line of feed of the box blanks across said first fixed bar to said place for forming the boxes and defining the other two sides of said area of operation, a plurality of breaker bars mounted on said movable bars and movable therewith on adjustment of said movable bars relative to said fixed bars, said breaker bars in any adjusted position of said movable bars being located in said area of operation and parallelly arranged so that the width of the space therebetween approximates the width of the box to be formed in such adjustment and is less than the width of the blank therefor on said support, means including said breaker bars operative within the area defined by said fixed and movable bars to set up a box blank delivered to said box forming place into box form and to cause a stayed box to advance to a position below said box forming place a plurality of staying devices mounted in spaced relation on each movable bar and movable therewith and with the associated breaker bar on adjustment of said movable bar relative to said fixed bars, said staying devices being operable to apply stays to the corners of a box set up by said setting up means, and means for removing the stayed box from such position along a path below said fixed and movable bars so that the stayed box will pass under one of such bars as it is transported from the machine.

86. In a box staying machine such as defined in claim 85, in which said blank feeding means includes means for feeding the blanks vertically in the region of said support and means for feeding the blanks substantially horizontally over said first fixed bar, whereby a blank is fed initially vertically and then horizontally to said box forming place, then downwardly vertically between said fixed and movable bars by said operative means to said position below said box forming place, said removing means being constructed and arranged to move the stayed box substantially horizontally from said position out of the machine.

87. In a box staying machine such as defined in claim 86, in which said means for feeding the blank vertically is constructed and arranged to move said support to feed the blanks upwardly while supported thereon from a position below said first fixed bar to a position above said first fixed bar, and in which said removing means is constructed and arranged to move the stayed boxes from said position under said second fixed bar.

88. In a box staying machine such as defined in claim 85, in which said operative means includes setting up means cooperable with said breaker bars, and means operable after the stayed box has been formed to cause the latter to advance to said position below said box forming place.

References Cited in the file of this patent

UNITED STATES PATENTS

| | | |
|---|---|---|
| 1,715,585 | Woodworth | June 4, 1929 |
| 1,915,976 | Brodsky | June 27, 1933 |
| 2,174,585 | Kotzich | Oct. 3, 1939 |
| 2,186,772 | Straw | Jan. 9, 1940 |
| 2,538,520 | Holt | Jan. 16, 1951 |
| 2,641,973 | Straw | June 16, 1953 |
| 2,717,541 | Hedlund et al. | Sept. 13, 1955 |
| 2,722,166 | Keller | Nov. 1, 1955 |
| 2,722,416 | Backhouse | Nov. 1, 1955 |
| 2,743,651 | Wilcox | May 1, 1956 |
| 2,745,665 | Labombarde | May 15, 1956 |
| 2,861,804 | Davy et al. | Nov. 25, 1958 |
| 2,890,630 | Bailey et al. | June 16, 1959 |